US012770532B2

(12) United States Patent
Rodriguez et al.

(10) Patent No.: US 12,770,532 B2
(45) Date of Patent: Oct. 20, 2026

(54) ADVANCED PATIENT SIMULATOR

(71) Applicant: GAUMARD SCIENTIFIC COMPANY, INC., Miami, FL (US)

(72) Inventors: Alberto Rodriguez, Miami, FL (US); Victor Fernandez, Miami, FL (US); Yassel Valdes, Miami, FL (US); Lazaro Morales, Miami, FL (US); Allan R. Kirchhoff, Miami, FL (US); Miguel Carvajal, Miami Springs, FL (US); Karina Zornoza, Miami, FL (US); Arian Hernandez, Miami, FL (US); Ha Nguyen, Miami, FL (US); Niyu Li, Miami, FL (US); Roberto Robaina, Miami, FL (US)

(73) Assignee: GAUMARD SCIENTIFIC COMPANY, INC., Miami, FL (US)

( * ) Notice: Subject to any disclaimer, the term of this patent is extended or adjusted under 35 U.S.C. 154(b) by 227 days.

(21) Appl. No.: 18/449,301

(22) Filed: Aug. 14, 2023

(65) Prior Publication Data

US 2023/0386368 A1 Nov. 30, 2023

Related U.S. Application Data

(62) Division of application No. 17/150,553, filed on Jan. 15, 2021, now Pat. No. 11,756,451.

(60) Provisional application No. 62/962,851, filed on Jan. 17, 2020.

(51) Int. Cl.
*G09B 23/30* (2006.01)

(52) U.S. Cl.
CPC .................................. *G09B 23/303* (2013.01)

(58) Field of Classification Search
CPC .................................................... G09B 23/303
USPC ........................................................... 434/268
See application file for complete search history.

(56) References Cited

U.S. PATENT DOCUMENTS

| | | | | |
|---|---|---|---|---|
| 5,195,896 | A | 3/1993 | Sweeney et al. | |
| 2004/0116769 | A1 | 6/2004 | Jassawalla et al. | |
| 2012/0214144 | A1 | 8/2012 | Trotta et al. | |
| 2013/0037121 | A1* | 2/2013 | Kiesbauer ........... | F04D 15/0066 137/565.01 |
| 2018/0218647 | A1 | 8/2018 | Rodriguez et al. | |
| 2019/0027065 | A1* | 1/2019 | Keller .................. | A61M 5/168 |

(Continued)

*Primary Examiner* — Thomas J Hong
(74) *Attorney, Agent, or Firm* — HAYNES AND BOONE, LLP

(57) ABSTRACT

A patient simulator may include a pump, a compressor, a power source, and a simulated torso in which the pump, the compressor, and the power source are contained. The compressor may include an inlet to which a bellows is coupled. A head coupling may detachably couple a simulated neck to the simulated torso. Similarly, an extremity coupling may detachably couple a simulated lower extremity to a simulated upper extremity, which simulated upper extremity is coupled to the simulated torso. The pump, the compressor, and/or the power source may provide hydraulic fluid, pneumatic fluid, and or electrical power, respectively, into: the simulated neck via the head coupling; or the simulated lower extremity via the extremity coupling. In addition, or instead, the patient simulator may include an invasive blood pressure (IBP) assembly having an armature adapted to contact a tube to change a fluid pressure in the IBP assembly.

20 Claims, 39 Drawing Sheets

(56) References Cited

U.S. PATENT DOCUMENTS

2021/0134187 A1 5/2021 Lara-Gutierrez et al.

* cited by examiner

ADVANCED PATIENT SIMULATOR

CROSS-REFERENCE TO RELATED APPLICATIONS

This application is a divisional of U.S. patent application Ser. No. 17/150,553, filed Jan. 15, 2021, which claims the benefit of the filing date of, and priority to, U.S. Patent Application No. 62/962,851, filed Jan. 17, 2020, the entire disclosures of which are hereby incorporated herein by reference.

TECHNICAL FIELD

This disclosure is related in general to a patient simulator for teaching patient care and, more particularly, to an advanced patient simulator.

BACKGROUND

As medical science has progressed, it has become increasingly important to provide non-human interactive formats for teaching patient care. While it is desirable to train medical personnel in patient care protocols before allowing contact with real patients, textbooks and flash cards lack the important benefits to students that can be attained from hands-on practice. On the other hand, allowing inexperienced students to perform medical procedures on actual patients that would allow for the hands-on practice cannot be considered a viable alternative because of the inherent risk to the patient. Non-human interactive devices and systems can be used to teach the skills needed to successfully identify and treat various patient conditions without putting actual patients at risk.

For example, patient care education has often been taught using medical instruments to perform patient care activity on a physical simulator, such as a manikin—a manikin may be a life-sized anatomical human model used for educational and instructional purposes. Such training devices and systems can be used by medical personnel and medical students to teach and assess competencies such as patient care, medical knowledge, practice-based learning and improvement, systems-based practice, professionalism, and communication. The training devices and systems can also be used by patients to learn the proper way to perform self-examinations. While existing physical simulators have been adequate in many respects, they have not been adequate in all respects. As such, there is a need to provide a simulator for use in conducting patient care training sessions that overcomes the deficiencies of existing stimulators by, for example, being even more realistic and/or including additional simulated features.

DETAILED DESCRIPTION

Figure 1:
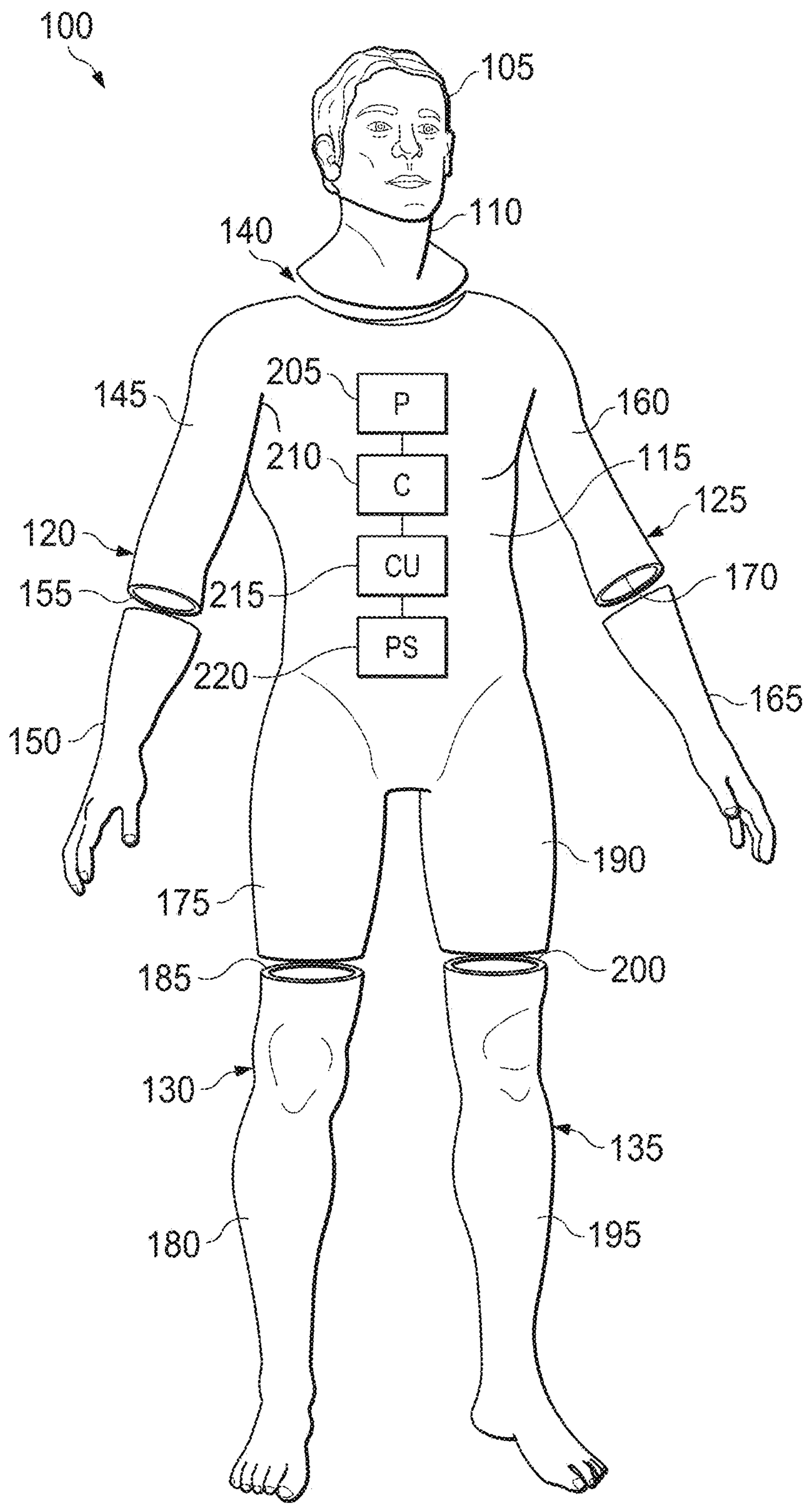
FIG. 1 is a perspective view of a patient simulator including a simulated torso, a simulated head, a simulated neck, a simulated right arm, a simulated left arm, a simulated right leg, and a simulated left leg, according to one or more embodiments.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately. For simplicity, in some instances the same reference numbers are used throughout the drawings to refer to the same or like parts.

One of the aims of healthcare simulation is to establish a teaching environment that closely mimics key clinical cases in a reproducible manner. The introduction of high fidelity tetherless simulators, such as those available from Gaumard Scientific Company, Inc., over the past few years has proven to be a significant advance in creating realistic teaching environments. The present disclosure is directed to a patient simulator that expands the functionality of the simulators by increasing the realism of the look, feel, and functionality of the simulators that can be used to train medical personnel in a variety of clinical situations. The patient simulator disclosed herein offers a training platform on which medical scenarios can be performed for the development of medical treatment skills and the advancement of patient safety. Accordingly, the user's medical treatment skills can be obtained and/or improved in a simulated environment without endangering a live patient. Moreover, the patient simulator allows for multiple users to simultaneously work with the patient simulator during a particular medical scenario, thereby facilitating team training and assessment in a realistic, team-based environment.

In several embodiments, the patient simulator includes features designed to enhance the educational experience. For example, in several embodiments, the system includes a processing module to simulate different medical and/or surgical scenarios during operation of the patient simulator. In several embodiments, the system includes a camera system that allows visualization of the procedure for real-time video and log capture for debriefing purposes. In several embodiments, the patient simulator is provided with a workbook of medical scenarios that are pre-programmed in an interactive software package, thereby providing a platform on which medical scenarios can be performed for the development of medical treatment skills and general patient safety. Thus, the patient simulator disclosed herein provides a system that is readily expandable and updatable without large expense and that enables users to learn comprehensive medical and surgical skills through "hands-on" training, without sacrificing the experience gained by users in using standard surgical instruments in a simulated patient treatment situation.

Referring to FIG. 1, in an embodiment, a patient simulator is generally referred to by the reference numeral 100 and includes a simulated head 105, a simulated neck 110, a simulated torso 115, a simulated right arm 120 (or "extremity"), a simulated left arm 125 (or "extremity"), a simulated right leg 130 (or "extremity"), and a simulated left leg 135 (or "extremity"). In several embodiments, the patient simulator is, includes, or is part of, a manikin. The simulated head 105 is coupled to the simulated neck 110; for example, the simulated head 105 may be integrally formed with the simulated neck 110. The patient simulator 100 further includes a head coupling 140. The simulated neck 110 is adapted to be detachably coupled to the simulated torso 115 via the head coupling 140. The simulated right arm 120 includes a simulated upper right arm 145 (or "extremity") and a simulated lower right arm 150 (or "extremity"). The simulated upper right arm 145 is coupled to the simulated torso 115; for example, the simulated upper right arm 145 may be integrally formed with the simulated torso 115. The simulated right arm 120 further includes a right arm coupling 155 (or “extremity coupling”). The simulated lower right arm 150 is adapted to be detachably coupled to the simulated upper right arm 145 via the right arm coupling 155. Similarly, the simulated left arm 125 includes a simulated upper left arm 160 (or “extremity”) and a simulated lower left arm 165 (or “extremity”). The simulated upper left arm 160 is coupled to the simulated torso 115; for example, the simulated upper left arm 160 may be integrally formed with the simulated torso 115. The simulated left arm 125 further includes a left arm coupling 170 (or “extremity coupling”). The simulated lower left arm 165 is adapted to be detachably coupled to the simulated upper left arm 160 via the left arm coupling 170.

The simulated right leg 130 includes a simulated upper right leg 175 (or “extremity”) and a simulated lower right leg 180 (or “extremity”). The simulated upper right leg 175 is coupled to the simulated torso 115; for example, the simulated upper right leg 175 may be integrally formed with the simulated torso 115. The simulated right leg 130 further includes a right leg coupling 185 (or “extremity coupling”). The simulated lower right leg 180 is adapted to be detachably coupled to the simulated upper right leg 175 via the right leg coupling 185. Similarly, the simulated left leg 135 includes a simulated upper left leg 190 (or “extremity”) and a simulated lower left leg 195 (or “extremity”). The simulated upper left leg 190 is coupled to the simulated torso 115; for example, the simulated upper left leg 190 may be integrally formed with the simulated torso 115. The simulated left leg 135 further includes a left leg coupling 200 (or “extremity coupling”). The simulated lower left leg 195 is adapted to be detachably coupled to the simulated upper left leg 190 via the left leg coupling 200.

The simulated torso 115 contains a pump 205, a compressor 210, a control unit 215, and a power source 220. The compressor 210 is adapted to supply pneumatic pressure to various features/components of the patient simulator 100; such features/components to which pneumatic pressure is supplied by the compressor 210 may be contained in the simulated torso 115, the simulated head 105, the simulated right arm 120, the simulated left arm 125, the simulated right leg 130, and/or the simulated left leg 135. In several embodiments, the compressor 210 is a scroll compressor. The pump 205 is adapted to supply hydraulic pressure to various features/components of the patient simulator 100; such features/components to which hydraulic pressure is supplied by the pump 205 may be contained in the simulated torso 115, the simulated head 105, the simulated right arm 120, the simulated left arm 125, the simulated right leg 130, and/or the simulated left leg 135.

The control unit 215 is adapted to control the compressor 210, the pump 205, and various other features/components of the patient simulator 100; such other features/components controlled by the control unit 215 may be contained in the simulated torso 115, the simulated head 105, the simulated right arm 120, the simulated left arm 125, the simulated right leg 130, and/or the simulated left leg 135. The power source 220 is adapted to supply electrical power to the compressor 210, the pump 205, the control unit 215, and various other features/components of the patient simulator 100; such other features/components to which electrical power is supplied by the power source 220 may be contained in the simulated torso 115, the simulated head 105, the simulated right arm 120, the simulated left arm 125, the simulated right leg 130, and/or the simulated left leg 135.

In one or more embodiments, the simulated torso 115 shown in FIG. 1 may be divided into a simulated upper torso and a simulated lower torso. In such instances: the simulated upper right arm 145 and the simulated upper left arm 160 are coupled to the simulated upper torso—for example, the simulated upper right arm 145 and the simulated upper left arm 160 may be integrally formed with the simulated upper torso; the simulated upper right leg 175 and the simulated upper left leg 190 are coupled to the simulated lower torso—for example, the simulated upper right leg 175 and the simulated upper left leg 190 may be integrally formed with the simulated lower torso; and the simulated torso 115 further includes a torso coupling via which the simulated upper torso is adapted to be detachably coupled to the simulated lower torso.

Figure 2A:
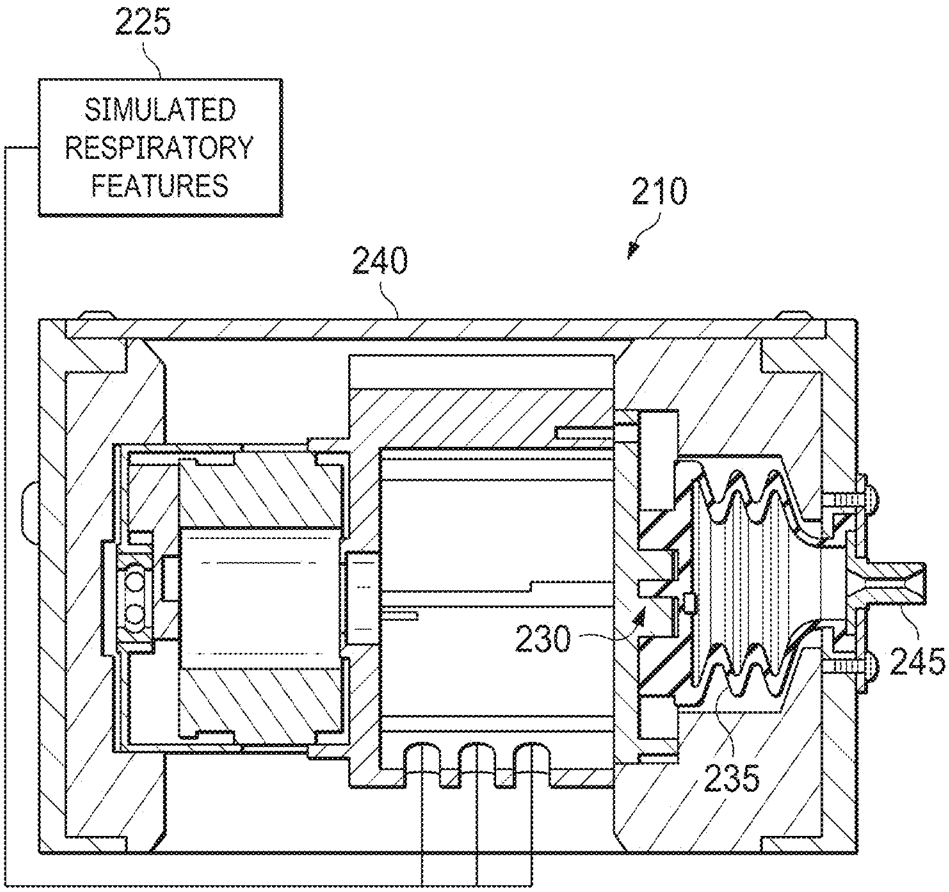
FIG. 2A is a cross-sectional view of a compressor contained in the torso of FIG. 1's patient simulator, according to one or more embodiments.
Figure 2B:
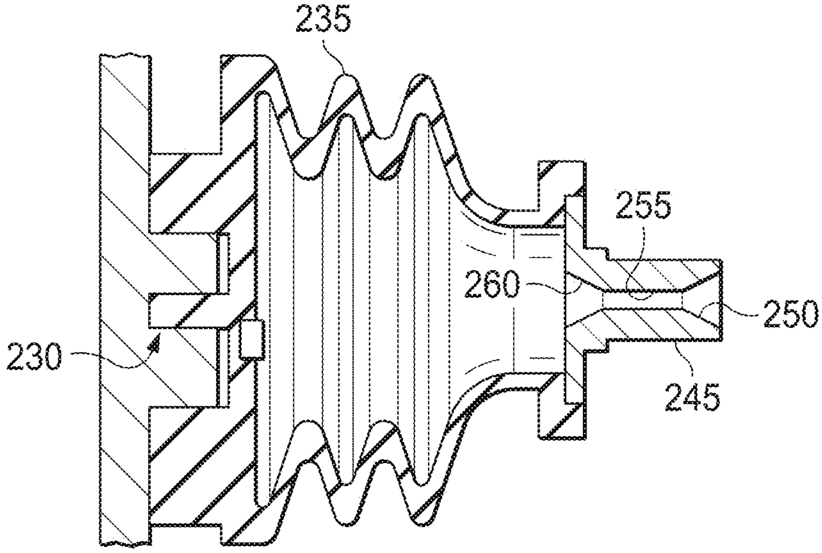
FIG. 2B is an enlarged cross-sectional view of an end portion of the compressor shown in FIG. 2A, said end portion including a bellows, according to one or more embodiments.
Figure 3:
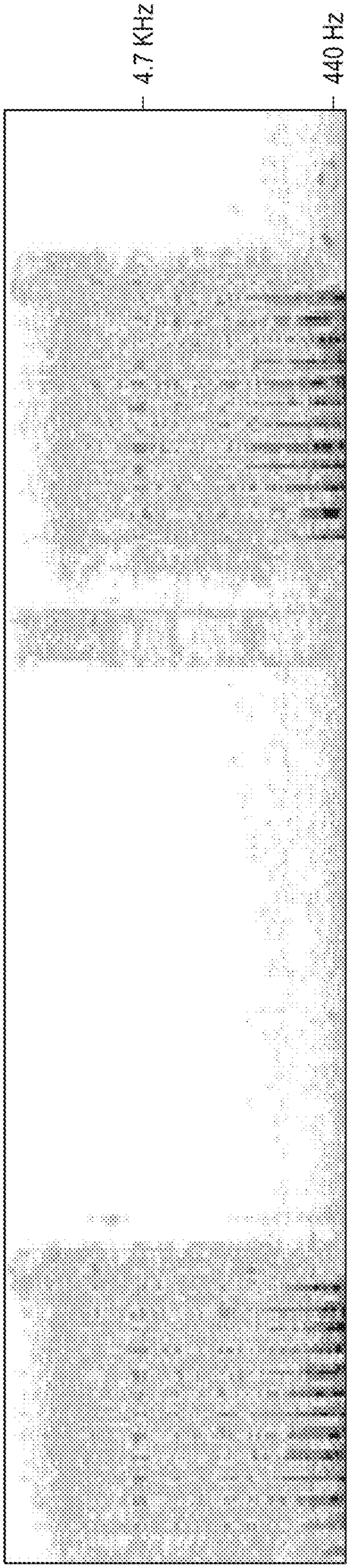
FIG. 3 is a graphical illustration of a noise produced by FIG. 2A's compressor absent a bellows and a restrictor coupled thereto, according to one or more embodiments.

Referring to FIGS. 2A, 2B, and 3, with continuing reference to FIG. 1, in an embodiment, the patient simulator 100 further includes one or more simulated respiratory features 225 (e.g., simulated lungs, simulated airway, the like, etc.); for example, the one or more simulated respiratory features 225 may be contained within the simulated torso 115, the simulated neck 110, the simulated head 105, or any combination thereof. As shown in FIGS. 2A and 2B, the compressor 210 is coupled to, and adapted to be in fluid communication with, the one or more simulated respiratory features 225. More particularly, the compressor 210 is adapted to supply pneumatic pressure to the one or more simulated respiratory features 225 to simulate the natural respiratory processes (e.g., breathing) of a human patient.

The compressor 210 includes an inlet 230 to which a bellows 235 is coupled. In several embodiments, as in FIGS. 2A and 2B, the compressor 210 and the bellows 235 are contained within a compressor casing 240. The bellows 235 acts as both a pneumatic accumulator, which aids in pneumatic pressurization at the inlet 230, and a dampener, which absorbs higher frequency vibrations. As a result, the bellows 235 prevents, or at least reduces, vibrational noise emanating from the compressor 210. A restrictor 245 is coupled to the bellows 235, opposite the inlet 230. The restrictor 245 defines a central passageway including a funnel 250, a throat 255, and a nozzle 260. The funnel 250 extends from the throat 255 such that a reduced-diameter portion of the funnel 250 extends adjacent the throat 255 and an enlarged-diameter portion of the funnel 250 extends opposite the throat 255. The nozzle 260 extends from the throat 255, opposite the funnel 250, such that a reduced-diameter portion of the nozzle 260 extends adjacent the throat 255 and an enlarged-diameter portion of the nozzle 260 extends opposite the throat 255 and adjacent the bellows 235. The restrictor 245 acts as a dampener, which absorbs lower frequency vibrations. As a result, the restrictor 245 prevents, or at least reduces, vibrational noise emanating from the compressor 210. As shown in FIG. 3, absent the bellows 235 and the restrictor 245, the compressor 210 may produce a loud and powerful vibrating noise (e.g., characterized by a lower frequency vibration of approximately 13 Hz), which results in loud pneumatic puffs at the outlet and adversely affects the realism of the one or more simulated respiratory features 225 (when heard through a stethoscope, this vibrating noise sounds like a woodpecker).

Figure 4:
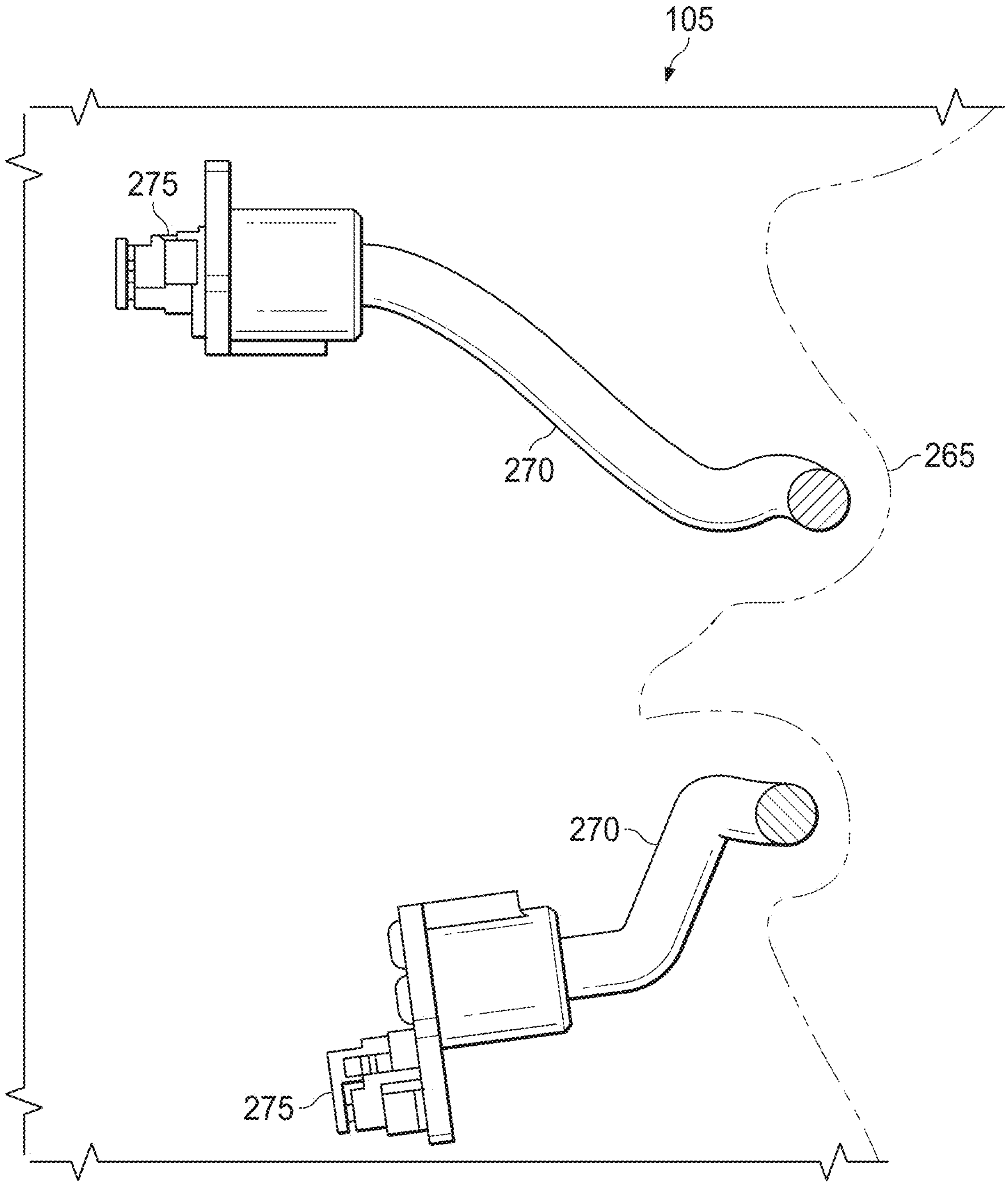
FIG. 4 is a cross-sectional view of a simulated head of FIG. 1's patient simulator, the simulated head including a simulated skin have one or more optical fibers embedded therein, according to one or more embodiments.
Figure 5:
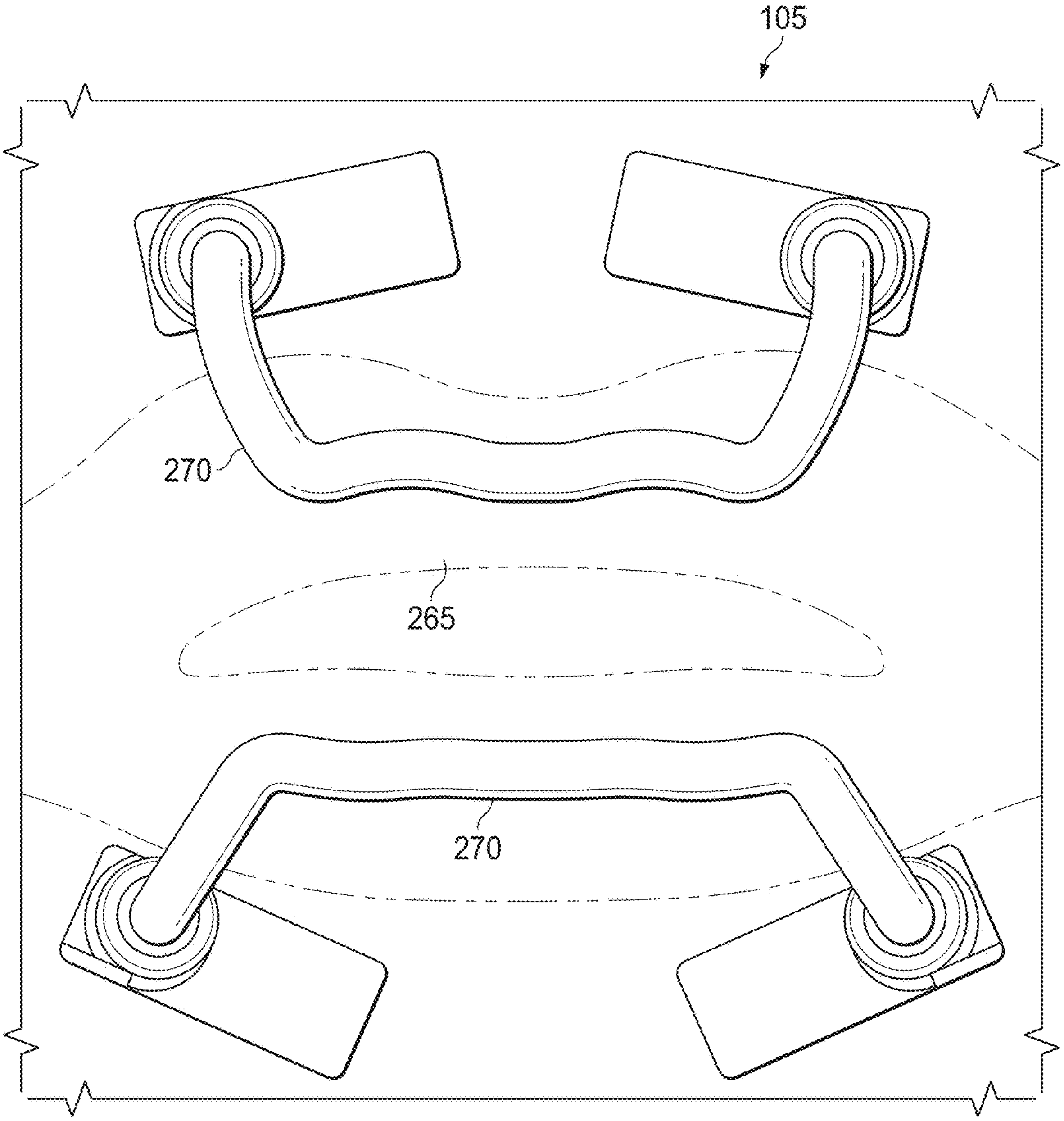
FIG. 5 is a front elevational view of FIGS. 4's simulated head including the simulated skin and the one or more optical fibers embedded therein, according to one or more embodiments.

Referring to FIGS. 4 and 5, with continuing reference to FIG. 1, in an embodiment, the simulated head 105 includes simulated skin 265 into which one or more optical fibers 270 are embedded to provide dynamic skin color control. The one or more optical fibers 270 are selected to have high cladding losses, which allows radial light emission along the length of each fiber rather than out of its ends. As a result, the simulated skin 265 into which the one or more optical fibers 270 are embedded is colored to match the frequency of the emitted light. Red, green, and blue (RGB) light emitting diodes (LEDs) 275 are placed at opposing ends of each of the one or more optical fibers 270 so that their radiation is emitted into the fiber. The RGB LEDs 275 are capable of emitting any color with a resolution of sixteen (16) bits for each channel. Moreover, the intensity of the color is adjustable with a resolution of sixteen (16) bits. The RGB LEDs 275 are individually controlled by a local control unit (e.g., a printed circuit board), which local control unit may communicate with the control unit 215 contained in the simulated torso 115. Alternatively, the local control unit may be omitted in favor of the control unit 215 to control the RGB LEDs 275. The one or more optical fibers 270 are each flexible and can be shaped to match the natural organic curvatures of the human anatomy. As a result, the one or more optical fibers 270 can each be shaped into a single strand or layered to cover a larger area. Although shown in FIGS. 4 and 5 as being embedded into the simulated skin 265 on the head of the patient simulator 100, the one or more optical fibers 270 (or one or more optical fibers similar thereto) may additionally or alternatively be embedded into simulated skin elsewhere on the patient simulator 100 (e.g., on the simulated neck 110, the simulated torso 115, the simulated right arm 120 the simulated left arm 125, the simulated right leg 130, the simulated left leg 135, or any combination thereof).

Figure 6:
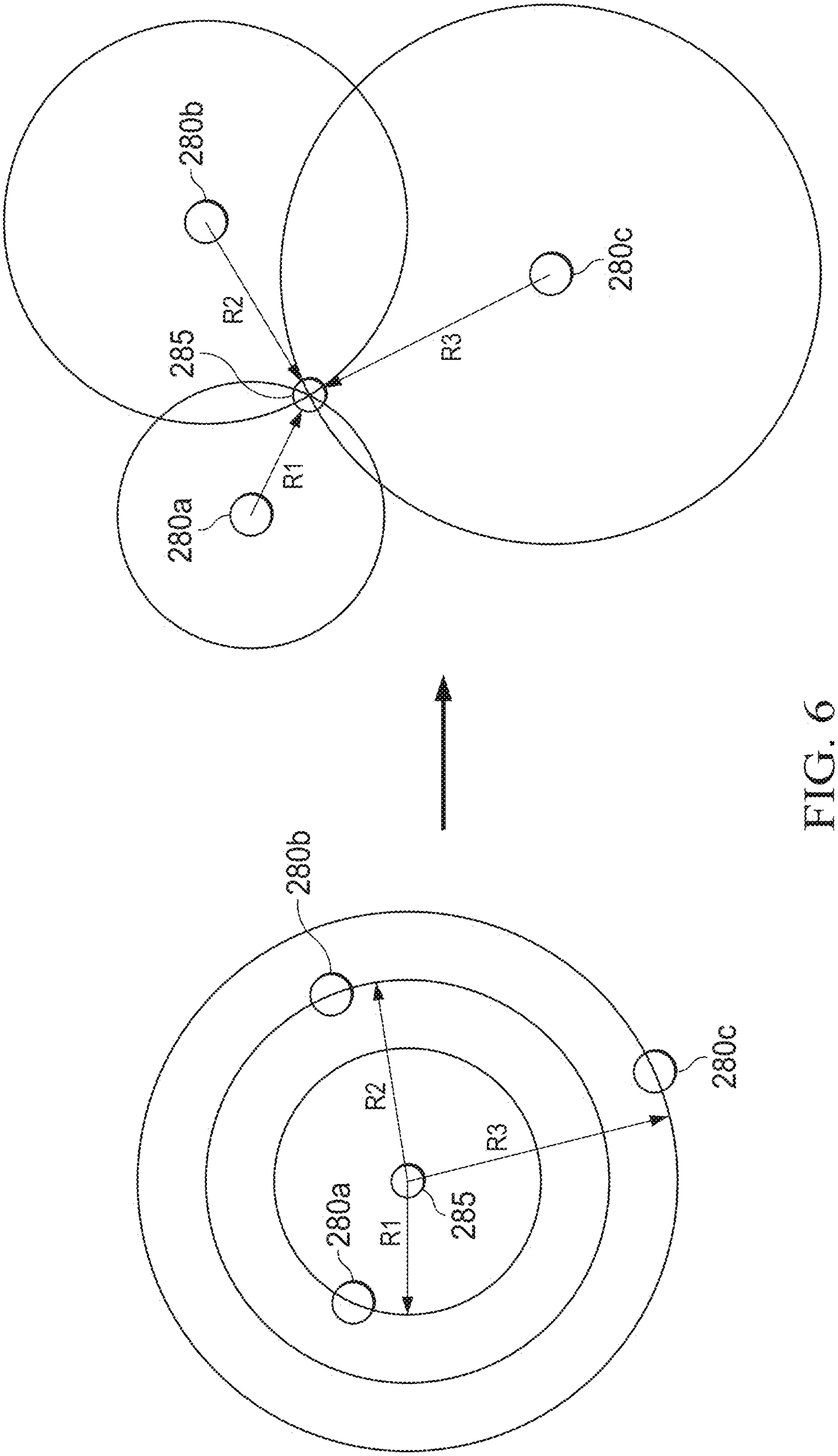
FIG. 6 is a diagrammatic illustration of one or more microphones of FIG. 1's patient simulated being used to execute a procedure for calculating a direction vector between FIG. 1's patient simulator and a sound source, according to one or more embodiments.
Figure 7:
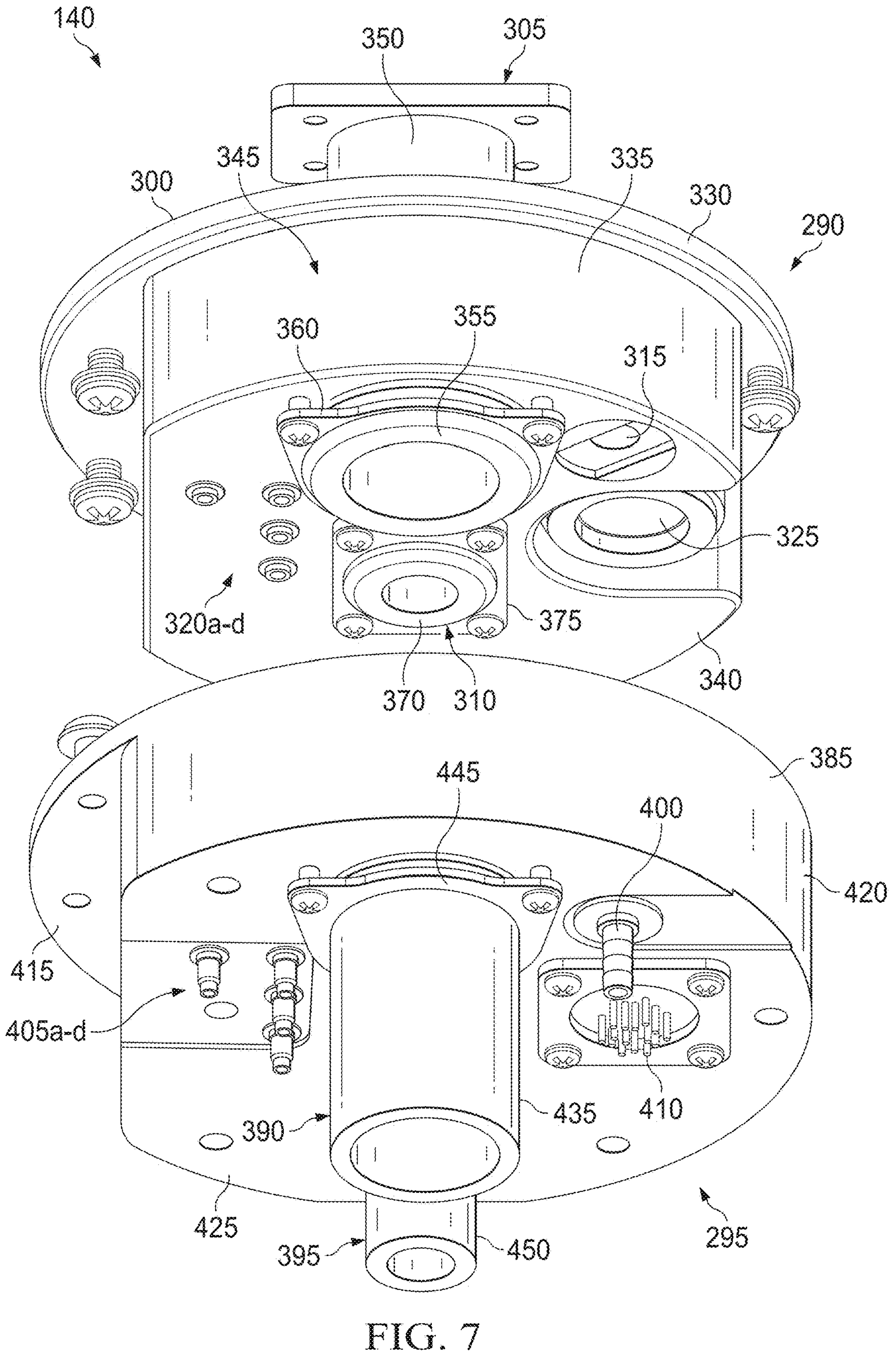
FIG. 7 is an exploded bottom perspective view of a head coupling of FIG. 1's patient simulator, according to one or more embodiments.
Figure 8:
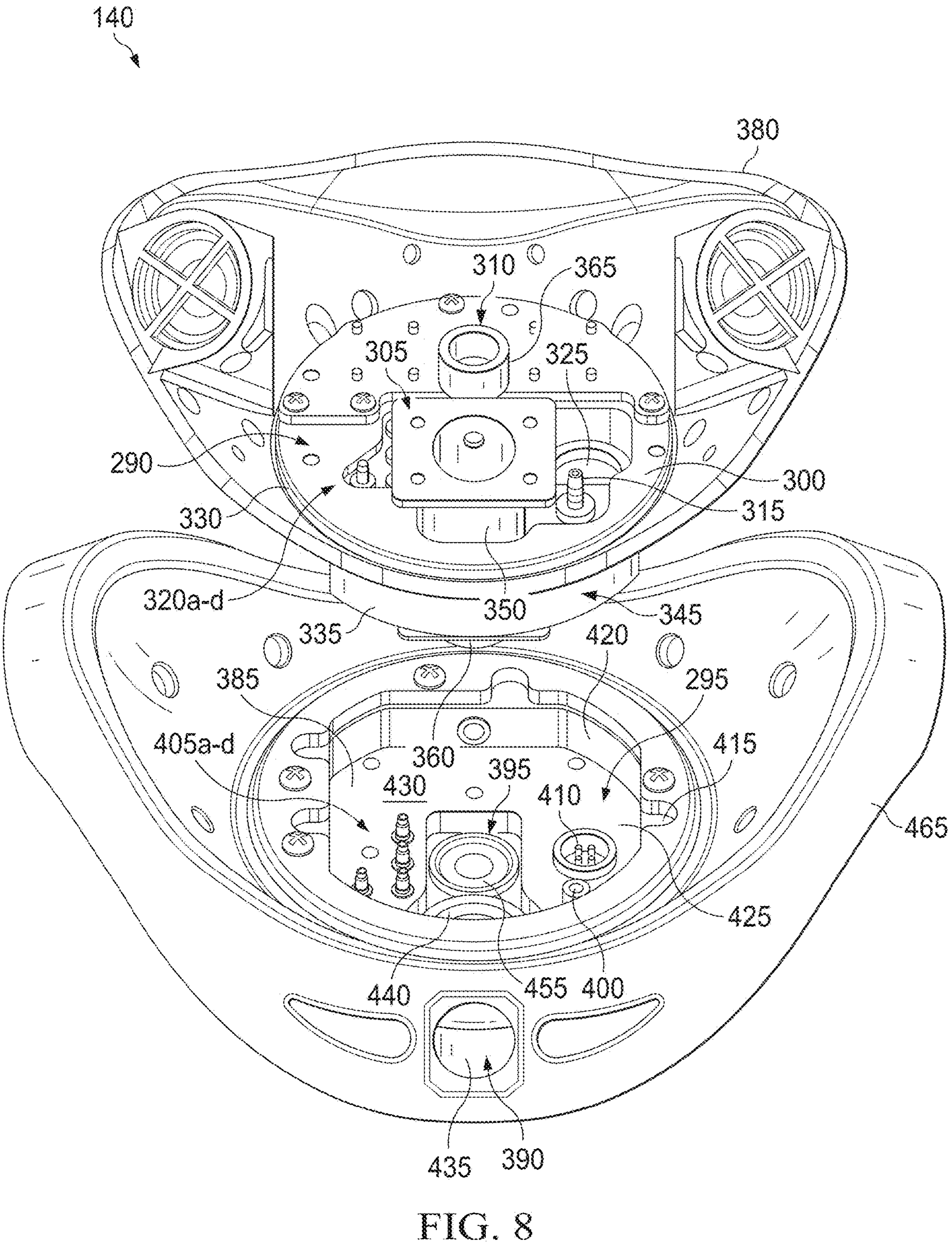
FIG. 8 is an exploded top perspective view of FIG. 7's head coupling including upper and lower adapters, according to one or more embodiments.
Figure 9:
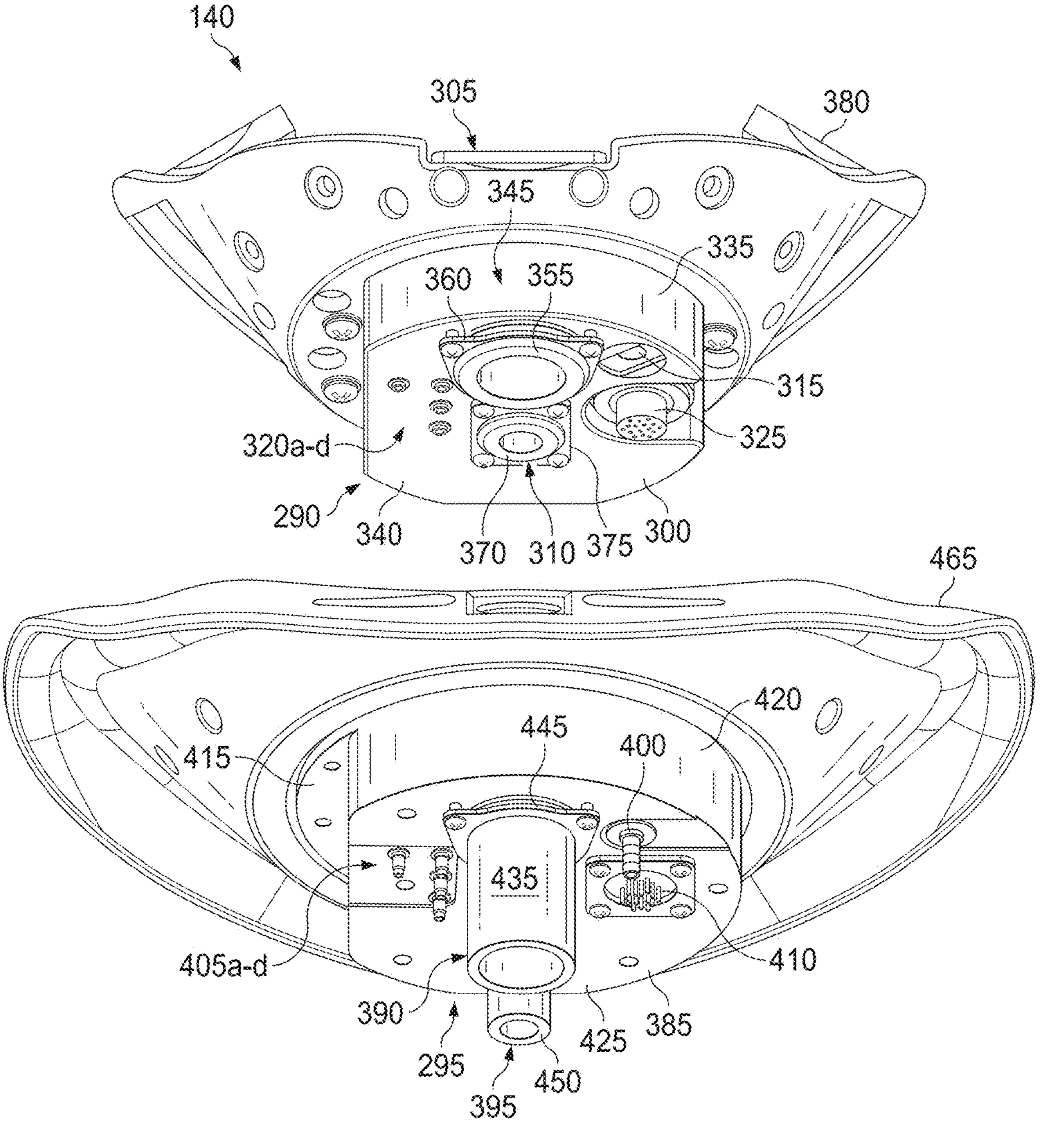
FIG. 9 is an exploded bottom perspective view of FIG. 8's head coupling including the upper and lower adapters, according to one or more embodiments.

Referring to FIG. 6, with continuing reference to FIG. 1, in an embodiment, microphones 280*a-c* are mounted on an outer surface of the patient simulator 100. More particularly, the microphones 280*a-c* are spaced apart from each other to detect a sound source 285 from difference locations. Although shown in FIG. 6 as including three (3) of the microphones 280*a-c*, the patient simulator 100 may instead include one (1), two (2), four (4), or more of the microphones 280*a-c*. The microphones 280*a-c* can detect sounds emitted within an approximately 3 to 15-foot radius of the patient simulator 100. In several embodiments, the microphones 280*a-c* are adapted to communicate with a local control unit (e.g., a printed circuit board), which local control unit may communicate with the control unit 215 contained in the simulated torso 115. Alternatively, the local control unit may be omitted in favor of the control unit 215 to monitor the microphones 280*a-c*. In operation, a direction vector between the patient simulator 100 and a sound source 285 is calculated (e.g., by the control unit 215 contained in the simulated torso 115) based on the known speed of sound and the known locations of the microphones 280*a-c* on the patient simulator 100 (i.e., via triangulation), as shown in FIG. 6.

Based on the calculated direction vector: rotary actuator(s) in the simulated neck 110 of the patient simulator 100 can be powered (e.g., by the power source 220 contained in the simulated torso 115) to rotate the simulated head 105 towards the sound source 285; and rotary actuator(s) in simulated eyes of the patient simulator 100 can be powered (e.g., by the power source 220 contained in the simulated torso 115) to rotate the simulated eyes towards the sound source 285. As a result, the patient simulator 100 can react in a human-like manner to speech and sound in its immediate vicinity. In several embodiments, the simulated neck 110, the rotary actuator(s) in the simulated neck 110, and the way said rotary actuator(s) are powered to rotate the simulated head 105 are described in U.S. patent application Ser. No. 16/244,433 (the "'433 application"), filed Jan. 10, 2019, which claims the benefit of the filing date of, and priority to, U.S. Patent Application No. 62/616,689, filed Jan. 12, 2018, the entire disclosures of which are hereby incorporated herein by reference. Likewise, in several embodiments, the simulated eyes, the rotary actuator(s) in the simulated eyes, and the way said rotary actuator(s) are powered to rotate the simulated eyes are described in: U.S. patent application Ser. No. 15/223,795 (the "'795 application"), filed Jul. 29, 2016, which claims the benefit of the filing date of, and priority to, U.S. Patent Application No. 62/202,564, filed Aug. 7, 2015, the entire disclosures of which are hereby incorporated herein by reference; U.S. patent application Ser. No. 15/816,747 (the "'747 application"), filed Nov. 17, 2017, which claims the benefit of the filing date of, and priority to, U.S. Patent Application No. 62/423,897, filed Nov. 18, 2016, the entire disclosures of which are hereby incorporated herein by reference; the '433 application; or any combination thereof.

In one or more embodiments of the present disclosure, one or more of the position sensors described in the '795 application, the '747 Application, and the '433 application as possibly being rotary potentiometers may be replaced by Hall Effect sensor(s). Rotary potentiometers may have a limited life due to friction among mechanical parts and can be unreliable at high speeds due to high electrical noise generation caused by physical idiosyncrasies in each sensor. On the other hand, Hall Effect sensors do not use any mechanical parts to track position and, as a result, are immune to wear and manufacturing idiosyncrasies. Moreover, Hall Effect sensors have higher resolution than rotary potentiometers, allowing for more precise motion control.

Figure 10:
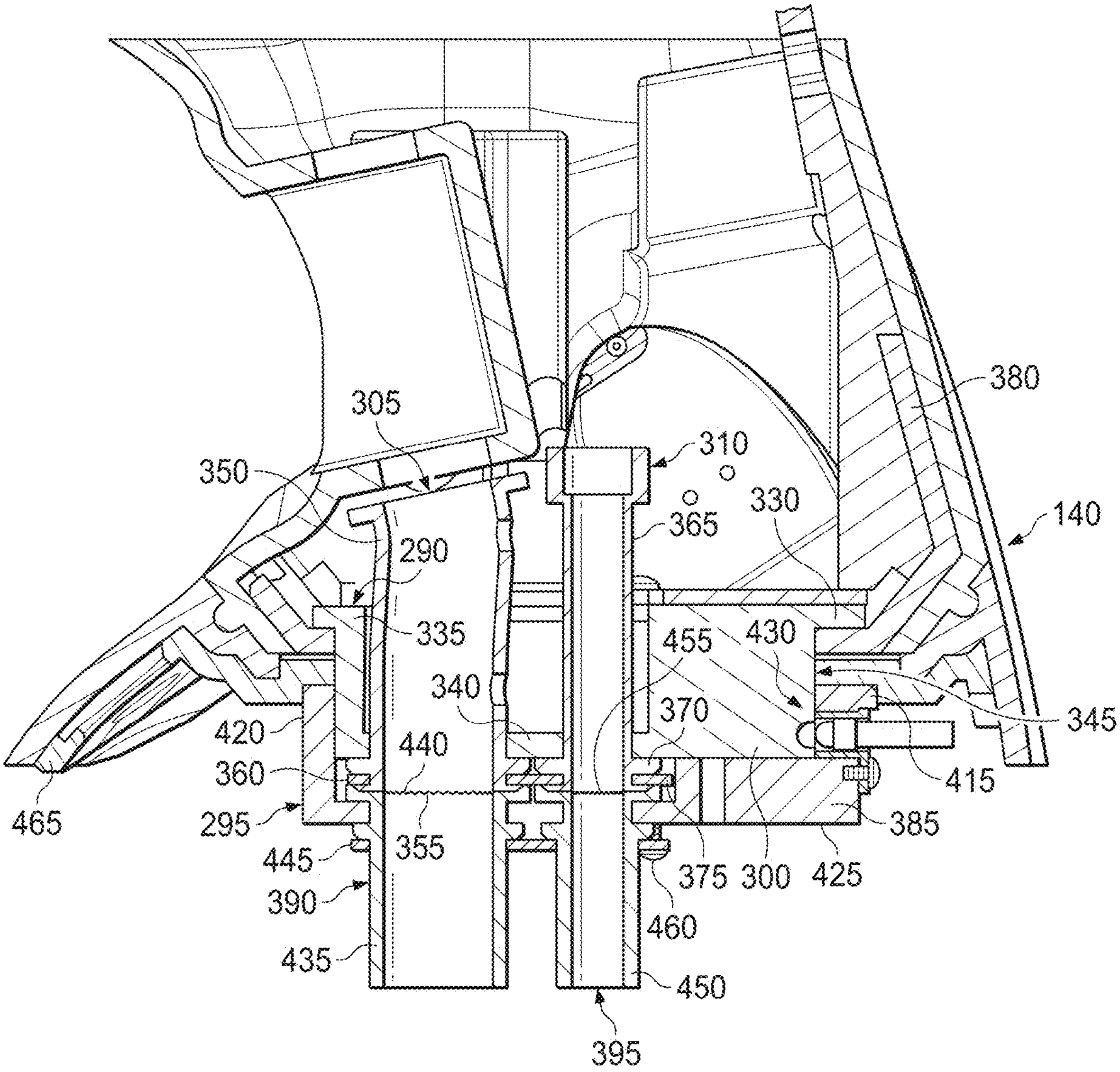
FIG. 10 is a cross-sectional view of FIG. 7's head coupling installed in FIG. 1's patient simulator, the head coupling including a simulated trachea and a simulated esophagus, according to one or more embodiments.
Figure 11:
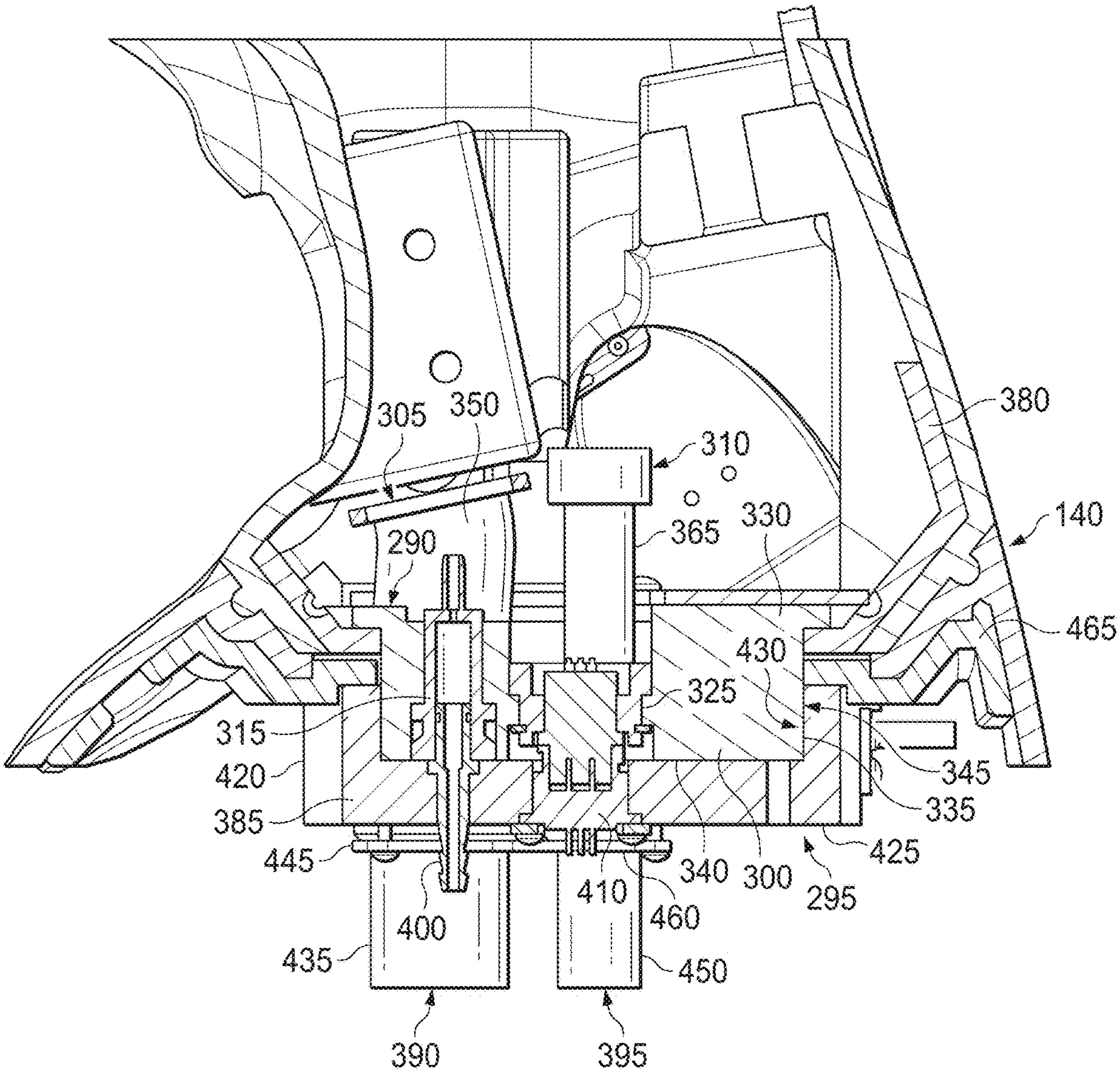
FIG. 11 is a cross-sectional view of FIG. 7's head coupling installed in FIG. 1's patient simulator, the head coupling including upper and lower hydraulic connectors and upper and lower electronic multi-connector ports, according to one or more embodiments.
Figure 12:
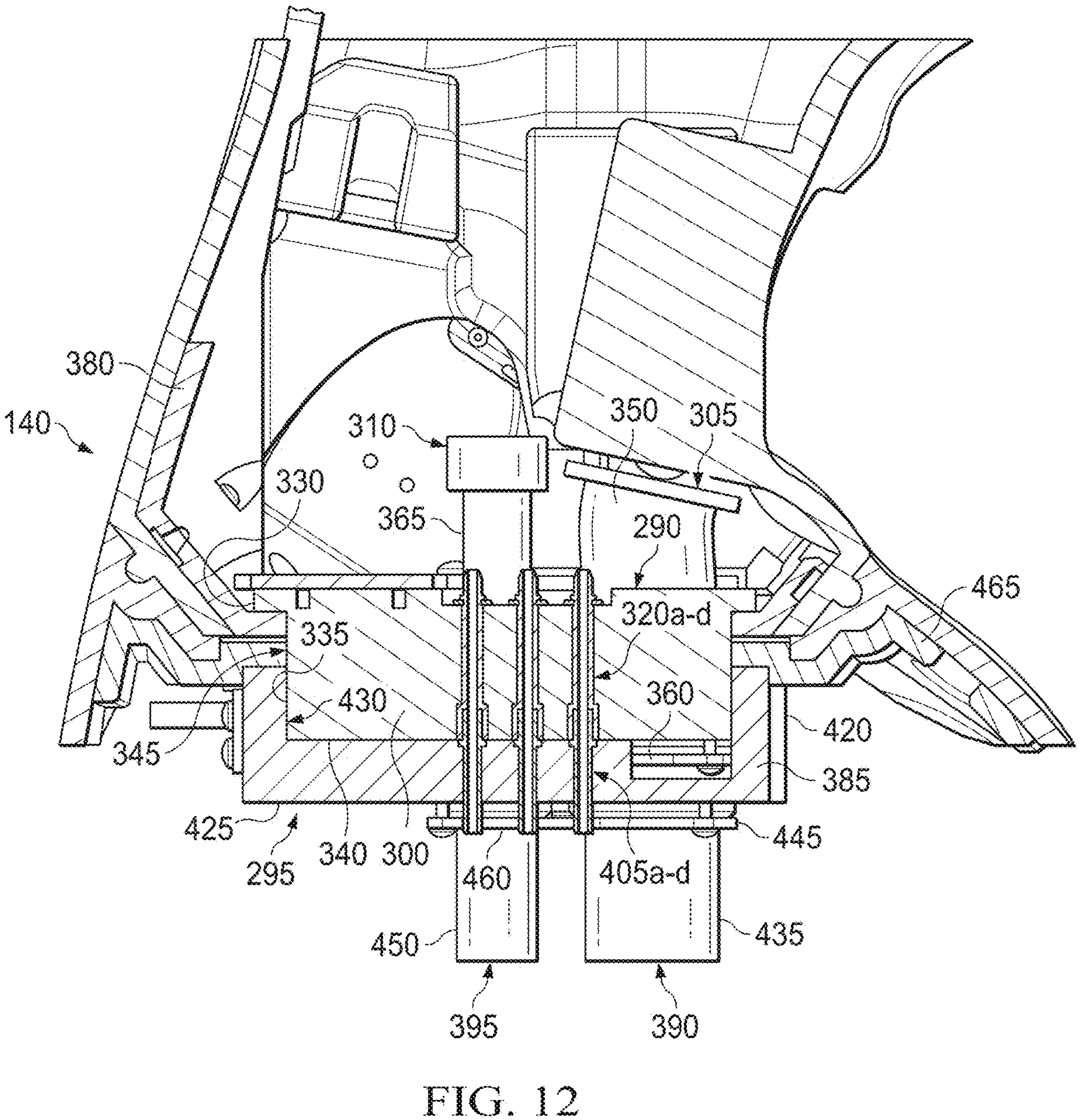
FIG. 12 is a cross-sectional view of FIG. 7's head coupling installed in FIG. 1's patient simulator, the head coupling including upper and lower pneumatic connectors, according to one or more embodiments.

Referring to FIGS. 7-12, with continuing reference to FIG. 1, in an embodiment, the head coupling 140 includes an upper coupling assembly 290 and a lower coupling assembly 295. The upper coupling assembly 290 includes an upper coupling hub 300, an upper simulated trachea 305, an upper simulated esophagus 310, an upper hydraulic connector 315, upper pneumatic connectors 320*a-d*, and an upper electronic multi-connector port 325, as shown in FIGS. 7-12. The upper coupling hub 300 includes an upper anchoring flange 330, an upper sidewall 335, and an upper deck plate 340. The upper sidewall 335 extends transversely from the upper deck plate 340 to the upper anchoring flange 330. As a result, the upper deck plate 340 and the upper sidewall 335, in combination, form a plug 345. Alternatively, the upper coupling hub 300 may form a socket rather than the plug 345. The upper simulated trachea 305 includes an upper trachea tube 350 and an upper trachea interface 355 from which the upper trachea tube 350 extends. The upper trachea tube 350 extends through the upper deck plate 340, and is connected thereto, by an upper trachea mounting bracket 360. Similarly, the upper simulated esophagus 310 includes an upper esophagus tube 365 and an upper esophagus interface 370 from which the upper esophagus tube 365 extends. The upper esophagus tube 365 extends through the upper deck plate 340, and is connected thereto, by an upper esophagus mounting bracket 375. In several embodiments, the upper esophagus mounting bracket 375 is integrally formed with the upper trachea mounting bracket 360. The upper hydraulic connector 315, the upper pneumatic connectors 320*a-d*, and the upper electronic multi-connector port 325 each extend through, and are coupled to, the upper deck plate 340. An upper adapter 380 is coupled to the upper anchoring flange 330 of the upper coupling hub 300, as shown in FIGS. 8-12. The upper adapter 380 also extends within, and is coupled to, the simulated neck 110 of the patient simulator 100, as shown in FIGS. 10-12. As a result, the upper adapter 380 couples the upper coupling assembly 290 to the simulated neck 110 of the patient simulator 100.

The lower coupling assembly 295 includes a lower coupling hub 385, a lower simulated trachea 390, a lower simulated esophagus 395, a lower hydraulic connector 400, lower pneumatic connectors 405*a-d*, and a lower electronic multi-connector port 410, as shown in FIGS. 7-12. The lower coupling hub 385 includes a lower anchoring flange 415, a lower sidewall 420, and a lower deck plate 425. The lower sidewall 420 extends transversely from the lower deck plate 425 to the lower anchoring flange 415. As a result, the lower deck plate 425 and the lower sidewall 420, in combination, form a socket 430. Alternatively, in those embodiments in which the upper coupling hub 300 forms a socket rather than the plug 345, the lower deck plate 425 forms a plug rather than the socket 430. The lower simulated trachea 390 includes a lower trachea tube 435 and a lower trachea interface 440 from which the lower trachea tube 435 extends. The lower trachea tube 435 extends through the lower deck plate 425, and is connected thereto, by a lower trachea mounting bracket 445. Similarly, the lower simulated esophagus 395 includes a lower esophagus tube 450 and a lower esophagus interface 455 from which the lower esophagus tube 450 extends. The lower esophagus tube 450 extends through the lower deck plate 425, and is connected thereto, by a lower esophagus mounting bracket 460. In several embodiments, the lower esophagus mounting bracket 460 is integrally formed with the lower trachea mounting bracket 445. The lower hydraulic connector 400, the lower pneumatic connectors 405*a-d*, and the lower electronic multi-connector port 410 each extend through, and are coupled to, the lower deck plate 425. A lower adapter 465 is coupled to the lower anchoring flange 415 of the lower coupling hub 385, as shown in FIGS. 8-12. The lower adapter 465 also extends within, and is coupled to, the simulated neck 110 of the patient simulator 100, as shown in FIGS. 10-12. As a result, the lower adapter 465 couples the lower coupling assembly 295 to the simulated neck 110 of the patient simulator 100.

In operation, the upper coupling hub 300 matingly engages the lower coupling hub 385 (i.e., the socket 430 of the lower coupling hub 385 receives the plug 345 of the upper coupling hub 300) to detachably couple the simulated neck 110 to the simulated torso 115 via the head coupling 140, as shown in FIGS. 10-12. As a result of such mating engagement between the upper coupling hub 300 and the lower coupling hub 385: the upper trachea interface 355 of the upper simulated trachea 305 is aligned with, and matingly engages, the lower trachea interface 440 of the lower simulated trachea 390, as shown in FIG. 10; the upper esophagus interface 370 of the upper simulated esophagus 310 is aligned with, and matingly engages, the lower esophagus interface 455 of the lower simulated esophagus 395, as shown in FIG. 10; the upper hydraulic connector 315 is aligned with, and matingly engages, the lower hydraulic connector 400, as shown in FIG. 11; the upper pneumatic connectors 320*a-d* are aligned with, and matingly engage, the lower pneumatic connectors 405*a-d*, as shown in FIG. 12; and the upper electronic multi-connector port 325 is aligned with, and matingly engages, the lower electronic multi-connector port 410, as shown in FIG. 11.

As a result of the alignment and mating engagement between the upper trachea interface 355 and the lower trachea interface 440, instruments and/or other objects can be passed from the upper simulated trachea 305 to the lower simulated trachea 390, and vice versa, to simulate various patient conditions and procedures (e.g., an intubation procedure). Further, as a result of the alignment and mating engagement between the upper esophagus interface 370 and the lower esophagus interface 455, instruments and/or other objects can be passed from the upper simulated esophagus 310 to the lower simulated esophagus 395, and vice versa, to simulate various patient conditions and procedures. Further still, as a result of the alignment and mating engagement between the upper hydraulic connector 315 and the lower hydraulic connector 400, hydraulic fluid can be passed from the pump 205 contained in the simulated torso 115 to various features/components contained in the simulated neck 110 and/or the simulated head 105 (e.g., circulatory features). Further still, as a result of the alignment and mating engagement between the upper pneumatic connectors 320*a-d* and the lower pneumatic connectors 405*a-d*, pneumatic fluid can be passed from the compressor 210 contained in the simulated torso 115 to various features/components contained in the simulated neck 110 and/or the simulated head 105 (e.g., respiratory features). Finally, as a result of the alignment and mating engagement between the upper electronic multi-connector port 325 and the lower electronic multi-connector port 410, power and/or communication can be passed from the power source 220 and/or the control unit 215 contained in the simulated torso 115 to various features/components contained in the simulated neck 110 and/or the simulated head 105 (e.g., sensors, actuators, etc.).

Figure 13:
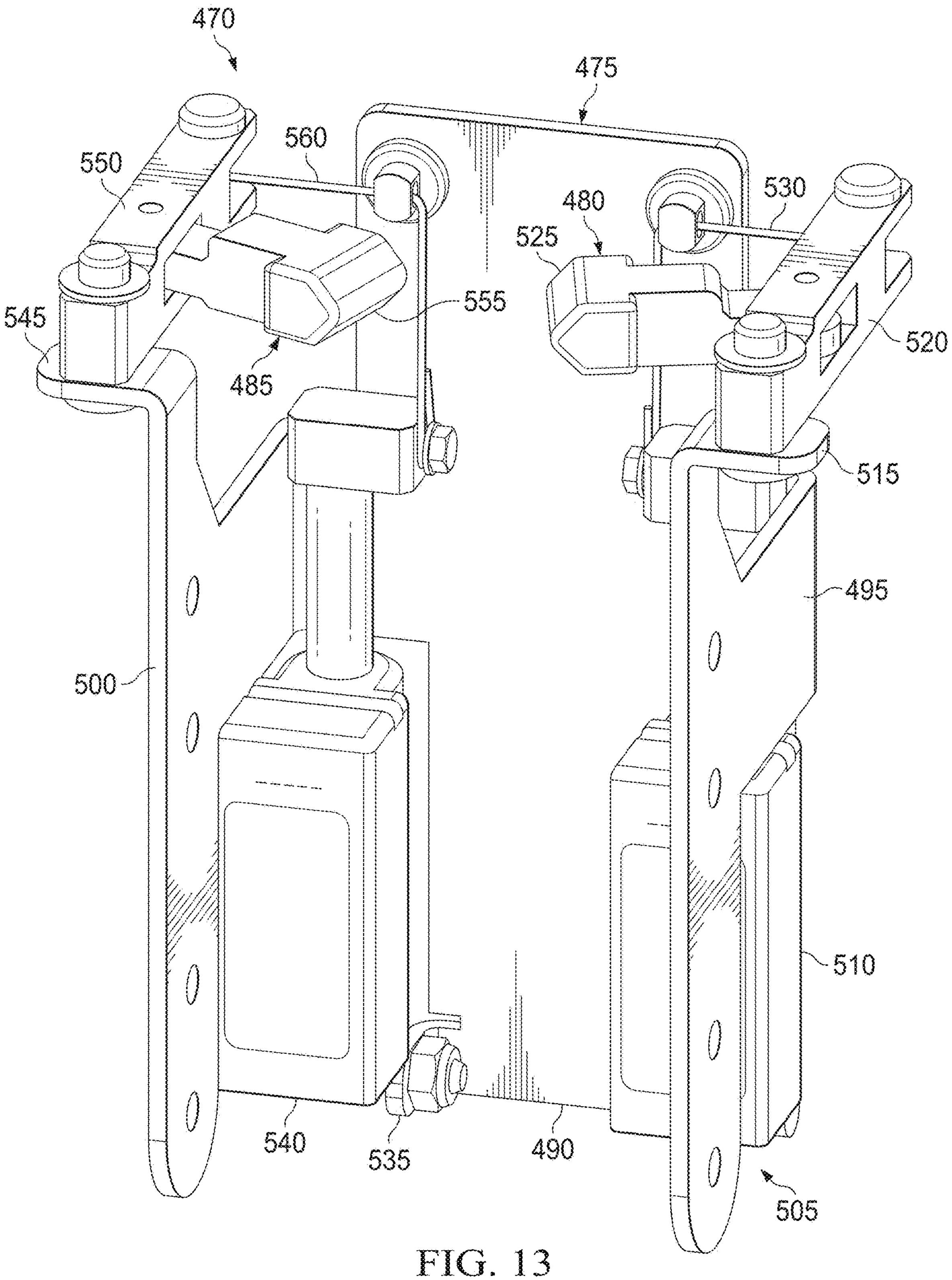
FIG. 13 is a top perspective view of a laryngospasm assembly of FIG. 1's patient simulator, according to one or more embodiments.
Figure 14:
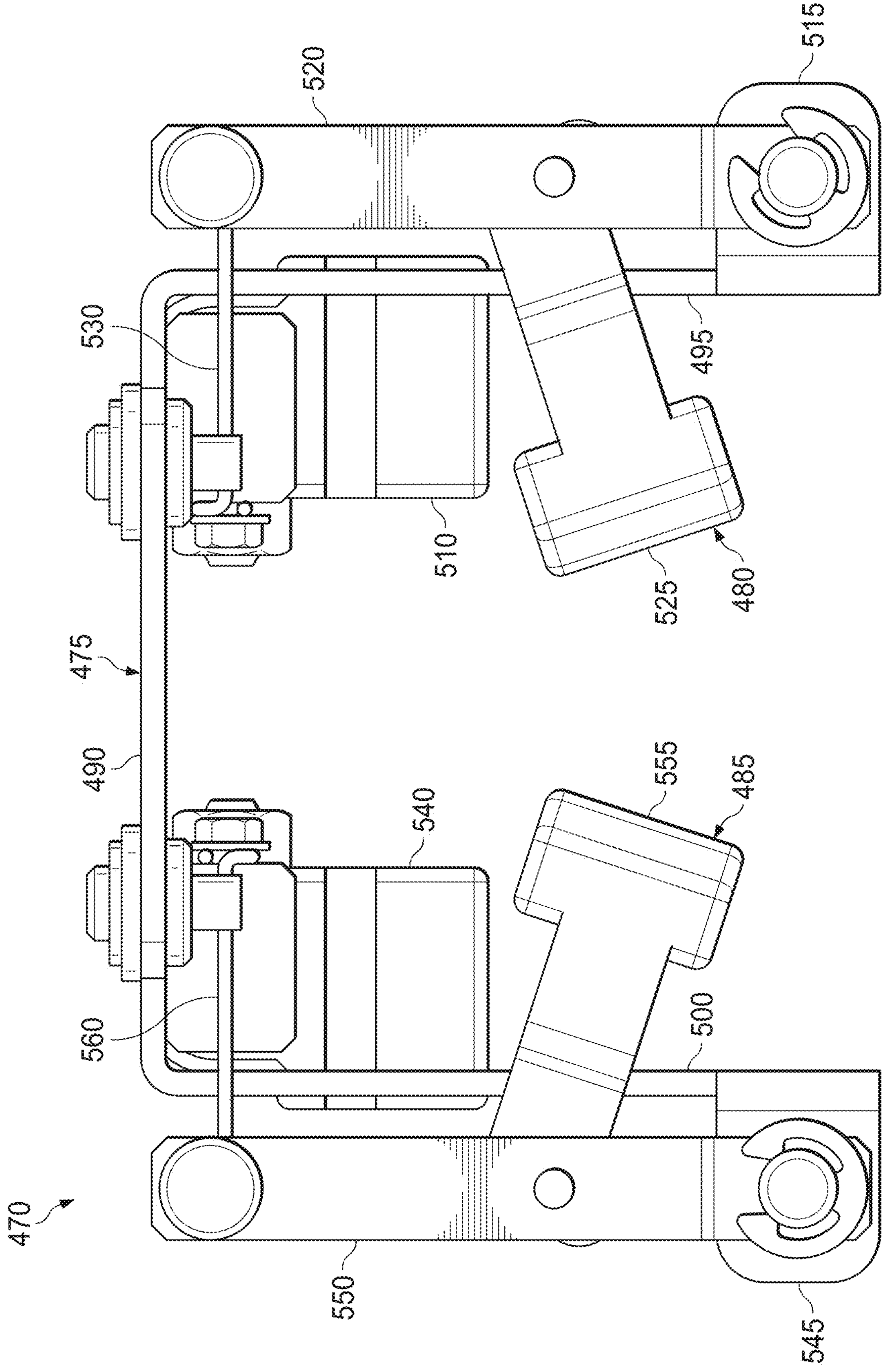
FIG. 14 is a top plan view of FIG. 13's laryngospasm assembly in a first operational state or configuration, according to one or more embodiments.
Figure 15:
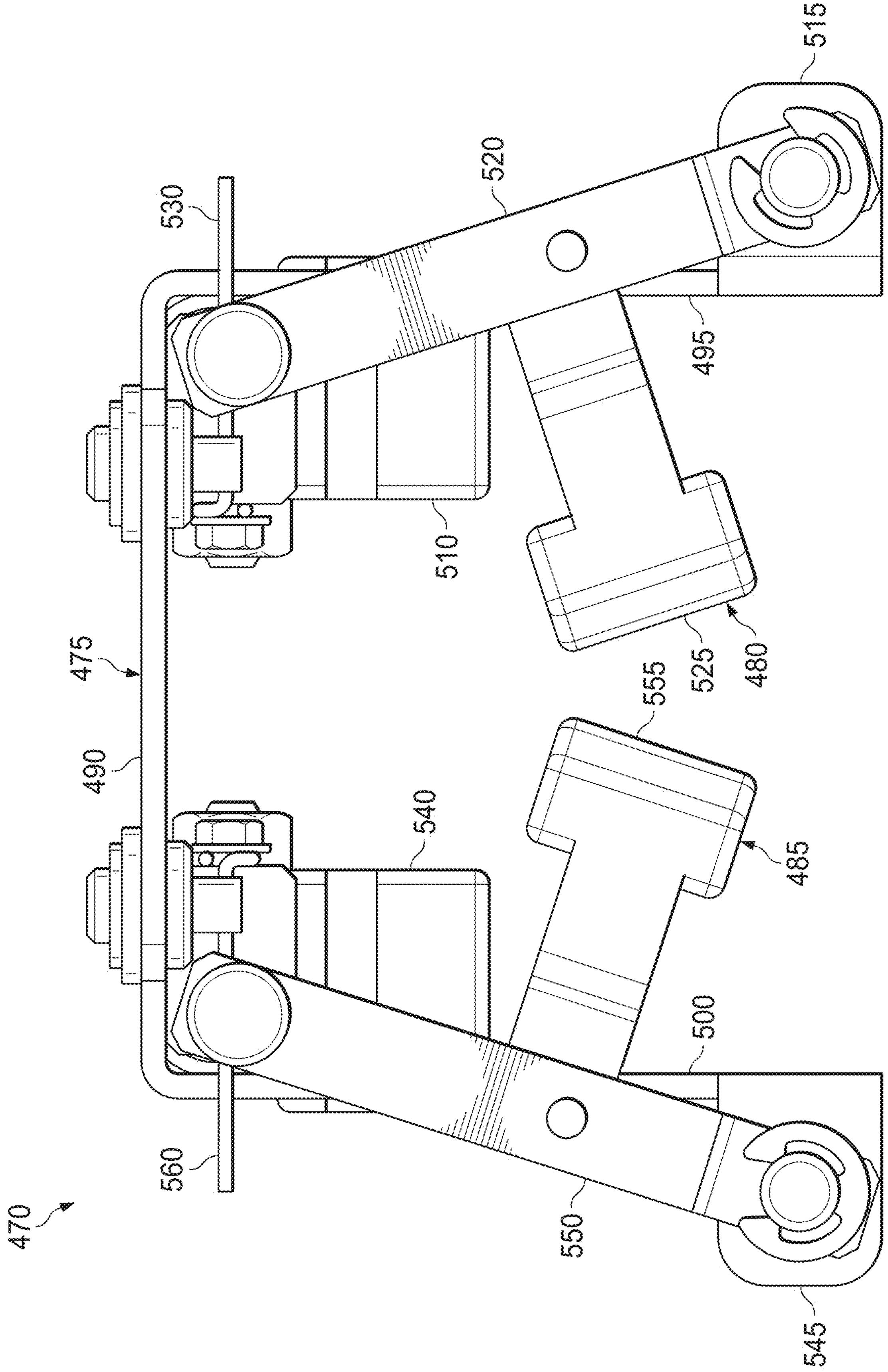
FIG. 15 is a top plan view of FIG. 13's laryngospasm assembly in a second operational state or configuration, according to one or more embodiments.

Referring to FIGS. 13-15, with continuing reference to FIGS. 1 and 10-12, in an embodiment, the patient simulator 100 further includes a laryngospasm assembly 470 contained in the simulated neck 110 proximate the upper simulated trachea 305. The laryngospasm assembly 470 includes a mounting bracket 475, a left vocal cord assembly 480, and a right vocal cord assembly 485. The mounting bracket 475 includes a base plate 490, a left support plate 495, and a right support plate 500. The left support plate 495 extends transversely from the base plate 490. The right support plate 500 extends transversely from the base plate 490, opposite the left support plate 495. As a result, the base plate 490, the left support plate 495, and the right support plate 500, in combination, are generally "U"-shaped. In several embodiments, as in FIGS. 13-15, the left support plate 495 and the right support plate 500 are spaced in a parallel relation.

The base plate 490 includes a left lower mounting tab 505 extending transversely therefrom. The left vocal cord assembly 480 includes a left linear actuator 510 fastened to the left lower mounting tab 505. In several embodiments, the left linear actuator 510 is a hydraulic cylinder; in such instances, the left linear actuator 510 is adapted to receive hydraulic fluid from the pump 205 contained in the simulated torso 115 via the upper and lower hydraulic connectors 315 and 400 of the head coupling 140. Alternatively, in several embodiments, the left linear actuator 510 is a pneumatic cylinder; in such instances, the left linear actuator 510 is adapted to receive pneumatic fluid from the compressor 210 contained in the simulated torso 115 via one or more of the upper and lower pneumatic connectors 320*a-d* and 405*a-d* of the head coupling 140. The left support plate 495 includes a left upper mounting tab 515 extending transversely therefrom. The left vocal cord assembly 480 further includes a left lever arm 520 and a simulated left vocal cord 525 extending transversely from the left lever arm 520. The simulated left vocal cord 525 is pivotably coupled to the left lever arm 520. The left lever arm 520 is pivotably coupled to the left upper mounting tab 515. A left actuator wire 530 couples the left lever arm 520 to the left linear actuator 510. As a result, in operation, actuation of the left linear actuator 510 causes movement of the simulated left vocal cord 525 to simulate laryngospasms in the patient simulator 100.

Similarly, the base plate 490 includes a right lower mounting tab 535 extending transversely therefrom. The right vocal cord assembly 485 includes a right linear actuator 540 fastened to the right lower mounting tab 535. In several embodiments, the right linear actuator 540 is a hydraulic cylinder; in such instances, the right linear actuator 540 is adapted to receive hydraulic fluid from the pump 205 contained in the simulated torso 115 via the upper and lower hydraulic connectors 315 and 400 of the head coupling 140. Alternatively, in several embodiments, the right linear actuator 540 is a pneumatic cylinder; in such instances, the right linear actuator 540 is adapted to receive pneumatic fluid from the compressor 210 contained in the simulated torso 115 via one or more of the upper and lower pneumatic connectors 320*a-d* and 405*a-d* of the head coupling 140. The right support plate 500 includes a right upper mounting tab 545 extending transversely therefrom. The right vocal cord assembly 485 further includes a right lever arm 550 and a simulated right vocal cord 555 extending transversely from the right lever arm 550. The simulated right vocal cord 555 is pivotably coupled to the right lever arm 550. The right lever arm 550 is pivotably coupled to the right upper mounting tab 545. A right actuator wire 560 couples the right lever arm 550 to the right linear actuator 540. As a result, in operation, actuation of the right linear actuator 540 causes movement of the simulated right vocal cord 555 to simulate laryngospasms in the patient simulator 100.

In operation, the actuation of the right linear actuator 540 may be coordinated with the actuation of the left linear actuator 510 to realistically simulate laryngospasms in the patient simulator 100. More particularly, the left lever arm 520 and the right lever arm 550 are pivoted towards, and away from, each other to achieve the intended "squeeze" between the simulated left vocal cord 525 and the simulated right vocal cord 555. At rest, the left lever arm 520 and the right lever arm 550 are in a fully extended position so that the simulated left vocal cord 525 and the simulated right vocal cord 555 are spaced furthest apart from one another, as shown in FIG. 14. When actuated, the left and right linear actuator 540*s* caused the left and right lever arm 550*s* to pivot towards each other until the simulated left vocal cord 525 and the simulated right vocal cord 555 are spaced closest to one another, as shown in FIG. 15. Such actuation realistically simulates the "squeezing" together of the vocal cords during laryngospasms. In several embodiments, the laryngospasm assembly 470 provides a more reliable mechanism in terms of opening/closing the simulated left and right vocal cords 525 and 555 in the intended manner with less stress on the components in a smaller footprint. Existing systems are limited in the amount of closure that can be achieved, require a higher torque load, and take up more physical space within the patient simulator.

Figure 16:
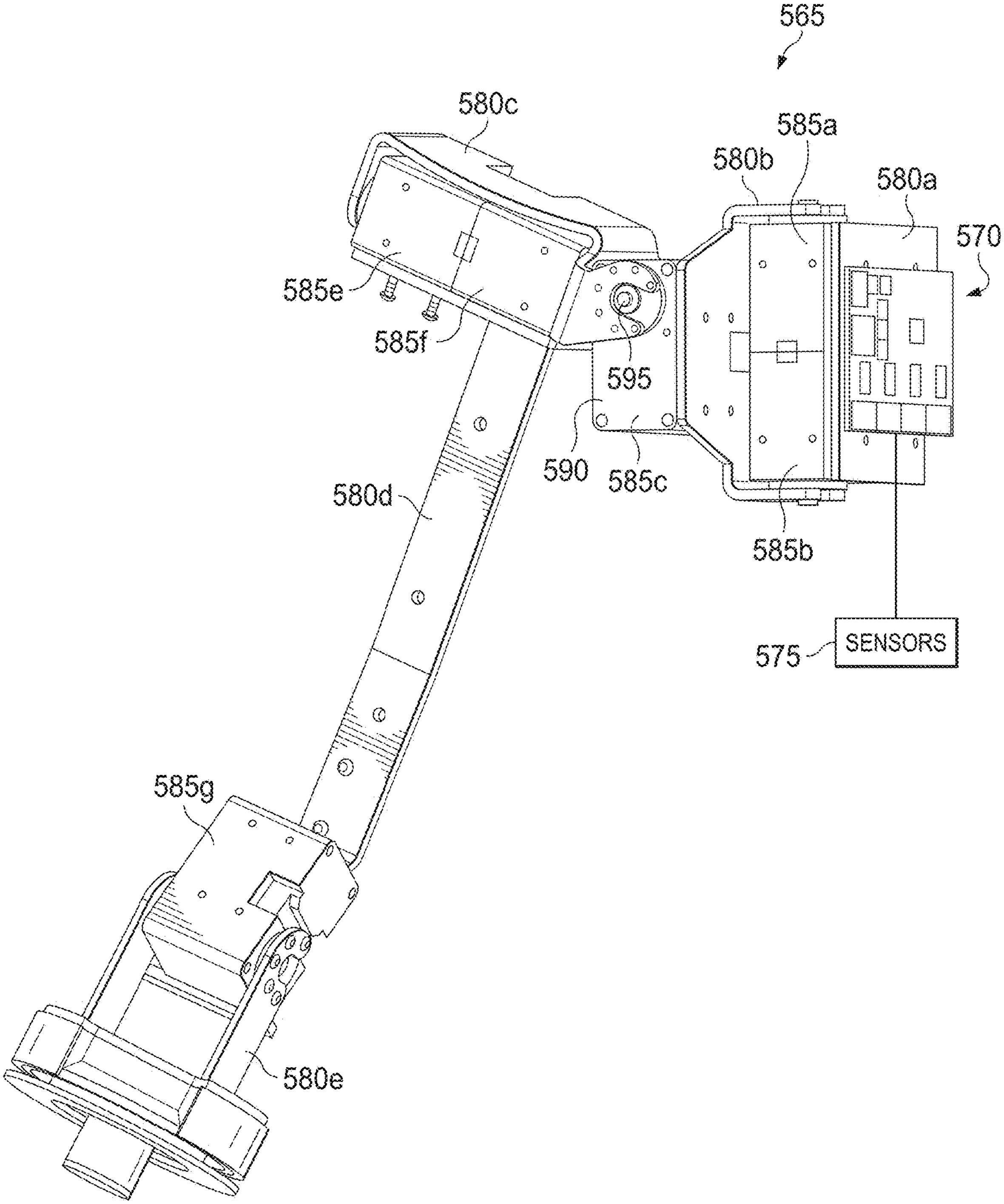
FIG. 16 is a perspective view of an upper right arm assembly of FIG. 1's patient simulator, according to one or more embodiments.
Figure 17:
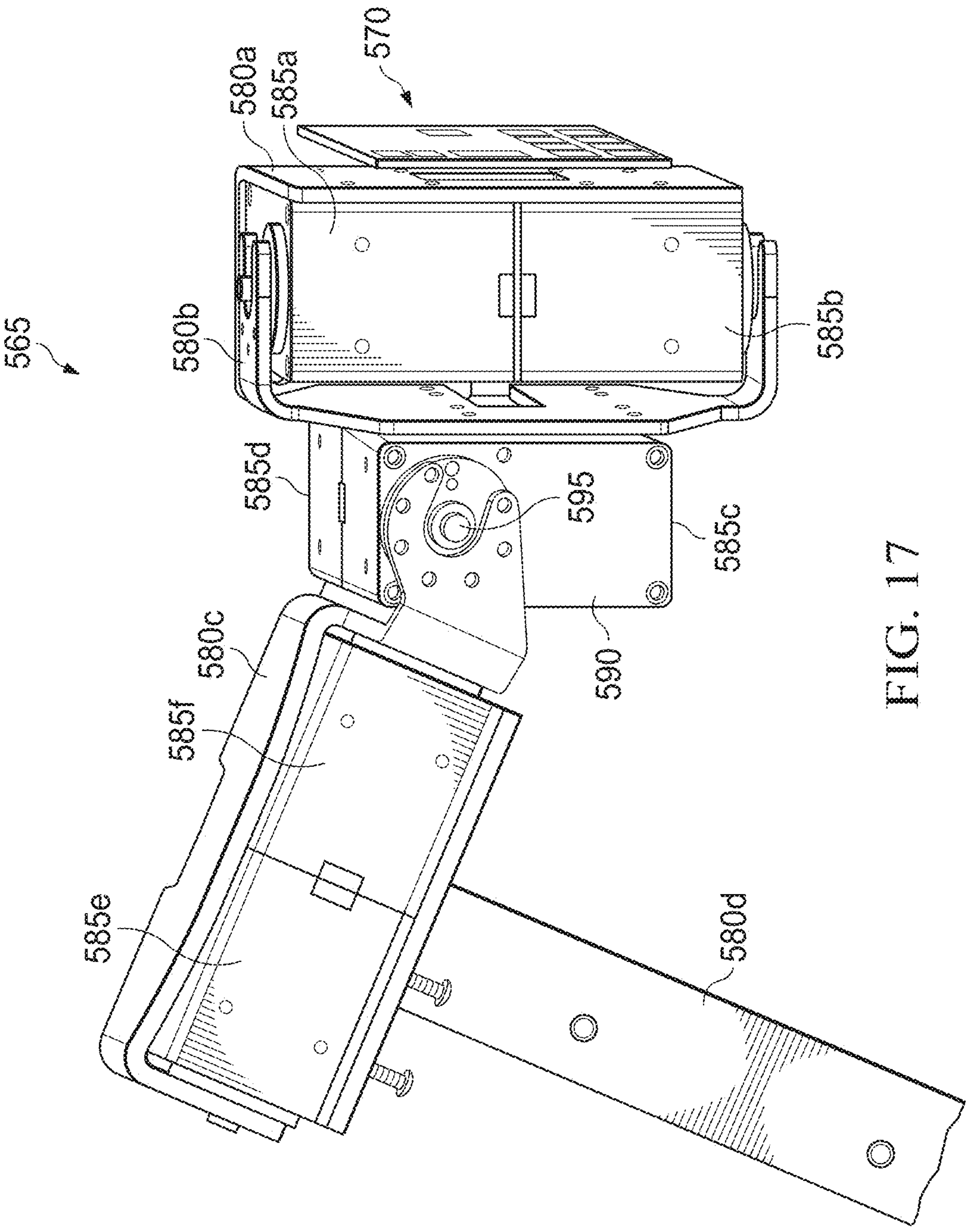
FIG. 17 is a perspective view of a portion of FIG. 16's upper right arm assembly, according to one or more embodiments.
Figure 18:
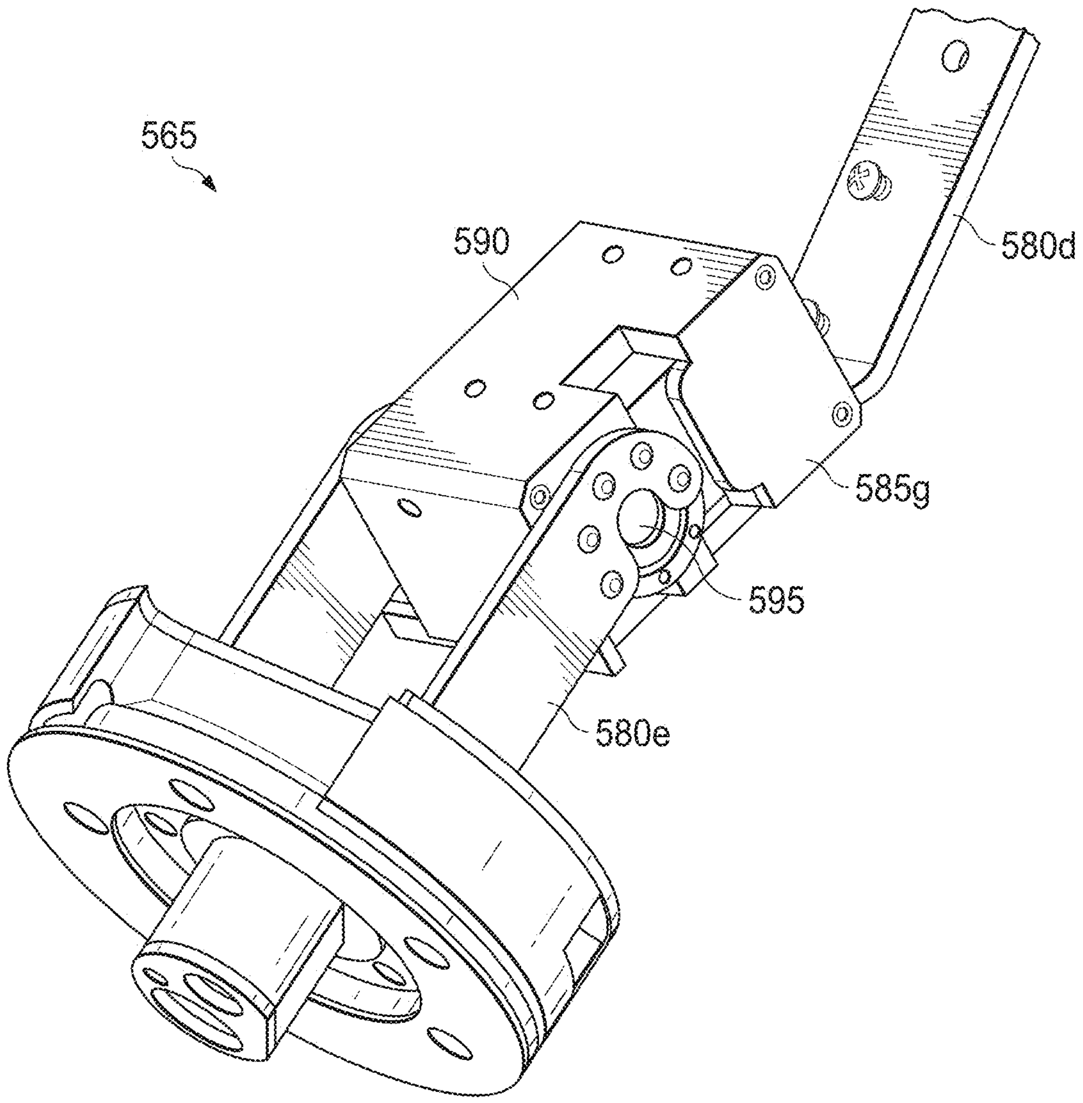
FIG. 18 is a perspective view of another portion of FIG. 16's upper right arm assembly, according to one or more embodiments.

Referring to FIGS. 16-18, with continuing reference to FIG. 1, in an embodiment, the patient simulator 100 further includes an upper right arm assembly 565 contained in the simulated upper right arm 145. The upper right arm assembly 565 may include its own local control unit 570 (e.g., a printed circuit board), which local control unit 570 may communicate with the control unit 215 contained in the simulated torso 115 of the patient simulator 100. Alternatively, the local control unit 570 may be omitted in favor of the control unit 215 to control the upper right arm assembly 565. The patient simulator 100 further includes one or more sensors 575 adapted to communicate with the local control unit 570 (and/or the control unit 215 contained in the simulated torso 115).

The one or more sensors 575 may be located in the patient simulator 100 to detect stimuli applied to the patient simulator 100 during administration of the Glasgow Coma Scale. For example, at least one of the one or more sensors 570 may be located in the trapezoidal region of the patient simulator 100 corresponding to the simulated right arm 120. For another example, the one or more sensors 575 may be contained within the simulated torso 115, the simulated neck 110, the simulated head 105, the simulated left arm 125, the simulated right arm 120, the simulated left leg 135, the simulated right leg 130, or any combination thereof. Based on stimuli applied to the patient simulator 100 and detected by the one or more sensors 575, the upper right arm assembly 565 may be controlled to generate a simulated motor response (detectable during administration of the Glasgow Coma Scale) by producing: internal (medial) rotation of the simulated upper right arm 145; external (lateral) rotation of the simulated upper right arm 145; abduction of the simulated upper right arm 145; adduction of the simulated upper right arm 145; flexion of the simulated upper right arm 145; extension of the simulated upper right arm 145; flexion of the simulated lower right arm 150; extension of the simulated lower right arm 150; or any combination thereof.

In addition to the upper right arm assembly 565 contained in the simulated upper right arm 145, the patient simulator 100 may include an upper left arm assembly contained in the simulated upper left arm 160. In such instances, the structure and operation of the upper left arm assembly are substantially similar to the upper right arm assembly 565. Therefore, in connection with FIGS. 16-18, only the upper right arm assembly 565 is described in detail below; however, the description below applies equally to the upper left arm assembly. Accordingly, the upper left arm assembly may be used in a manner similar to that of the upper right arm assembly 565 to simulate administration of the Glasgow Coma Scale.

The upper right arm assembly 565 includes brackets 580*a-e*, and rotary actuators 585*a-g*. The rotary actuators 585*a-g* each include an actuator housing 590 and an output shaft 595. The respective actuator housings of the rotary actuators 585*a-b* are coupled to the bracket 580*a* so that their respective output shafts 595 extend in opposing directions (e.g., coaxially). For example, the rotary actuators 585*a-b* may be Dynamixel® X540 servo motors. The bracket 580*b* is coupled to the respective output shafts 595 of the rotary actuators 585*a-b*. The rotary actuators 585*a-b*, in combination, are adapted to pivot the bracket 580*b* relative to the bracket 580*a* to produce internal (medial) rotation and external (lateral) rotation of the simulated upper right arm 145. The respective actuator housings 590 of the rotary actuators 585*c-d* are coupled to the bracket 580*b* so that their respective output shafts 595 extend in opposing directions (e.g., coaxially). For example, the rotary actuators 585*c-d* may be Dynamixel® X540 servo motors. The bracket 580*c* is coupled to the respective output shafts 595 of the rotary actuators 585*c-d*. The rotary actuators 585*c-d*, in combination, are adapted to pivot the bracket 580*c* relative to the bracket 580*b* to produce abduction and adduction of the simulated upper right arm 145.

The bracket 580*c* is also coupled to the respective output shafts 595 of the rotary actuators 585*e-f*. For example, the rotary actuators 585*e-f* may be Dynamixel® X540 servo motors. The respective actuator housings 590 of the rotary actuators 585*e-f* are coupled to the bracket 580*d* so that their respective output shafts 595 extend in opposing directions (e.g., coaxially). The rotary actuators 585*e-f*, in combination, are adapted to pivot the bracket 580*d* relative to the bracket 580*c* to produce flexion and extension of the simulated upper right arm 145. The actuator housing 590 of the rotary actuator 585*g* is coupled to the bracket 580*d*. For example, the rotary actuator 585*g* may be a Dynamixel® X540 servo motor. The output shaft 595 of the rotary actuator 585*g* is coupled to the bracket 580*e*. The rotary actuator 585*g* is adapted to pivot the bracket 580*e* relative to the bracket 580*d* to produce flexion and extension of the simulated lower right arm 150 of the patient simulator 100.

Figure 19:
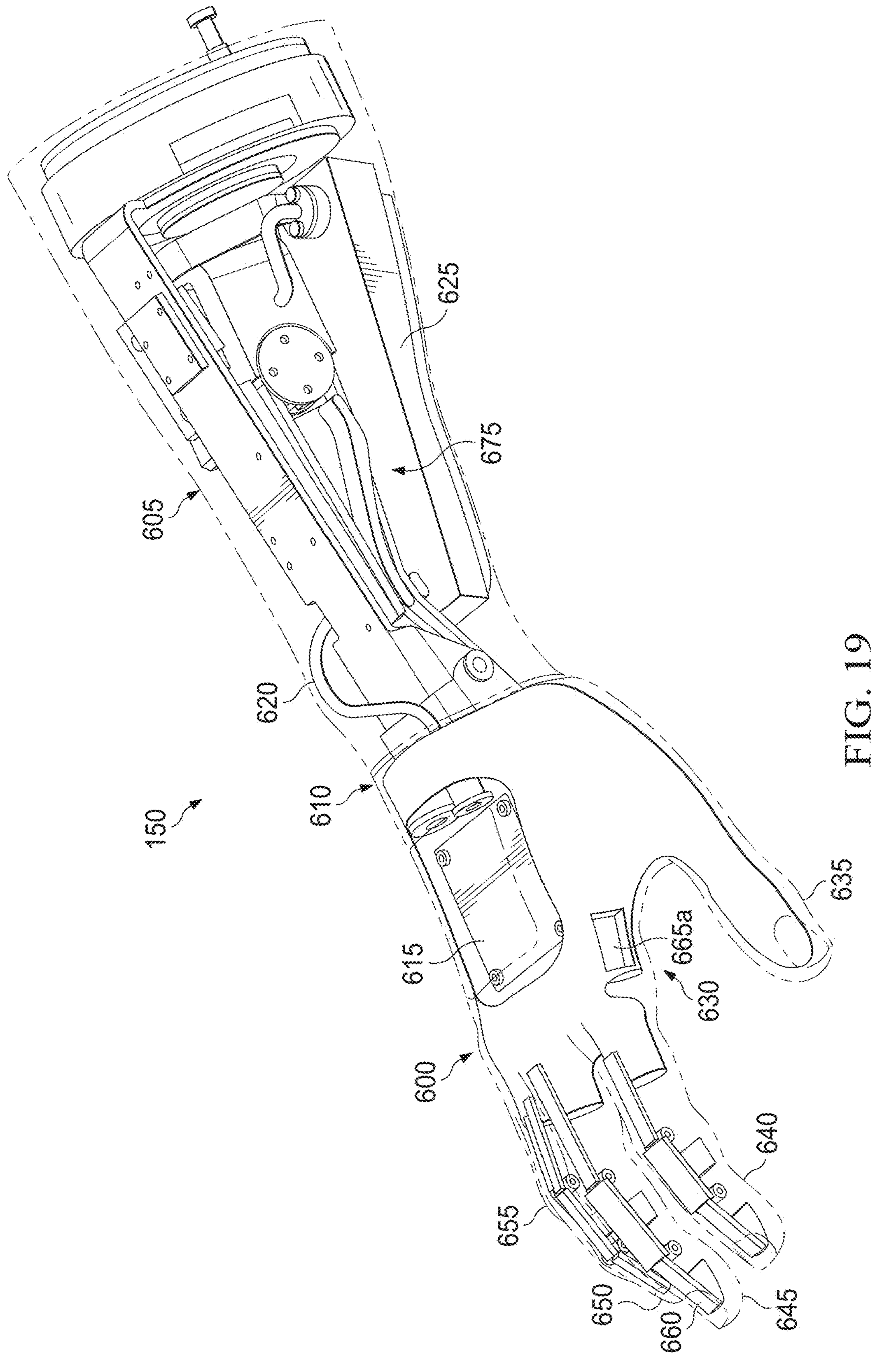
FIG. 19 is a top perspective view of a simulated lower right arm of FIG. 1's simulated right arm, according to one or more embodiments.
Figure 20:
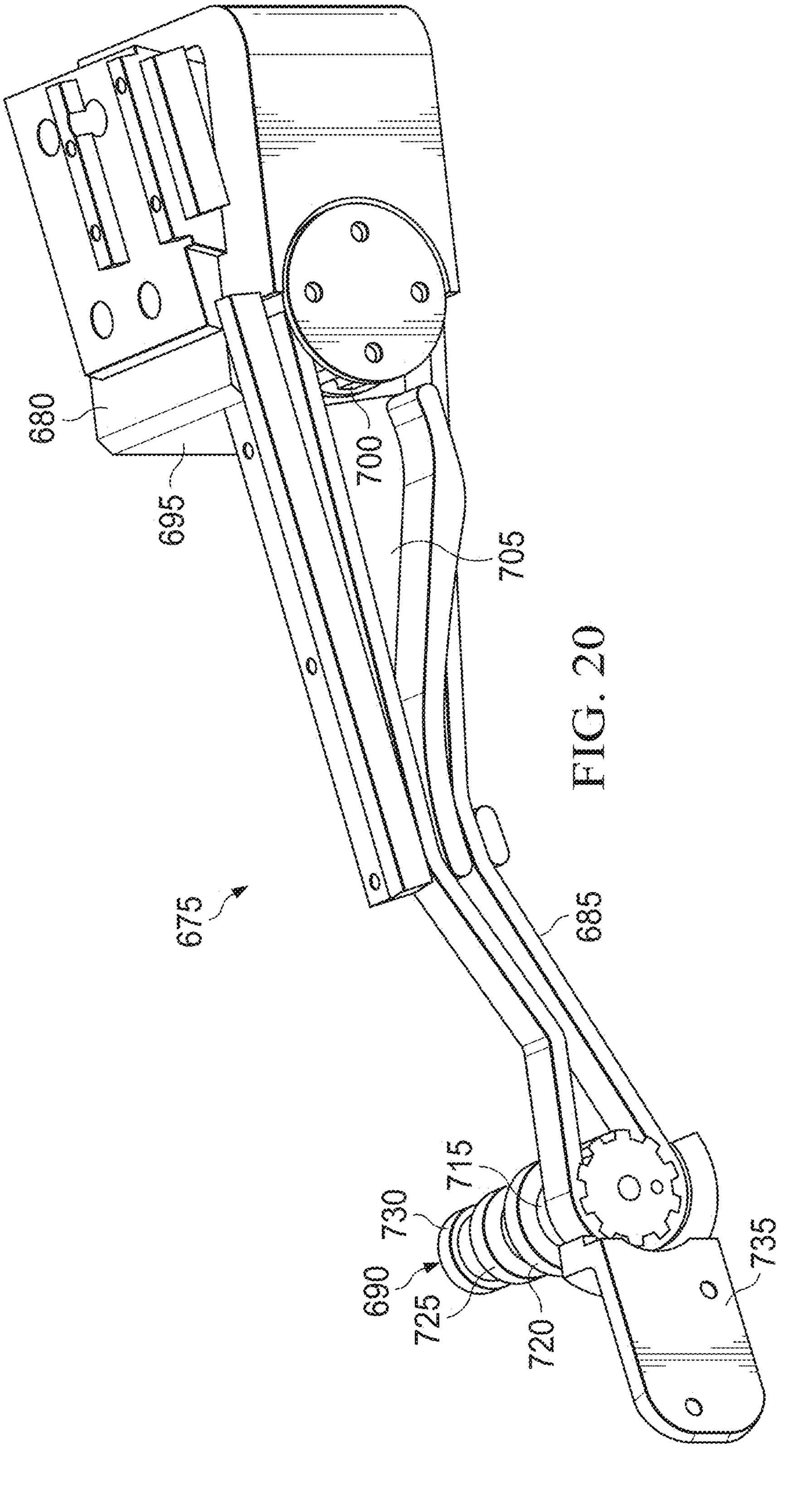
FIG. 20 is a top perspective view of an articulation assembly of FIG. 19's simulated lower right arm, according to one or more embodiments.
Figure 21:
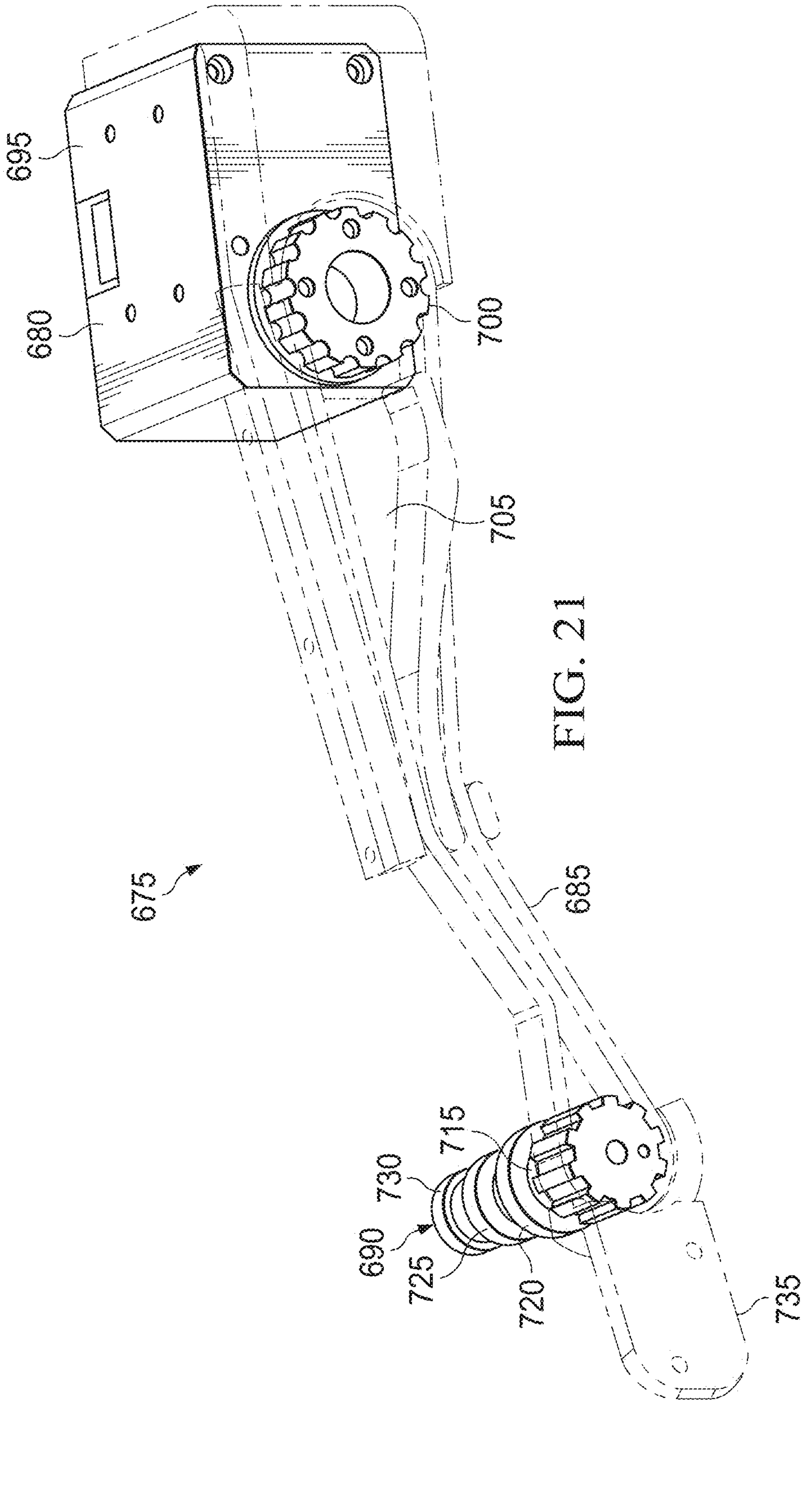
FIG. 21 is a top perspective view of the articulation assembly of FIG. 19's simulated lower right arm similar to that shown in FIG. 20, except several features/components of the articulation assembly are shown translucently, according to one or more embodiments.
Figure 22:
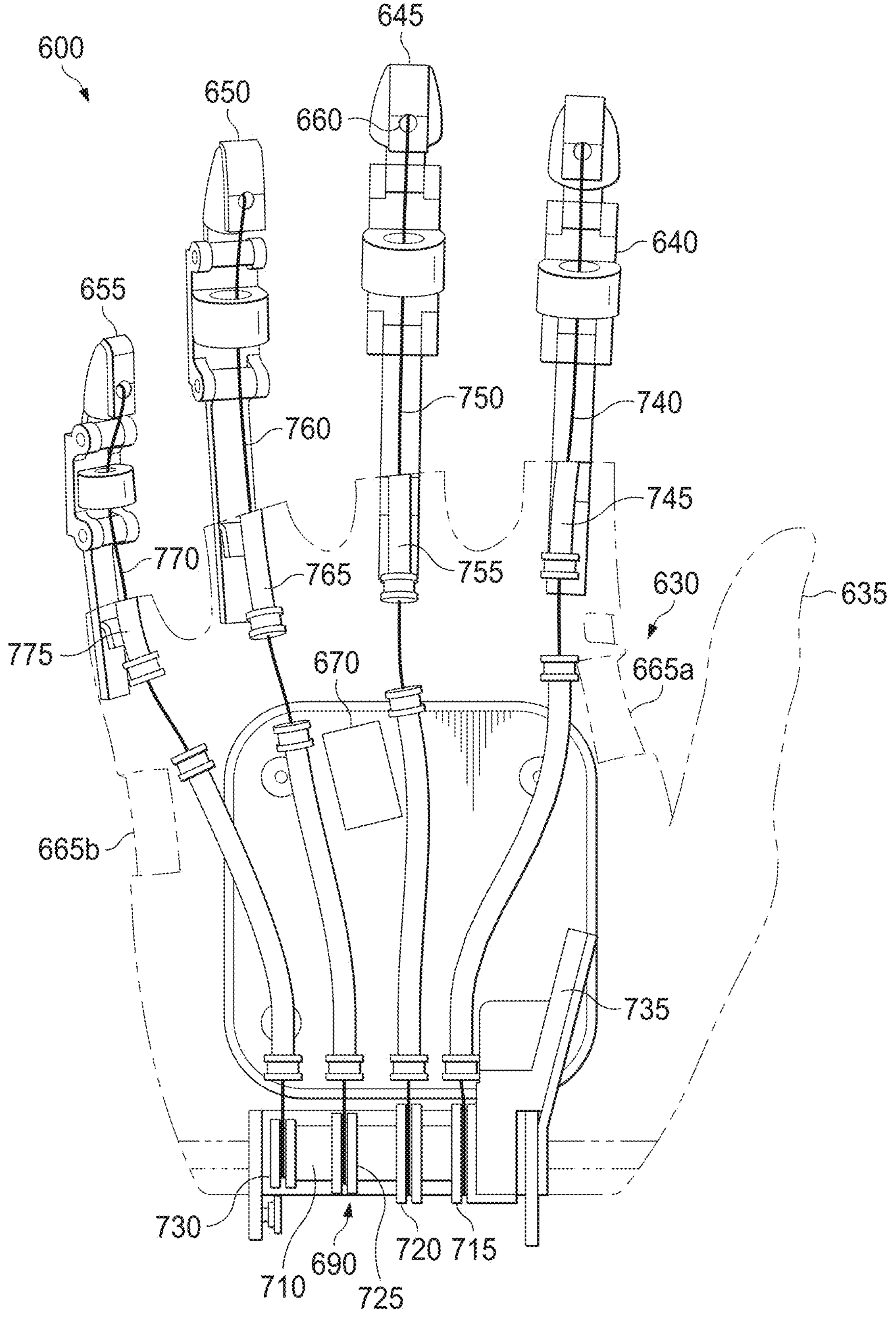
FIG. 22 is a top plan view of a simulated right hand of FIG. 19's simulated lower right arm, according to one or more embodiments.
Figure 23:
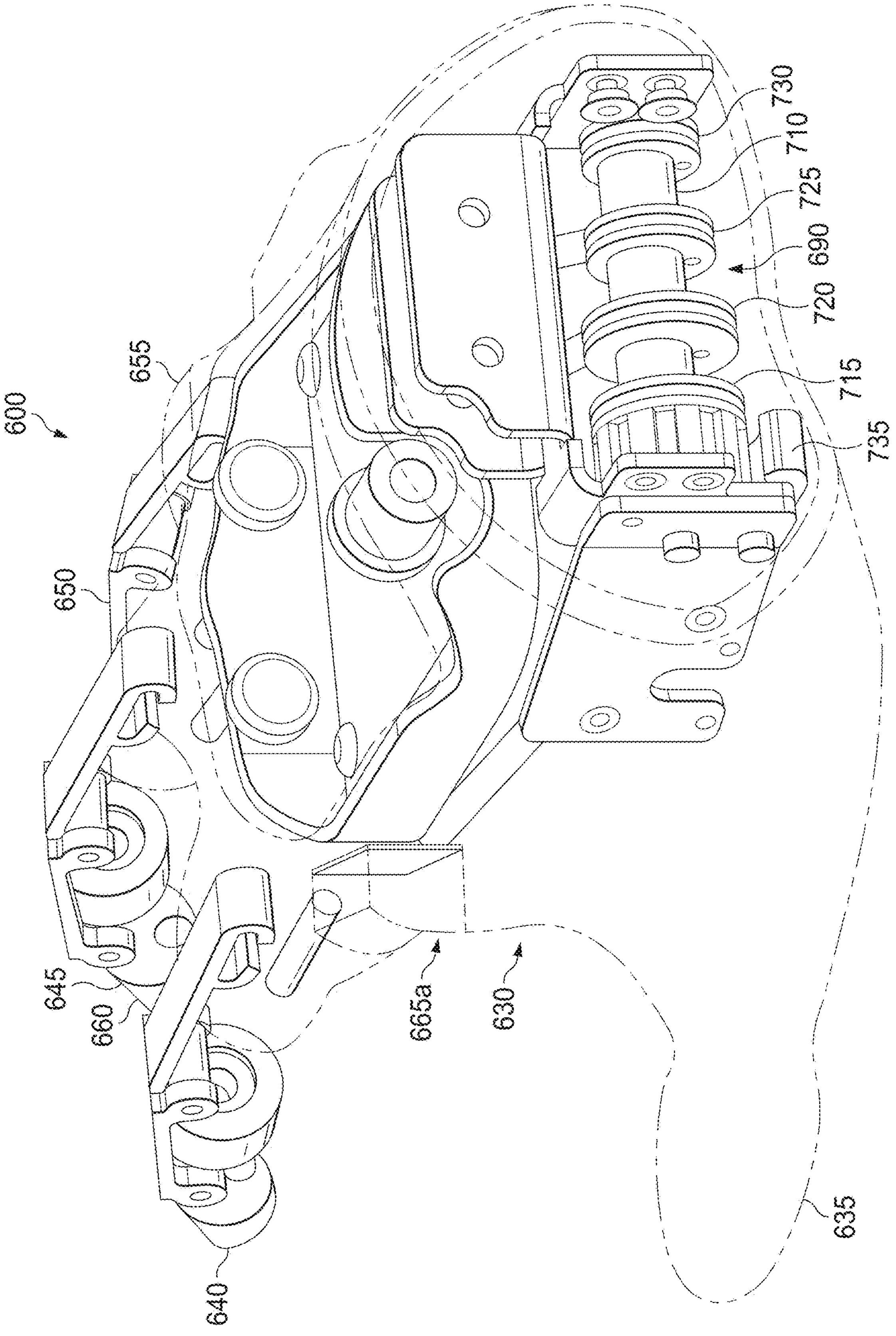
FIG. 23 is a perspective view of FIG. 22's simulated right hand, according to one or more embodiments.

Referring to FIGS. 19-23, with continuing reference to FIG. 1, in an embodiment, the simulated lower right arm 150 includes a simulated right hand 600 coupled to a simulated right forearm 605 via a simulated right wrist 610 (shown in FIG. 19). The simulated lower right arm 150 may also include a disposable insert 615, a fluid conduit 620, and a fluid reservoir 625. The disposable insert 615 is insertable on top of the simulated right hand 600 and is adapted to communicate with the fluid reservoir 625 via the fluid conduit 620. The fluid reservoir 625 is contained in the simulated right forearm 605. The disposable insert 615, the fluid reservoir 625, and the fluid conduit 620, in combination, are operable to simulate various procedures (e.g., administering intravenous or "IV" therapy, drawing blood, etc.). The simulated right hand 600 includes a simulated right palm 630, a simulated right thumb 635, a simulated right index finger 640, a simulated right middle finger 645, a simulated right ring finger 650, and a simulated right pinky finger 655.

A pinch sensor 660 may be embedded in the simulated right middle finger 645 (or another simulated finger); in some instances, the pinch sensor 660 is, includes, or is part of the one or more sensors 575 utilized to detect stimuli applied to the patient simulator 100 during administration of the Glasgow Coma Scale, as discussed above in connection with the upper right arm assembly 565. A side sensor 665*a* may be embedded into the simulated right hand 600 between the simulated right index finger 640 and the simulated right thumb 635. For example, the side sensor 665*a* may be a light sensor. In addition, or instead, a second side sensor 665*b* is embedded into the simulated right hand 600, opposite the side sensor 665*a*, between the simulated right pinky finger 655 and the simulated right wrist 610. For example, the second side sensor 665*b* may be a light sensor. In addition, or instead, a palm sensor 670 may be embedded into the simulated right palm 630. For example, the palm sensor 670 may be a light sensor. In operation, the side sensor 665*a*, the second side sensor 665*b*, the palm sensor 670, or any combination thereof may be utilized to detect when a handshake is made with the simulated right hand 600.

An articulation assembly 675 is contained in the simulated lower right arm 150. The articulation assembly 675 includes a rotary actuator 680, a belt drive 685, and a pulley device 690. The belt drive 685 is coupled to both the rotary actuator 680 and the pulley device 690. The rotary actuator 680 includes an actuator housing 695 and an output shaft 700. For example, the rotary actuator 680 may be a Dynamixel® X540 servo motor. The rotary actuator 680 may be contained in the simulated right forearm 605. The belt drive 685 is coupled to the output shaft 700 of the rotary actuator 680. The actuator housing 695 of the rotary actuator 680 is coupled to a bracket 705, which bracket 705 is adapted to guide the belt drive 685 between the output drive of the rotary actuator 680 and the pulley device 690. The pulley device 690 includes a shaft 710, an index pulley 715, a middle pulley 720, a ring pulley 725, and a pinky pulley 730. The pulley device 690 may be contained in the simulated right hand 600, the simulated right wrist 610, or both. The belt drive 685 is coupled to the shaft 710 of the pulley device 690. The belt drive 685 also engages a bracket 735. The bracket 735 may be contained in the simulated right hand 600, the simulated right wrist 610, or both.

The index pulley 715 is fixed to the shaft 710 of the pulley device 690. An index wire 740 is coupled to both the index pulley 715 and a distal portion of the simulated right index finger 640. The index wire 740 is guided between the index pulley 715 and the distal portion of the simulated right index finger 640 by an index sheath 745. Further, the middle pulley 720 is fixed to the shaft 710 of the pulley device 690. A middle wire 750 is coupled to both the middle pulley 720 and a distal portion of the simulated right middle finger 645. The middle wire 750 is guided between the middle pulley 720 and the distal portion of the simulated right middle finger 645 by a middle sheath 755. Further still, the ring pulley 725 is fixed to the shaft 710 of the pulley device 690. A ring wire 760 is coupled to both the ring pulley 725 and a distal portion of the simulated right ring finger 650. The ring wire 760 is guided between the ring pulley 725 and the distal portion of the simulated right ring finger 650 by a ring sheath 765. Finally, the pinky pulley 730 is fixed to the shaft 710 of the pulley device 690. A pinky wire 770 is coupled to both the pinky pulley 730 and a distal portion of the simulated right pinky finger 655. The pinky wire 770 is guided between the pinky pulley 730 and the distal portion of the simulated right pinky finger 655 by a pinky sheath 775.

In operation, the rotary actuator 680 rotates its output shaft 700 to drive the belt drive 685; as a result, the belt drive 685 rotates the shaft 710 of the pulley device 690 and displaces the bracket 735. Rotating the shaft 710 of the pulley device 690 also rotates the index pulley 715, the middle pulley 720, the ring pulley 725, and the pinky pulley 730. As a result: the index pulley 715 pulls on the index wire 740 to produce flexion or extension of the simulated right index finger 640; the middle pulley 720 pulls on the middle wire 750 to produce flexion or extension of the simulated right middle finger 645; the ring pulley 725 pulls on the ring wire 760 to produce flexion or extension of the simulated right ring finger 650; and the pinky pulley 730 pulls on the pinky wire 770 to produce flexion or extension of the simulated right pinky finger 655. In several embodiments, as in Figures the index pulley 715, the middle pulley 720, the ring pulley 725, and the pinky pulley 730 are sized and/or shaped (e.g., differently) so that the flexion and extension of the simulated right index finger 640, the simulated right middle finger 645, the simulated right ring finger 650, and the simulated right pinky finger 655, respectively, occur together to realistically mimic gripping and releasing by a human hand. In addition to rotating the shaft 710 of the pulley device 690, the belt drive 685 displaces the bracket 735 to produce flexion or extension of the simulated right wrist 610.

Figure 24:
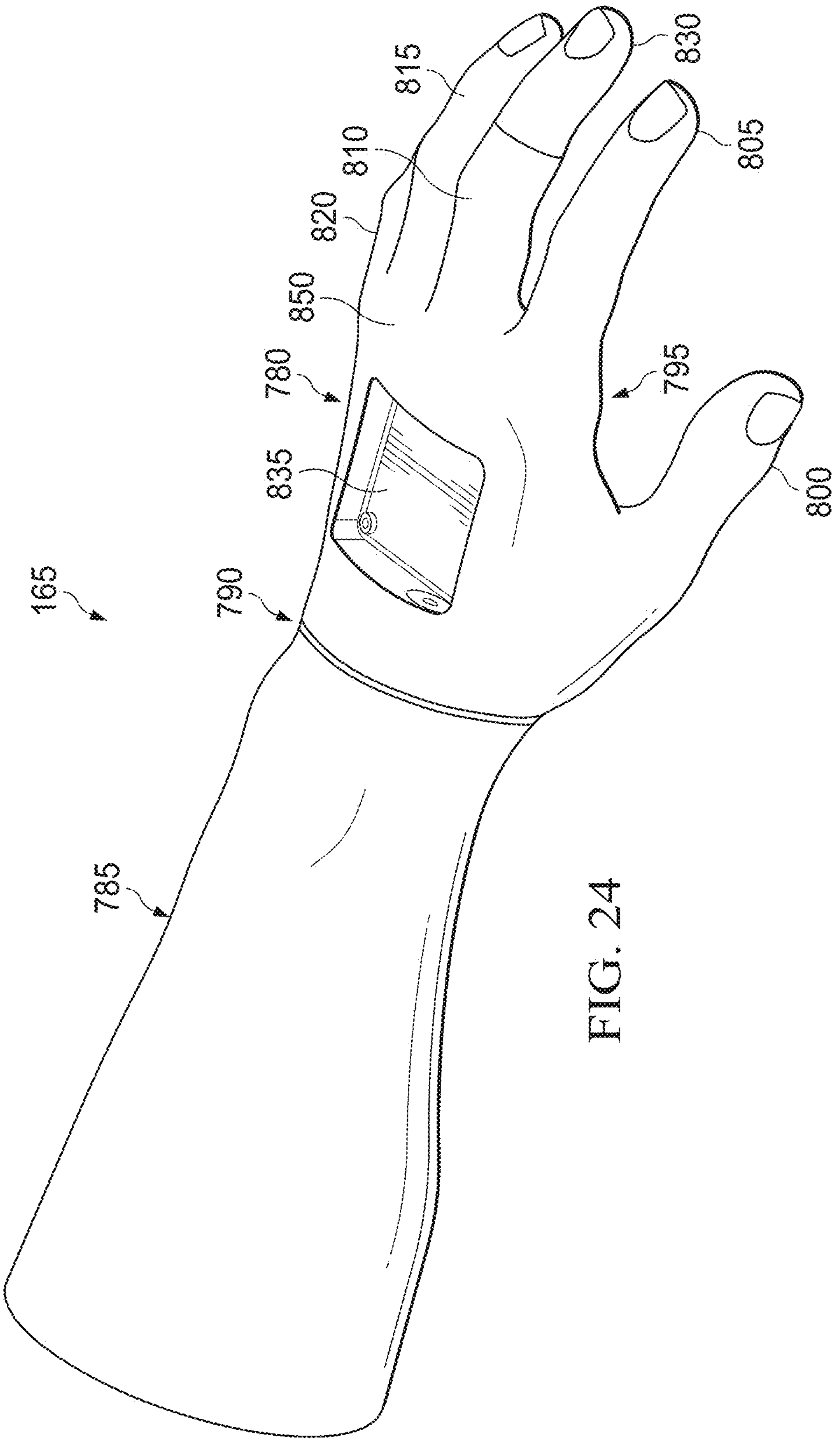
FIG. 24 is a top perspective view of a simulated lower left arm of FIG. 1's simulated left arm, according to one or more embodiments.
Figure 25:
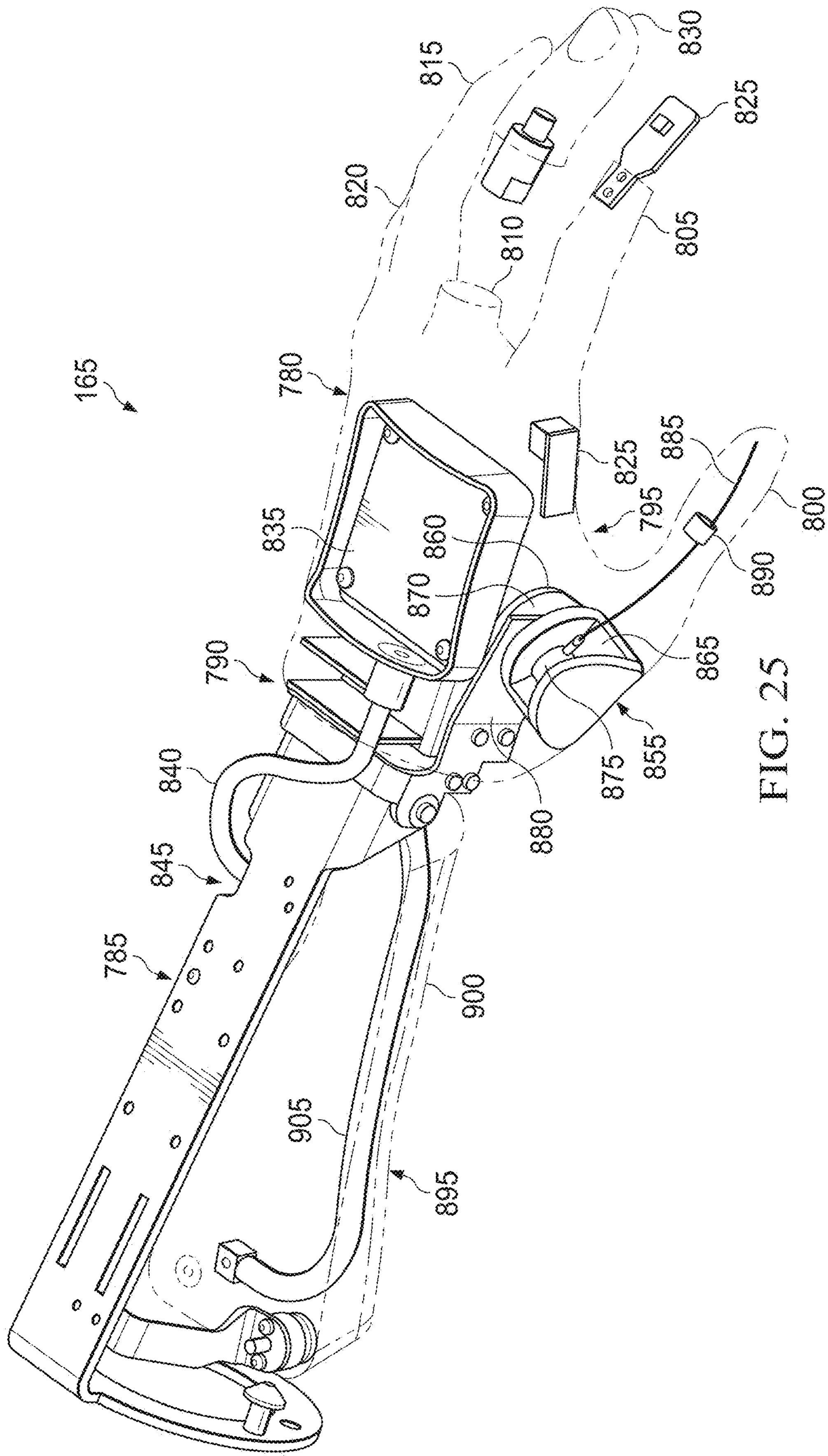
FIG. 25 is a top perspective view of FIG. 24's simulated lower left with a simulated skin removed, according to one or more embodiments.
Figure 26:
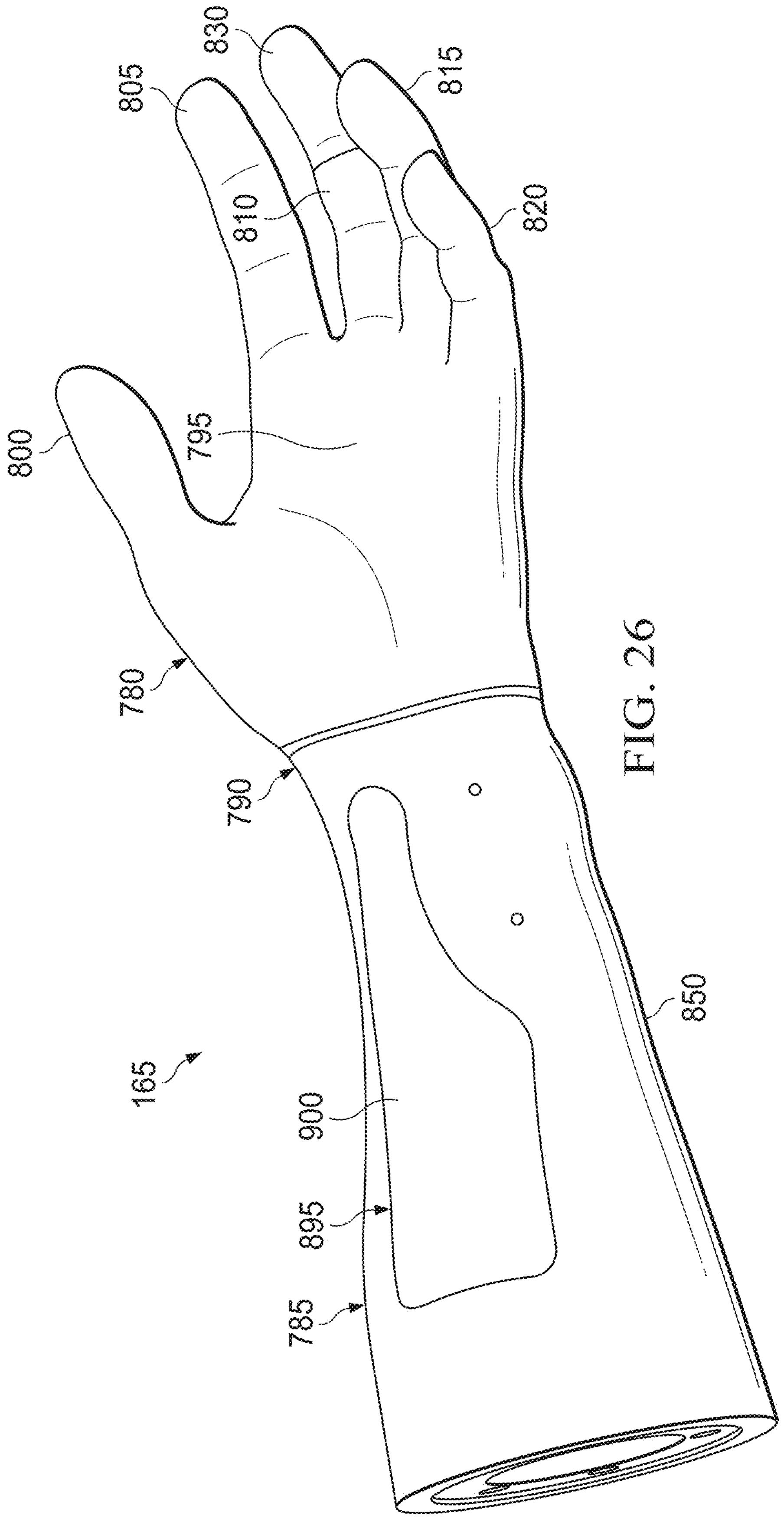
FIG. 26 is a bottom perspective view of FIG. 24's simulated lower left arm, according to one or more embodiments.
Figure 27:
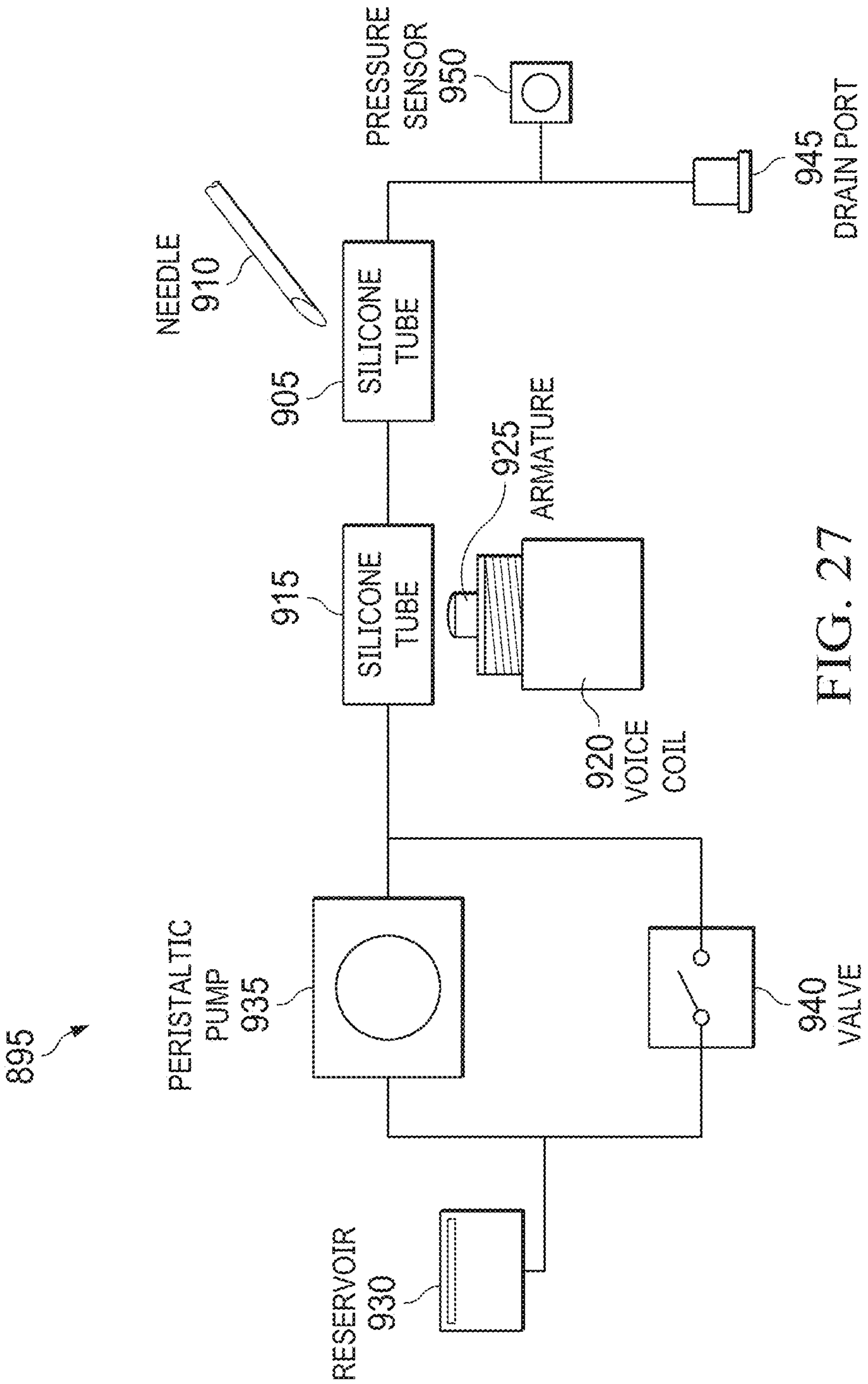
FIG. 27 is a diagrammatic illustration of an invasive blood pressure (IBP) assembly of FIG. 26's simulated lower left arm, according to one or more embodiments.

Referring to FIGS. 24-28, with continuing reference to FIG. 1, in an embodiment, the simulated lower left arm 165 includes a simulated left hand 780 coupled to a simulated left forearm 785 via a simulated left wrist 790 (shown in FIGS. 24 and 25). The simulated left hand 780 includes a simulated left palm 795, a simulated left thumb 800, a simulated left index finger 805, a simulated left middle finger 810, a simulated left ring finger 815, and a simulated left pinky finger 820. The simulated left index finger 805 may include OSAT features/components 825 detectable by a medical trainee using a pulse oximeter. The simulated left middle finger 810 may include a detachable tip 830 having a reservoir containing simulated blood for the purpose of simulating blood glucose monitoring (e.g., via a finger prick). In several embodiments, the detachable tip 830 is described in U.S. patent application Ser. No. 16/242,700 (the "'700 application"), filed Jan. 8, 2019, which claims the benefit of the filing date of, and priority to, U.S. Patent Application No. 62/617,020, filed Jan. 12, 2018, the entire disclosures of which are hereby incorporated herein by reference. The simulated lower left arm 165 may also include a disposable insert 835, a fluid conduit 840, and a fluid reservoir 845 (not visible in FIG. 25). In several embodiments, the disposable insert 835, the fluid conduit 840, and the fluid reservoir 845 of the simulated lower left arm 165 are substantially similar to the disposable insert 615, the fluid conduit 620, and the fluid reservoir 625 of the simulated lower right arm 150; therefore, the disposable insert 835, the fluid conduit 840, and the fluid reservoir 845 of the simulated lower left arm 165 will not be described in further detail. The simulated lower left arm 165 may also include simulated skin 850 into which one or more optical fibers may be embedded to provide dynamic skin color control (e.g., to simulate cyanosis). For example, the one or more optical fibers may be embedded into the simulated left hand 780 proximate the knuckles. In several embodiments, the one or more optical fibers embedded into the simulated skin 850 of the simulated lower left arm 165 are substantially similar to the one or more optical fibers 270 embedded into the simulated skin 265 of the simulated head 105; therefore, the one or more optical fibers embedded into the simulated skin 850 of the simulated lower left arm 165 will not be described in further detail.

A thumb twitch assembly 855 is contained in the simulated lower left arm 165. The thumb twitch assembly 855 includes a rotary actuator 860 and an eccentric pulley 865. The rotary actuator 860 includes an actuator housing 870 and an output shaft 875. For example, the rotary actuator 860 may be a Dynamixel® X540 servo motor. The rotary actuator 860 may be contained in the simulated left hand 780, proximate the simulated left thumb 800. The actuator housing 870 of the rotary actuator 860 is coupled to an bracket 880 contained in the simulated left hand 780. The eccentric pulley 865 is fixed to the output shaft 875 of the rotary actuator 860. The eccentric pulley 865 is fixed to output shaft 875 of the rotary actuator 860. A thumb wire 885 is coupled to both the eccentric pulley 865 and a distal portion of the simulated left thumb 800. The thumb wire 885 may be guided between the eccentric pulley 865 and the distal portion of the simulated left thumb 800 by a thumb sheath 890. In operation, the rotary actuator 860 rotates its output shaft 875 to rotate the eccentric pulley 865. As a result, the eccentric pulley 865 pulls on the thumb wire 885 to produce flexion or extension of the simulated left thumb 800; in some instances, the flexion or extension of the simulated left thumb 800 may be controlled to simulate a motor response (e.g., twitching) to stimuli detected by the one or more sensors 575 during administration of the Glasgow Coma Scale, as discussed above in connection with the upper right arm assembly 565 and the simulated right hand 600.

An invasive blood pressure (IBP) assembly 895 is also contained the simulated lower left arm 165 to simulate an IBP procedure, which IBP procedure is used in human patients to measure the arterial blood pressure in the human body. More particularly, the IBP procedure includes inserting a needle filled with saline solution into the artery and transmitting pressure from the artery to an external monitor; as a result, variations of the pressure (systolic and diastolic pressure) from the artery are transmitted through the needle to the monitor. The IBP assembly 895 simulates these variations in blood pressure to emulate a pulsatile human artery so that medical trainees can insert a needle and read the "blood pressure" in the patient simulator 100. In this regard, the IBP assembly 895 allows users to set pulse rate, systolic pressure, and diastolic pressure, as described in further detail below. The IBP assembly 895 includes an insert 900 in the simulated left forearm 785. A silicone tube 905 into which a needle 910 is insertable is embedded into the insert 900 to simulate an artery in the simulated left forearm 785. In addition to, or instead of, the silicone tube 905, the insert 900 may include a drug recognition module, which uses RFID or another identifier in a syringe, pill/pill bottle, or other drug dispensing mechanism to identify the type of drug and/or dosage being administered to the patient simulator 100. The patient simulator 100 can then simulate corresponding responses to the drug/dosage. A silicone tube 915 is adapted to communicate fluid to the silicone tube 905. In several embodiments, the silicone tubes 905 and 915 are integrally formed. A voice coil 920 is adapted to contact the silicone tube 915. More particularly, the voice coil 920 includes an armature 925 adapted to contact the silicone tube 915. The IBP assembly 895 also includes a fluid reservoir 930 adapted to be filled with artificial blood. A pump 935 is adapted to communicate fluid from the fluid reservoir 930 to the silicone tube 915. In several embodiments, the pump 935 is a peristaltic pump. In several embodiments, the pump 935 is a reversible peristaltic pump. A valve 940 is openable to communicate fluid from the fluid reservoir 930 to the silicone tube 915, bypassing the pump 935. A drain port 945 is adapted to receive fluid from the silicone tube 905. More particularly, the silicone tube 905 is adapted to communicate fluid from the silicone tube 915 to the drain port 945. A pressure sensor 950 is adapted to detect pressure of the fluid communicated from the silicone tube 905 to the drain port 945.

Figure 28:
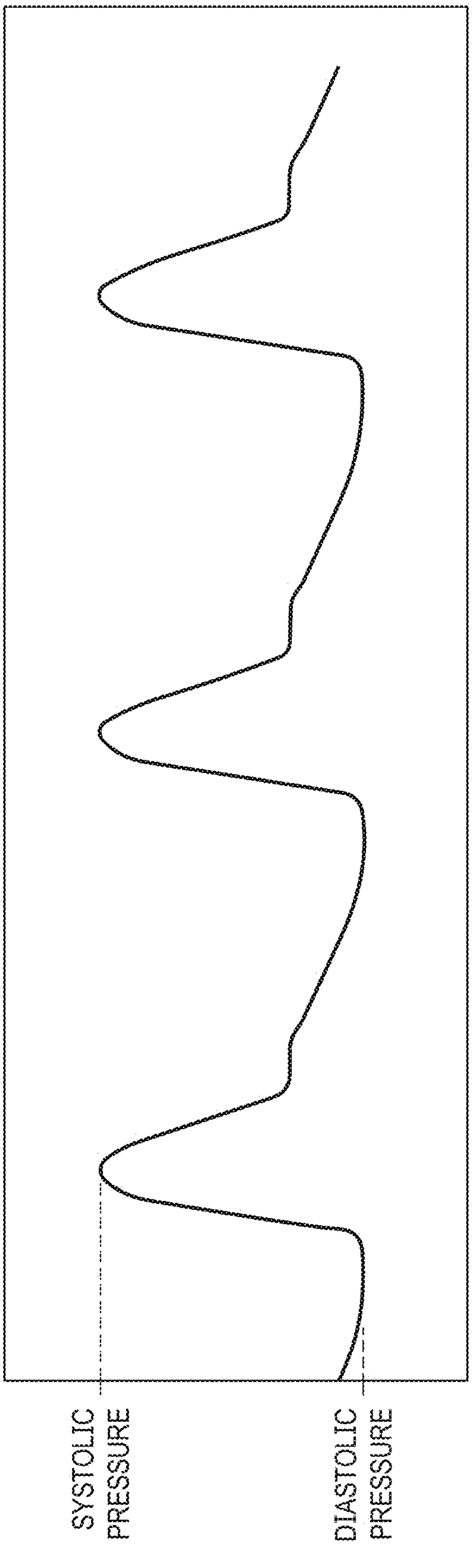
FIG. 28 is a graphical illustration of a wave form according to which an armature of FIG. 27's IBP assembly is movable, according to one or more embodiments.
Figure 29:
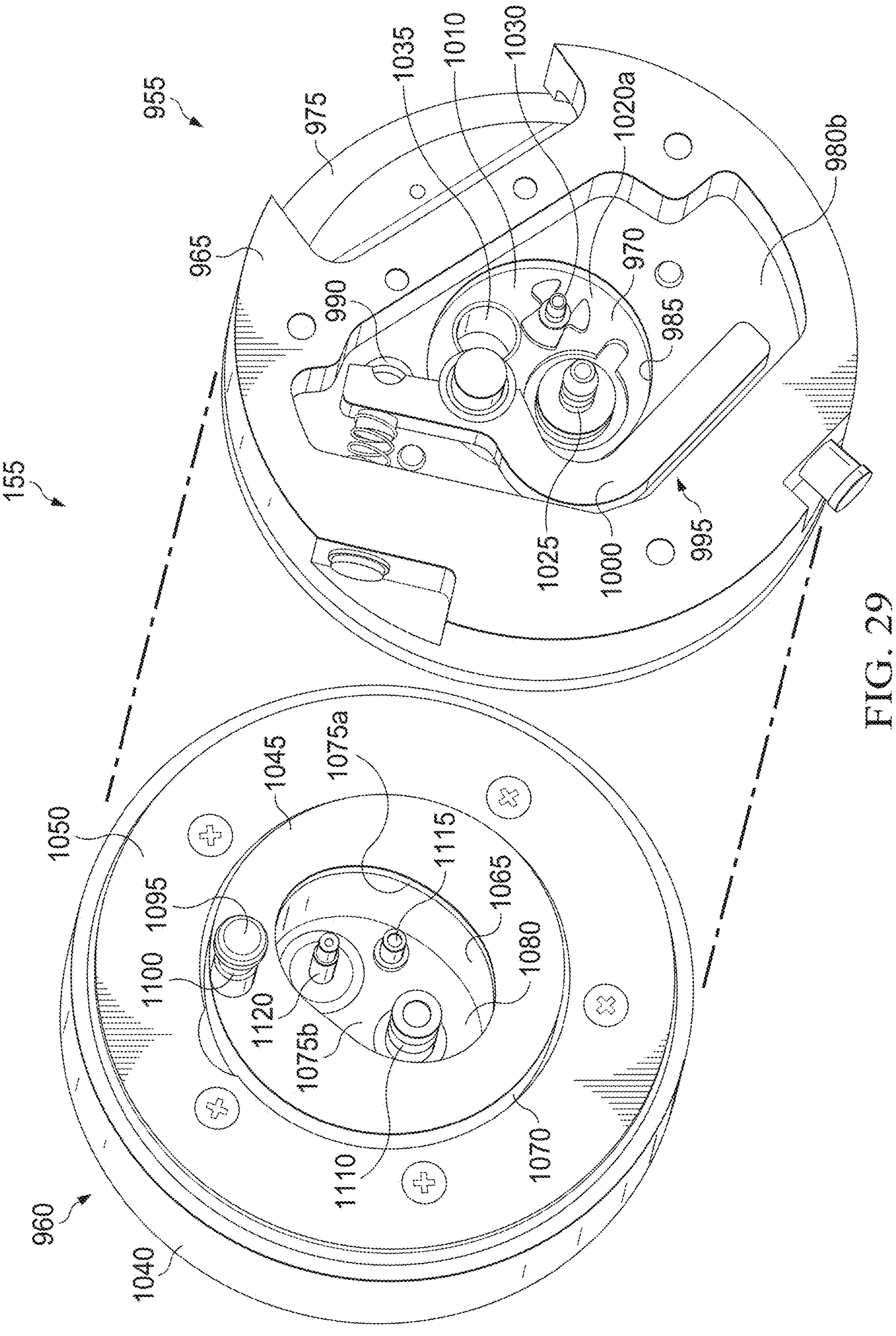
FIG. 29 is an exploded perspective view of a right arm coupling of FIG. 1's patient simulator, according to one or more embodiments.

In operation, the IBP assembly 895 is "purged" before use, that is, the valve 940 is opened and a fluid line is connected to the drain port 945 to drain air bubbles and fill the various fluid conduits of the IBP assembly 895 with artificial blood from the fluid reservoir 930. After purging, the valve 940 is closed and the line is removed from the drain port 945. The pump 935 is then activated to pressurize the IBP assembly 895. The pressure sensor 950 detects the pressure generated by the pump 935. The pump 935 is stopped when the pressure detected by the pressure sensor 950 reaches the desired set value for the diastolic pressure. In those embodiments in which the pump 935 is a reversible peristaltic pump, the pump 935 is reversible to decrease the pressure in the IBP assembly 895. After the desired set value for the diastolic pressure in the IBP assembly 895 has been reached, the voice coil 920 is activated to move the armature 925 up and down following a programmed wave form; an example of this programmed wave form is illustrated in FIG. 28. As a result, the armature 925 contacts the silicone tube 915 to change the fluid pressure in the IBP assembly 895 according to the programmed wave form. The lowest point of the wave form corresponds to the desired set value for the diastolic pressure and the highest point of the wave form corresponds to the desired set value for the systolic blood pressure. The pulse rate and systolic pressure are adjustable by varying the speed and intensity at which the armature 925 of the voice coil 920 contacts the silicone tube 915.

The IBP assembly 895 may include its own local control unit (e.g., a printed circuit board), which local control unit may control the voice coil 920 and communicate with the control unit 215 contained in the simulated torso 115 of the patient simulator 100. Alternatively, the local control unit may be omitted in favor of the control unit 215 to control the voice coil 920 of the IBP assembly 895. The pressure sensor 950 is adapted to communicate with the local control unit (and/or the control unit 215 contained in the simulated torso 115). The frequency of the armature 925 may be altered by the local control unit (or the control unit 215 contained in the simulated torso 115) to mimic changes in heart rate. Further, the amplitude of the wave form may be modified by the local control unit (or the control unit 215 contained in the simulated torso 115) to mimic an increase or decrease in systolic pressure. Finally, the pump 935 may be activated by the local control unit (or the control unit 215 contained in the simulated torso 115) to mimic an increase or decrease in diastolic pressure. Accordingly, when the needle 910 is inserted into the silicone tube 905, the modulated pressure is transmitted to an IBP monitor to emulate a pulsatile human artery for medical trainees.

Figure 32:
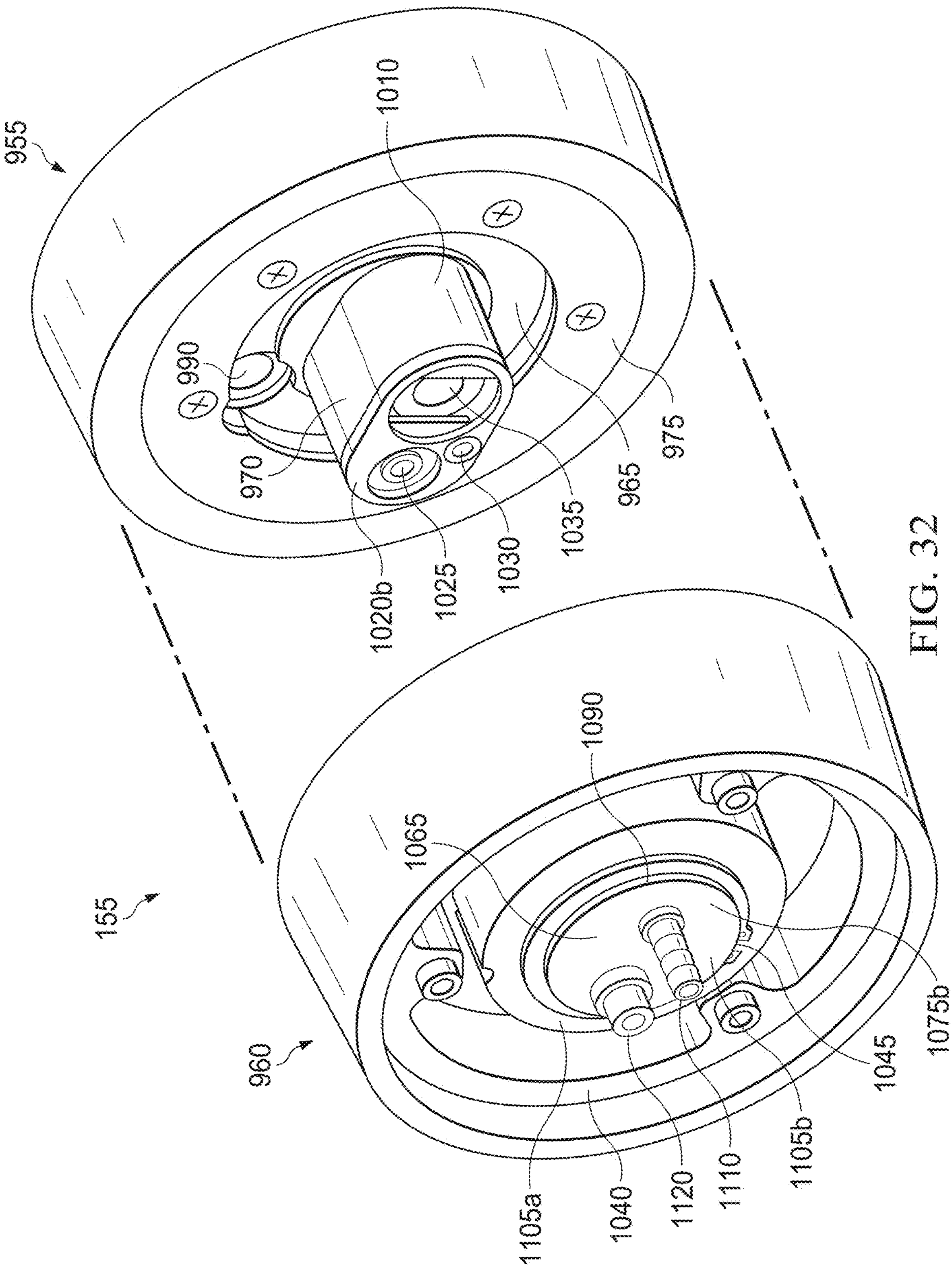
FIG. 32 is another exploded perspective view of FIG. 31's right arm coupling, according to one or more embodiments.
Figure 33:
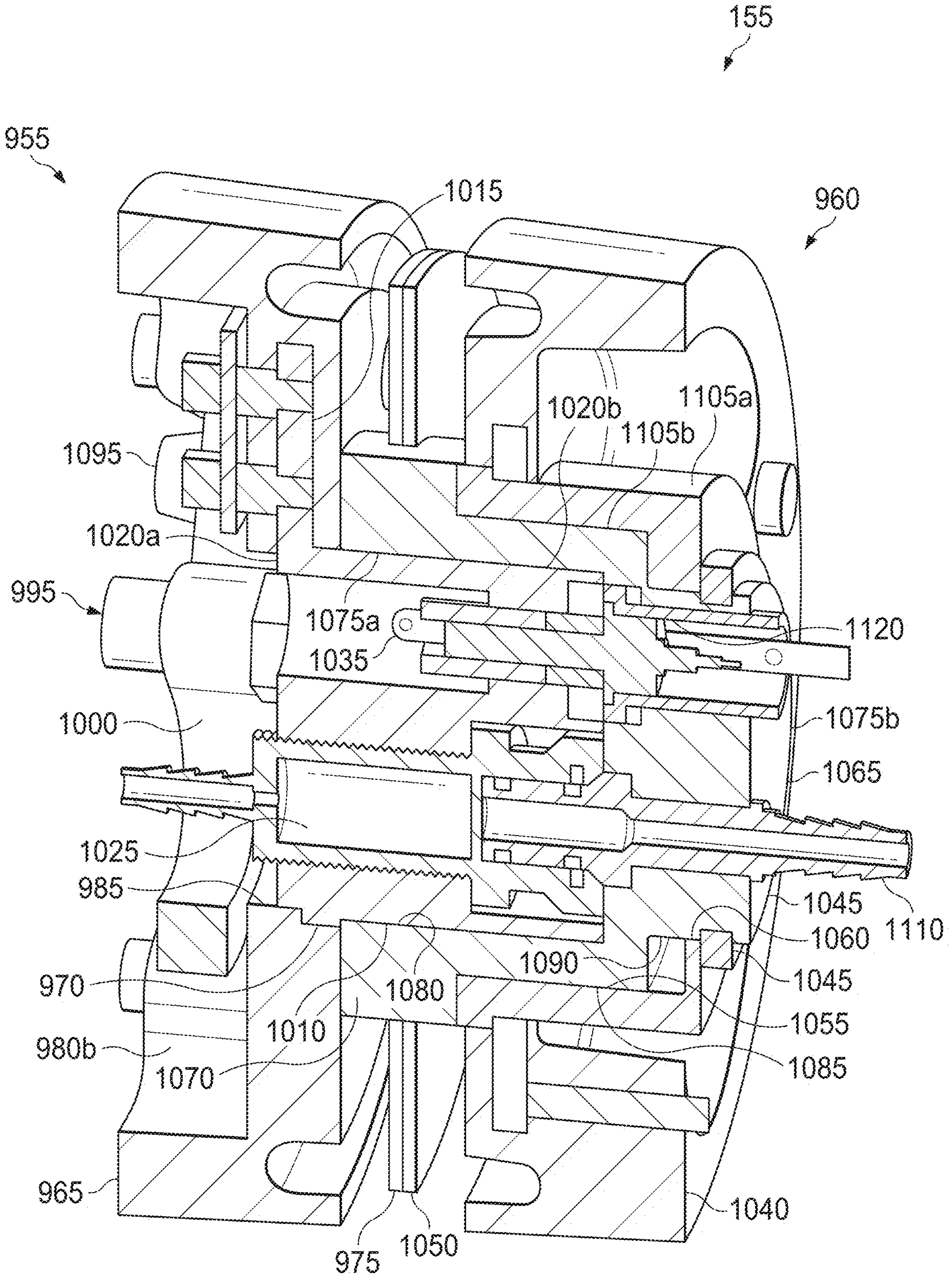
FIG. 33 is a cross-sectional view of FIG. 31's right arm coupling, according to one or more embodiments.
Figure 34:
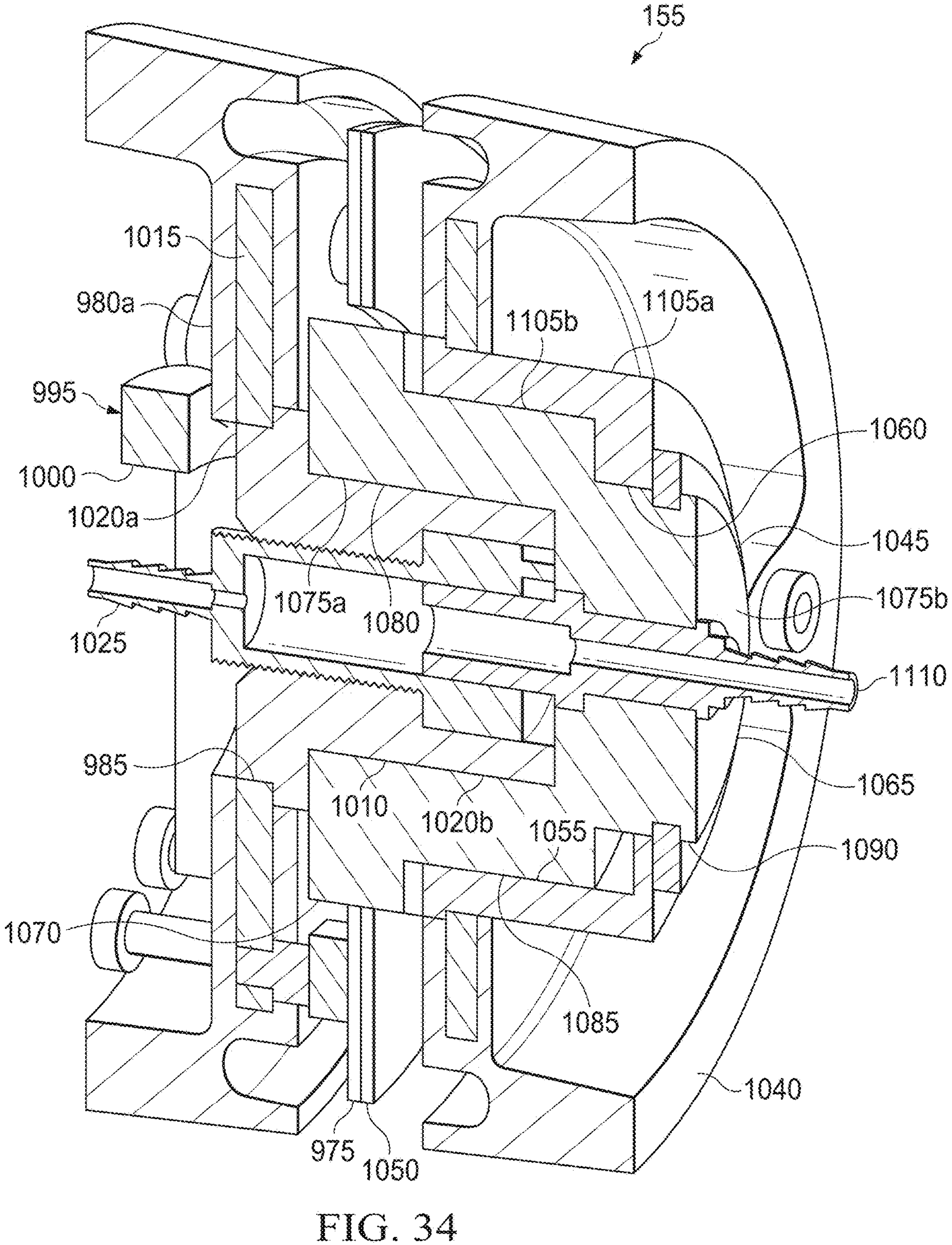
FIG. 34 is another cross-sectional view of FIG. 31's right arm coupling, according to one or more embodiments.

Referring to FIGS. 29-34, with continuing reference to FIG. 1, in an embodiment, the right arm coupling 155 includes an upper coupling assembly 955 and a lower coupling assembly 960. The upper coupling assembly 955 includes an upper coupling hub 965, a plug 970, and an upper skin washer 975. Opposing recesses 980*a-b* are formed in the upper coupling hub 965. A central passageway 985 is formed through the upper coupling hub 965 from the recess 980*a* to the recess 980*b*. In several embodiments, as in FIGS. 31-34, the recess 980*b* is omitted. A pin hole 990 is also formed through the upper coupling hub 965 from the recess 980*a* to the recess 980*b*. A latch 995 extends within the recess 980*b* adjacent the pin hole 990. In several embodiments, the latch 995 includes a spring-loaded arm 1000 that is actuable via a rotary actuator 1005 (shown in FIG. 31) to disengage trigger pin 1095 (introduced below). The plug 970 includes a central body 1010 and an outer flange 1015. The central body 1010 defines opposing end portions 1020*a-b*. The outer flange 1015 extends radially outwardly from the central body 1010. The end portion 1020*a* of the plug 970 extends within the central passageway 985 formed through the upper coupling hub 965. The outer flange 1015 extends within the recess 980*a* formed in the upper coupling hub 965. The end portion 1020*b* of the plug 970 is adapted to be received by the lower coupling assembly 960. In several embodiments, the upper coupling hub 965 and the plug 970 are integrally formed. In other embodiments, the upper coupling hub 965 and the plug 970 are each divided into two (2) or more subcomponents. For example, as shown in FIGS. 33 and 34, the central body 1010 and the outer flange 1015 may be divided into two (2) separate subcomponents. Alternatively, the plug 970 may be omitted and replaced with a socket adapted to receive a plug of the lower coupling assembly 960. The upper coupling assembly 955 also includes an upper hydraulic connector 1025, an upper pneumatic connector 1030, and an upper electronic connector port 1035. The upper hydraulic connector 1025, the upper pneumatic connector 1030, and the upper electronic connector port 1035 each extend through, and are coupled to, the central body 1010 of the plug 970. The upper skin washer 975 is coupled to the upper coupling hub 965 and is adapted to secure the upper coupling assembly 955 to a simulated skin of the simulated upper right arm 145. As a result, the upper skin washer 975 couples the upper coupling assembly 955 to the simulated upper right arm 145. The upper skin washer 975 may also retain the outer flange 1015 of the plug 970 of the upper coupling assembly 955 within the recess 980*a* of the upper coupling hub 965. As shown in FIGS. 16 and 18, the upper coupling assembly 955 of the right arm coupling 155 is coupled to the bracket 580*e* of the upper right arm assembly 565.

The lower coupling assembly 960 includes a lower coupling hub 1040, a socket 1045, and a lower skin washer 1050. A recess 1055 is formed in the lower coupling hub 1040. A central passageway 1060 is formed through the lower coupling hub 1040 from the recess 1055. The socket 1045 includes a central body 1065 and an outer flange 1070. The central body 1065 defines opposing end portions 1075*a-b*. The outer flange 1070 extends radially outwardly from the central body 1065 at the end portion 1075*a*. A recess 1080 is formed in the central body 1065 of the socket 1045. The end portion 1075*b* includes an enlarged-diameter portion 1085 and a reduced-diameter portion 1090. The enlarged-diameter portion 1085 extends within the recess 1055 of the lower coupling hub 1040. The reduced-diameter portion 1090 extends from the enlarged-diameter portion and through the central passageway 1060 in the lower coupling hub 1040. A trigger pin 1095 extends from the socket 1045. The trigger pin 1095 includes a groove 1100 adapted to be engaged by the latch 995 of the upper coupling assembly 955. The recess 1080 of the socket 1045 is adapted to receive the plug 970 of the upper coupling assembly 955. In several embodiments, the lower coupling hub 1040 is rotatable relative to the socket 1045 so that, when the lower coupling assembly 960 matingly engages the upper coupling assembly 955, the simulated lower right arm 150 is rotatable to mimic the pronation and supination of a human forearm. In other embodiments, the lower coupling hub 1040 and the socket 1045 are integrally formed. In still other embodiments, the lower coupling hub 1040 and the socket 1045 are each divided into two (2) or more subcomponents. For example, as shown in FIGS. 32-34, the socket 1045 may be subdivided into two (2) separate subcomponents 1105*a* and 1105*b*. Alternatively, the socket 1045 may be omitted and replaced with a plug adapted to be received by a socket of the upper coupling assembly 955. The lower coupling assembly 960 also includes a lower hydraulic connector 1110, a lower pneumatic connector 1115, and a lower electronic connector port 1120. The lower hydraulic connector 1110, the lower pneumatic connector 1115, and the lower electronic connector port 1120 each extend through, and are coupled to, the central body 1065 of the socket 1045 of the lower coupling assembly 960. The lower skin washer 1050 is coupled to the lower coupling hub 1040 and is adapted to secure the lower coupling assembly 960 to a simulated skin of the simulated lower right arm 150. As a result, the lower skin washer 1050 couples the lower coupling assembly 960 to the simulated lower right arm 150 of the patient simulator 100. The lower skin washer 1050 may also extend around the outer flange 1070 of the socket 1045 to retain the enlarged-diameter portion 1085 of the central body 1065 of the socket 1045 within the recess 1055 of the lower coupling hub 1040. As shown in FIG. 19, the lower coupling assembly 960 of the right arm coupling 155 extends within the simulated right forearm 605, opposite the simulated right hand 600.

Figure 30:
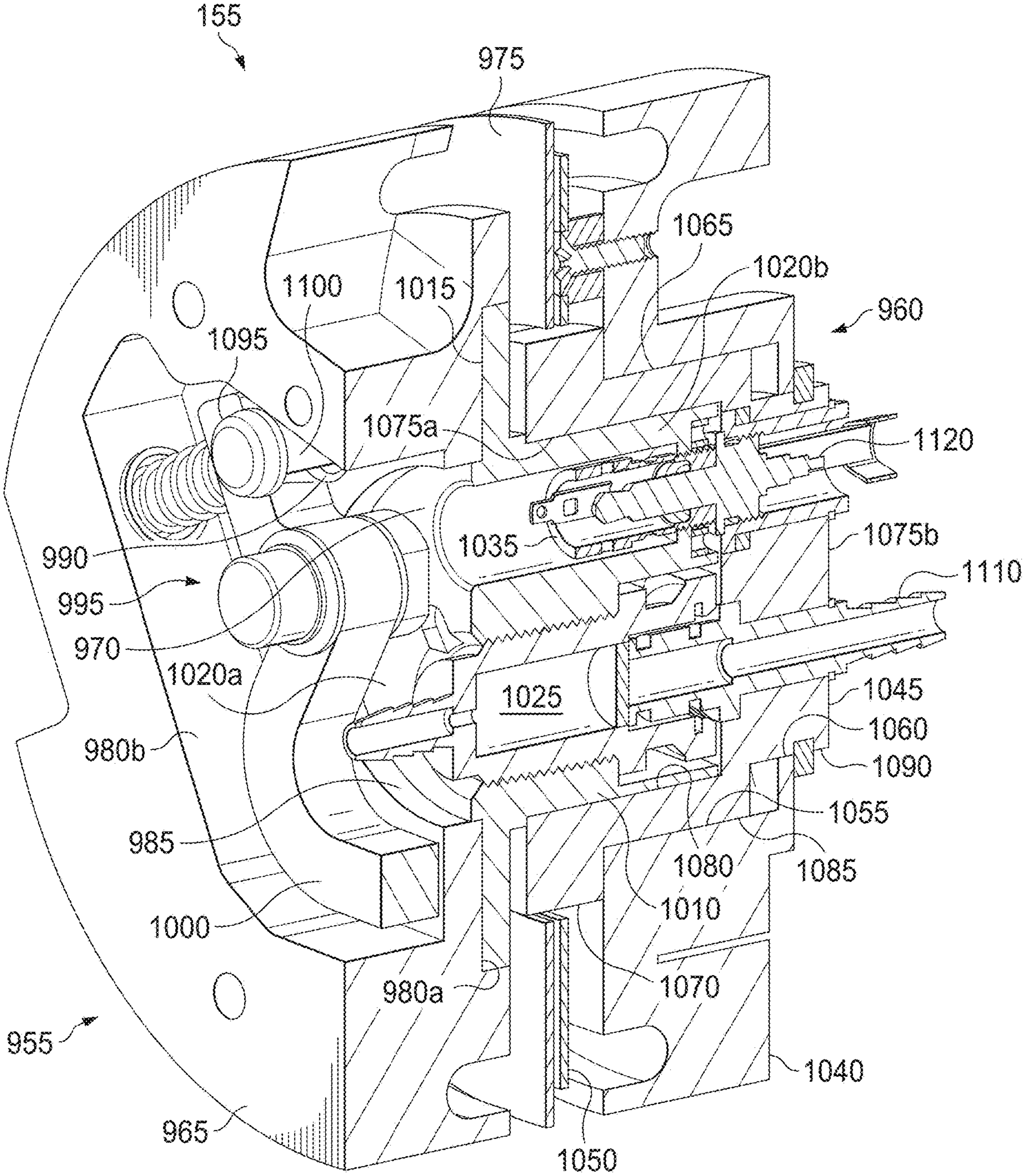
FIG. 30 is a cross-sectional view of FIG. 29's right arm coupling, according to one or more embodiments.
Figure 31:
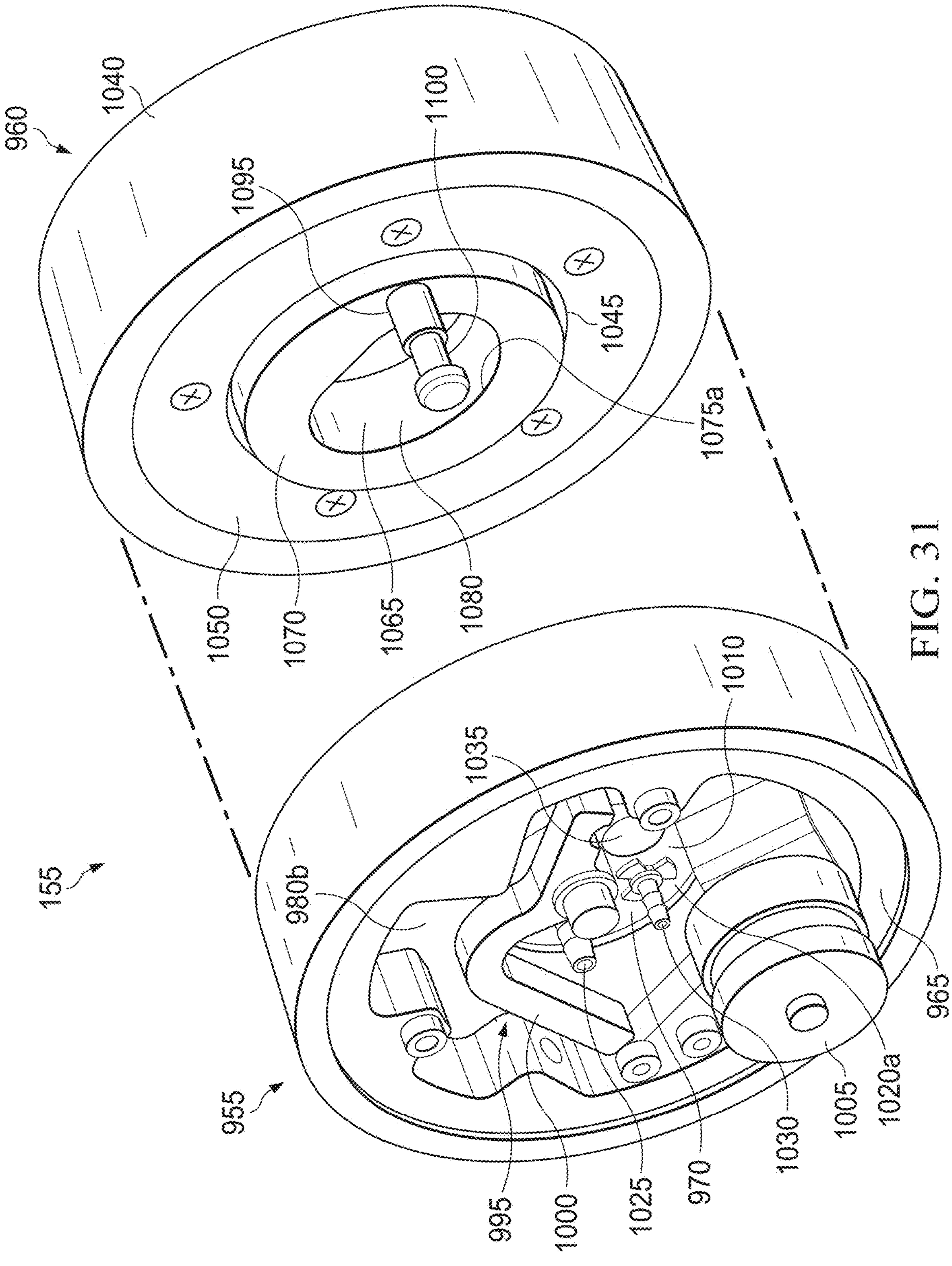
FIG. 31 is an exploded perspective view of a right arm coupling of FIG. 1's patient simulator, according to one or more embodiments.

In operation, the lower coupling assembly 960 matingly engages the upper coupling assembly 955 (i.e., the socket 1045 of the lower coupling assembly 960 receives the plug 970 of the upper coupling assembly 955) to detachably couple the simulated lower right arm 150 to the simulated upper right arm 145 via the right arm coupling 155. As a result of such mating engagement between the lower coupling assembly 960 and the upper coupling assembly 955: the trigger pin 1095 of the lower coupling assembly 960 extends through the pin hole 990 and the groove 1100 is engaged by the latch 995 of the upper coupling assembly 955; the lower hydraulic connector 1110 is aligned with, and matingly engages, the upper hydraulic connector 1025, as shown in FIGS. 30, 33, and 34, so that hydraulic fluid can be passed from the simulated upper right arm to various features/components contained in the simulated lower right arm; the lower pneumatic connector 1115 is aligned with, and matingly engages, the upper pneumatic connector 1030 so that pneumatic fluid can be passed from the simulated upper right arm to various features/components contained in the simulated lower right arm; and the lower electronic connector port 1120 is aligned with, and matingly engages, the upper electronic connector port 1035, as shown in FIGS. 30 and 33, so that power and/or communication can be passed from the simulated upper right arm to various features/components contained in the simulated lower right arm. As a result of the alignment and mating engagement between the lower hydraulic connector 1110 and the upper hydraulic connector 1025, hydraulic fluid can be passed from the pump 205 contained in the simulated torso 115 to various features/components contained in the simulated lower right arm 150 (e.g., circulatory features). Further, as a result of the alignment and mating engagement between the lower pneumatic connector 1115 and the upper pneumatic connector 1030, pneumatic fluid can be passed from the compressor 210 contained in the simulated torso 115 to various features/components contained in the simulated lower right arm 150. Finally, as a result of the alignment and mating engagement between the lower electronic connector port 1120 and the upper electronic connector port 1035, power and/or communication can be passed from the power source 220 and/or the control unit 215 contained in the simulated torso 115 to various features/components contained in the simulated lower right arm 150 (e.g., sensors and motors). To detach the simulated lower right arm 150 from the simulated upper right arm 145, the spring-loaded arm 1000 arm of the latch 995 is actuated using the rotary actuator 1005 to disengage the spring-loaded arm 1000 from the groove in the trigger pin 1095; once so disengaged, the simulated lower right arm 150 can be detached from the simulated upper right arm 145.

Figure 35:
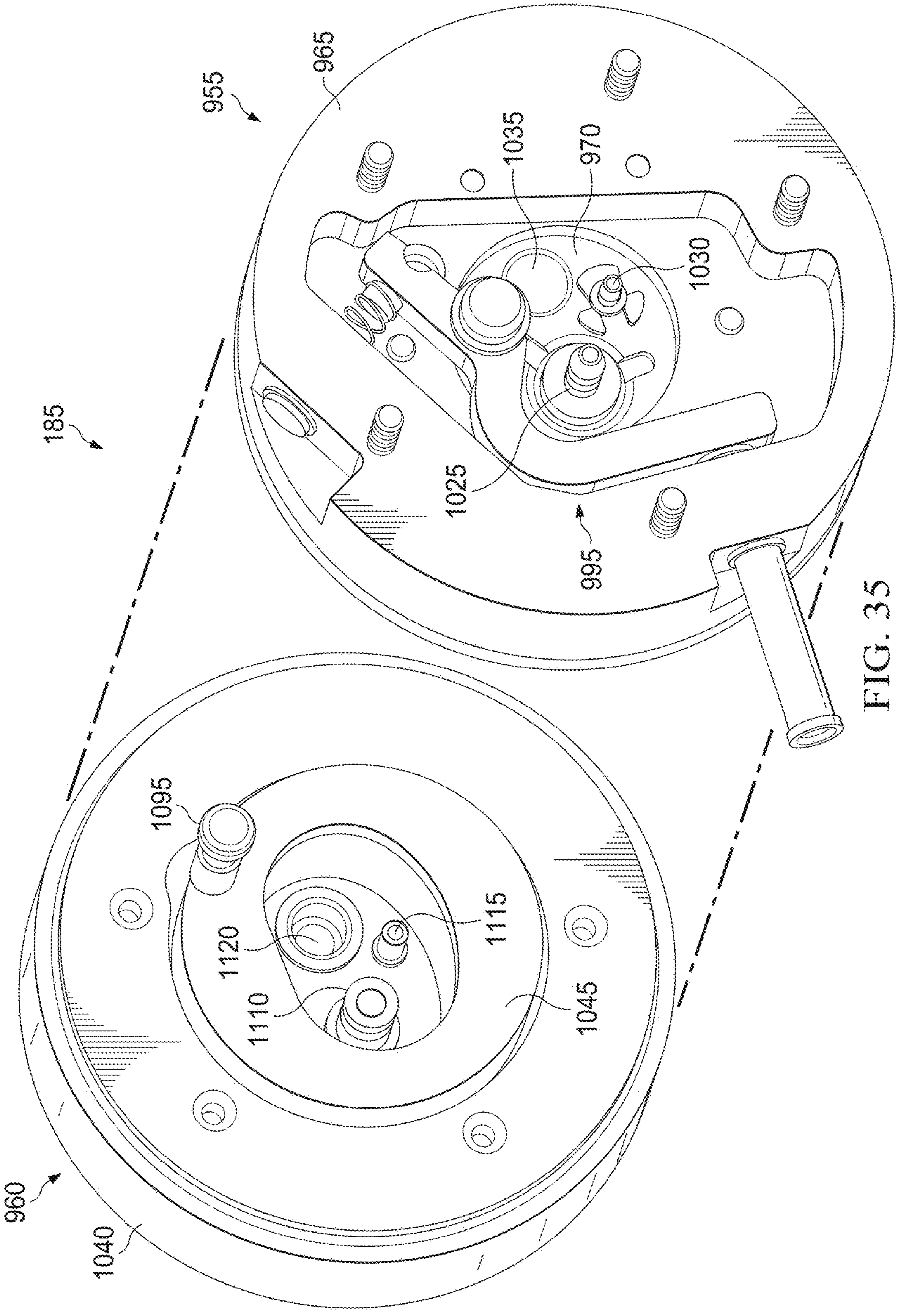
FIG. 35 is an exploded perspective view of a right leg coupling of FIG. 1's patient simulator, according to one or more embodiments.
Figure 36:
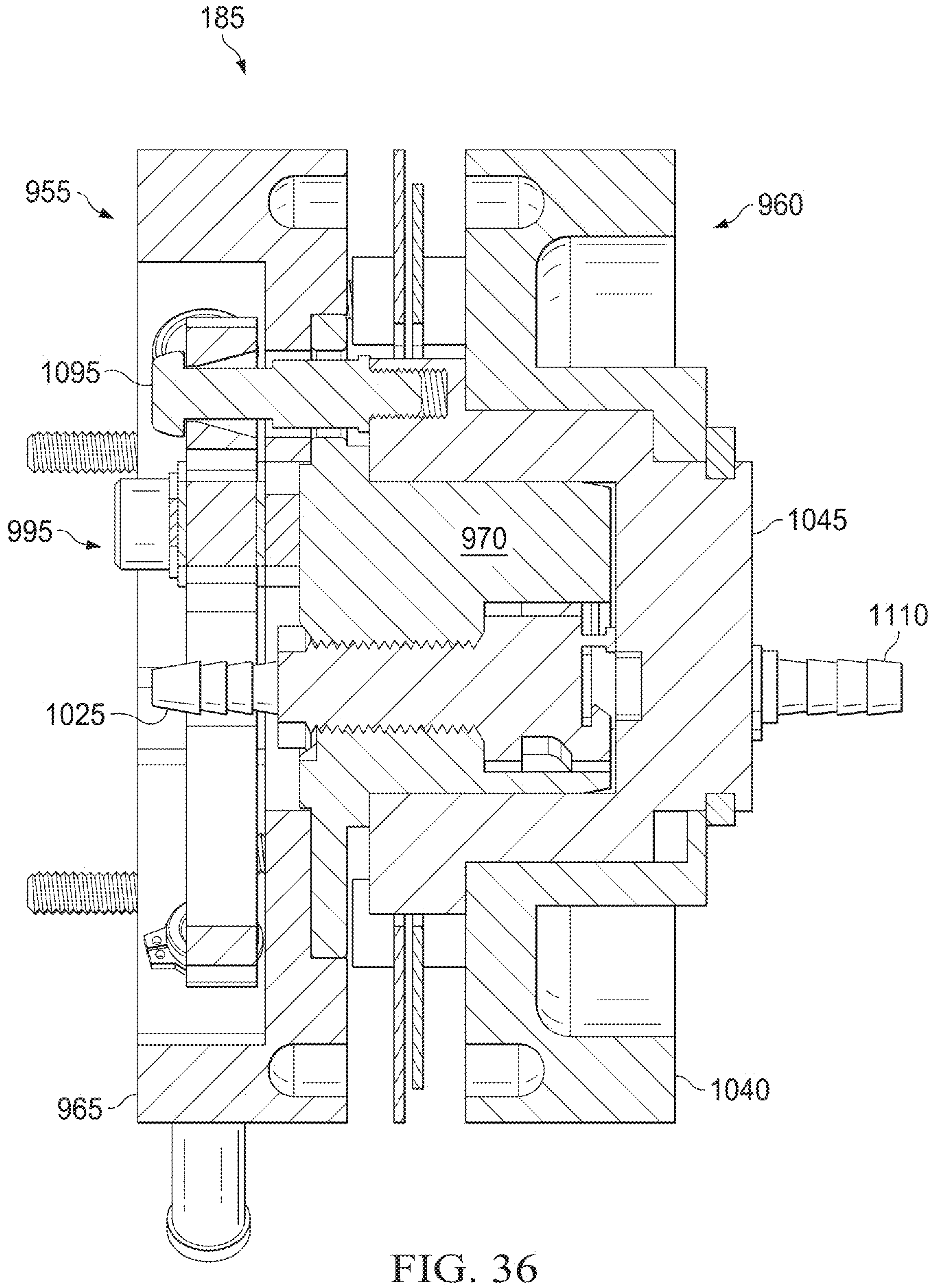
FIG. 36 is a cross-sectional view of FIG. 35's right leg coupling, according to one or more embodiments.
Figure 37:
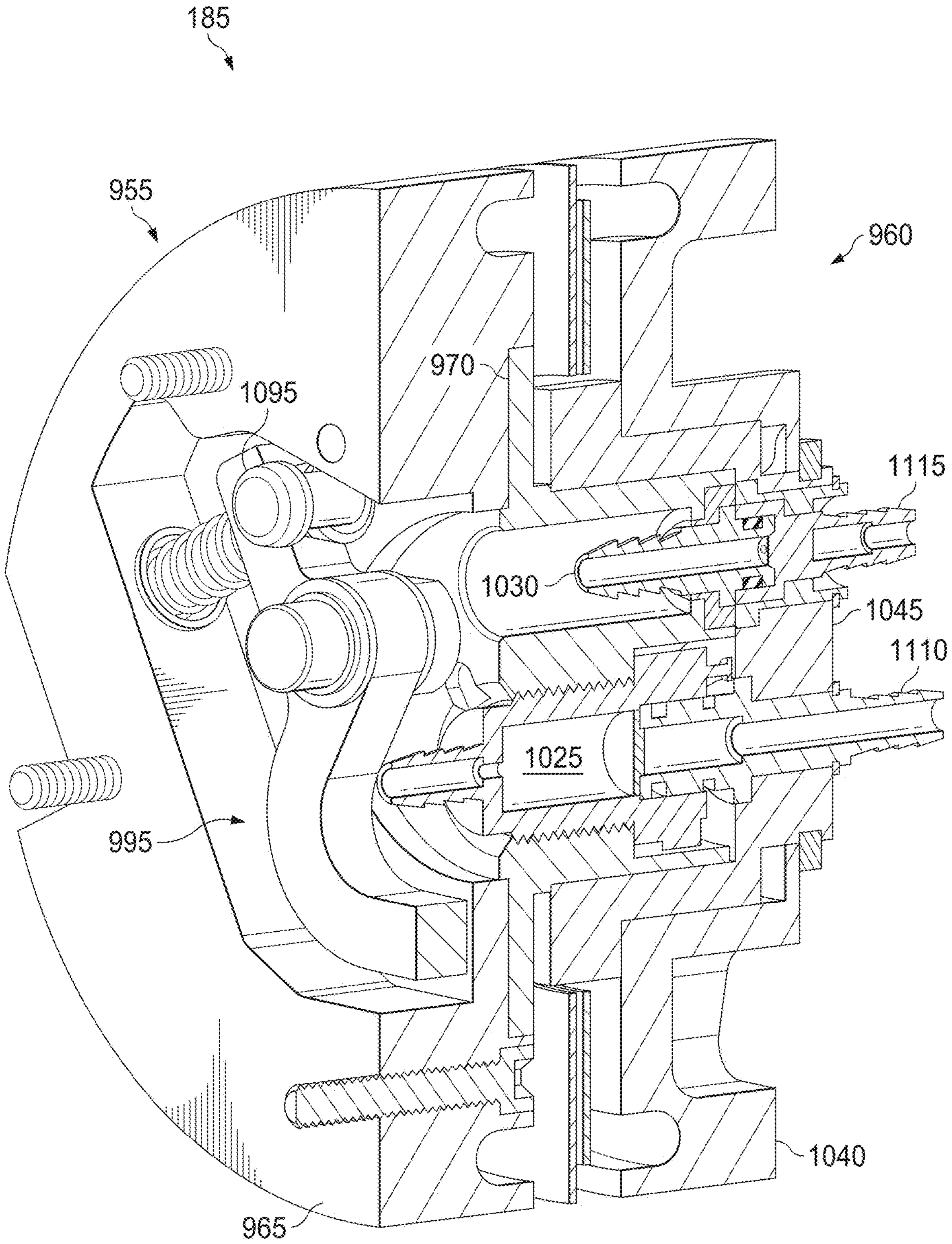
FIG. 37 is a cross-sectional perspective view of FIG. 35's right leg coupling, according to one or more embodiments.

Referring to FIGS. 35-37, with continuing reference to FIG. 1, in an embodiment, the right leg coupling 185 includes several features/components that are substantially similar to corresponding features/components of the right arm coupling 155, which substantially similar features/components are given the same reference numerals. In several embodiments, the structure and operation of the right leg coupling 185 is substantially similar to the structure and operation of the right arm coupling 155 and, therefore, will not be described in further detail. In several embodiments, the left arm coupling 170 is substantially similar to the right arm coupling 155 and, therefore, will not be described in further detail. Likewise, in several embodiments, the left leg coupling 200 is substantially similar to the right leg coupling 185 and, therefore, will not be described in further detail.

Figure 38:
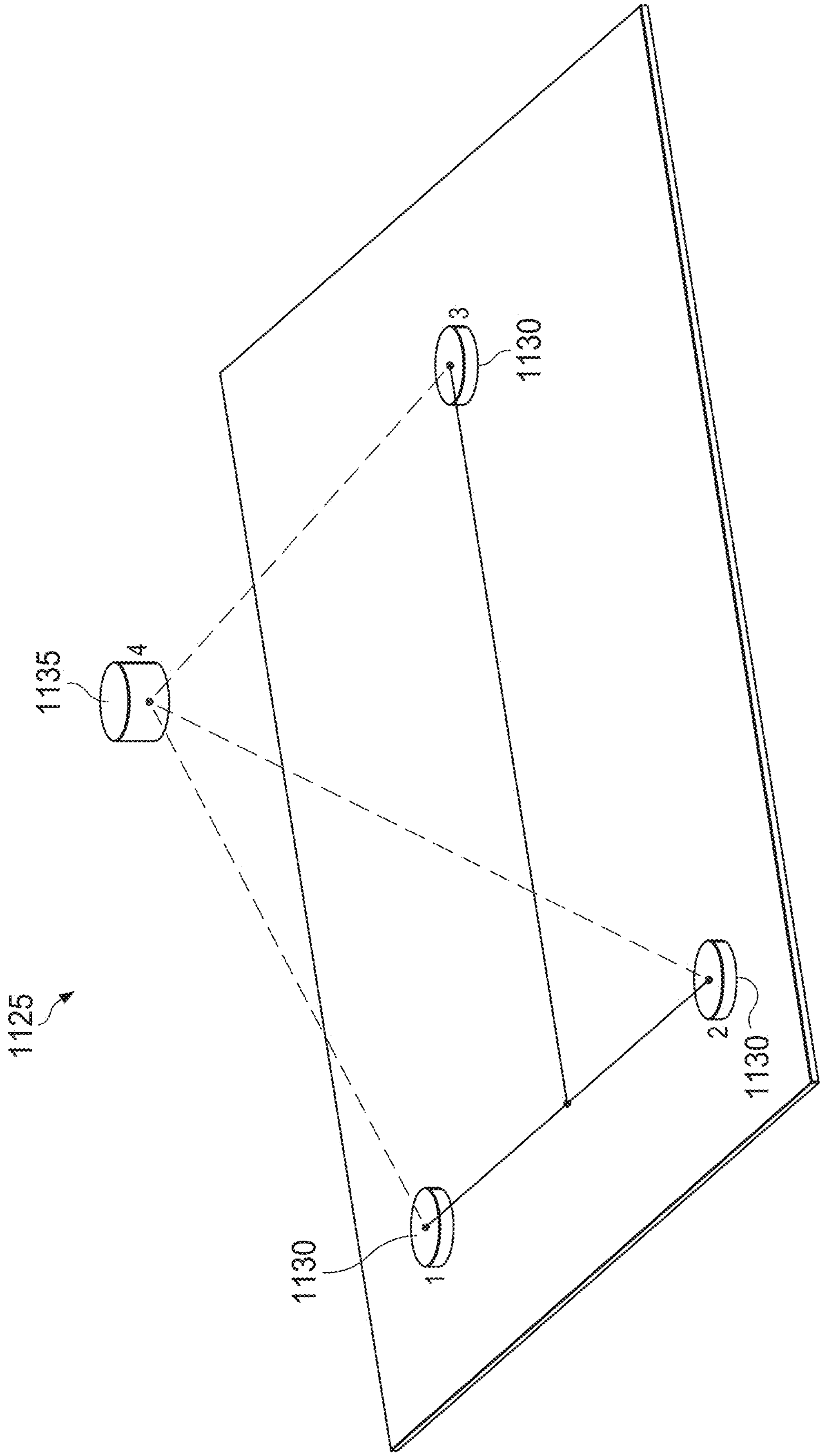
FIG. 38 is a diagrammatic illustration of an ultrasonic positioning system, according to one or more embodiments.
Figure 39:
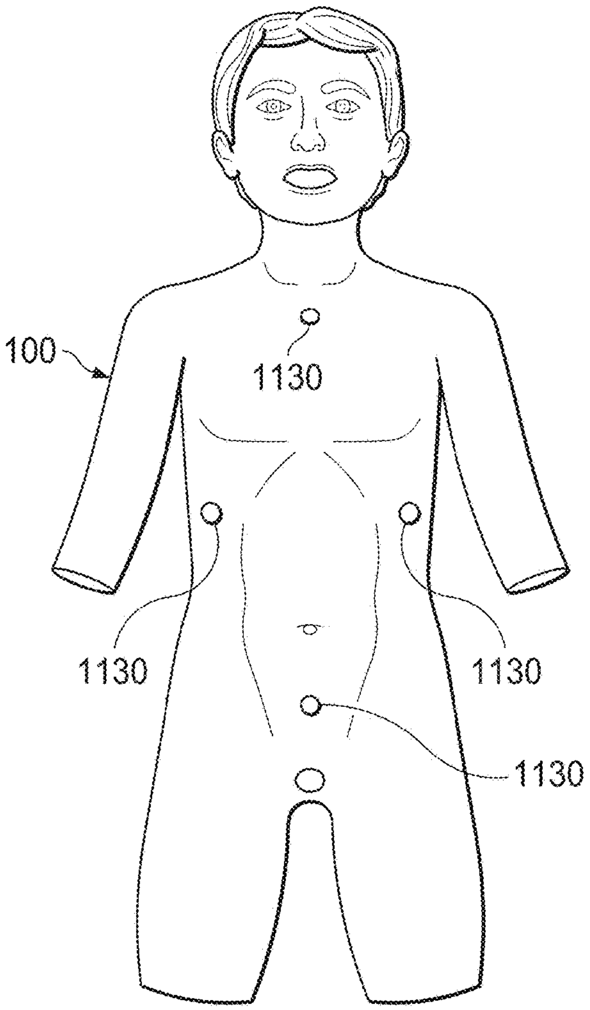
FIG. 39 is a front elevational view of a plurality of ultrasound sensors of FIG. 38's ultrasonic positioning system installed on FIG. 1's patient simulator, according to one or more embodiments.
Figure 40:
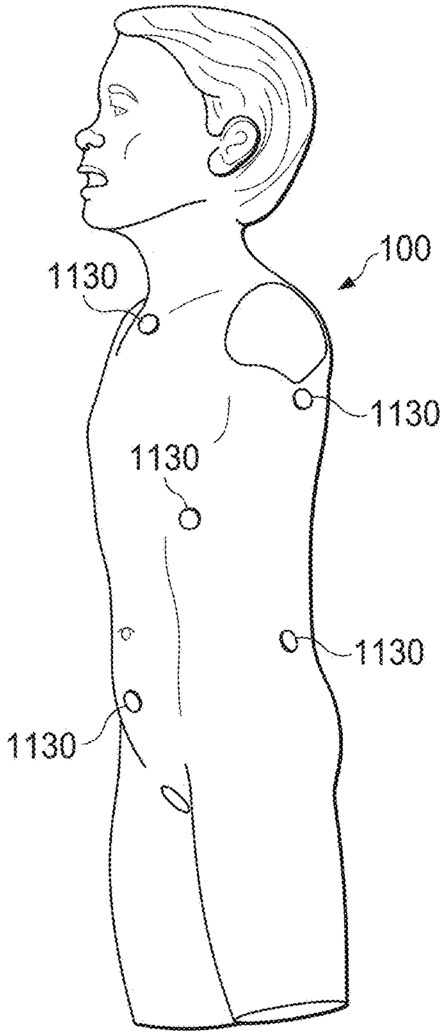
FIG. 40 is a perspective view of FIG. 39's ultrasonic positioning system, according to one or more embodiments.

Referring to FIGS. 38-40, with continuing reference to FIG. 1, in an embodiment, the patient simulator 100 is equipped with an ultrasonic positioning system 1125. The ultrasonic positioning system 1125 is adapted to determine the position (X and Y) of a simulated ultrasound probe relative to the patent simulator 100 to facilitate realistic simulation of a medical ultrasound machine. The ultrasonic positioning system 1125 calculates the coordinates (X and Y) of the simulated ultrasound probe be detecting the distance from the simulated ultrasound probe to at least three (3) fixed anchors on the patient simulator 100 using trilateration. The distance from the simulated ultrasound probe to each of the fixed anchors 1125 is calculated by measuring the time of flight of an ultrasonic pulse. The ultrasonic positioning system 1125 also determines the force applied by the user while performing a simulated ultrasound using a force sensor attached to the simulated ultrasound probe. In operation, the ultrasonic positioning system 1125 is set up by fixing ultrasound sensors 1130 to the simulated skin of the patient simulator 100 and placing an ultrasonic transmitter 1135 on the simulated ultrasound probe. The ultrasonic transmitter 1135 sends a pulse of 40 kHz every 50 ms, which is received by the ultrasound sensors 1130.

To synchronize the ultrasonic transmitter 1135 with a receiver circuit, a radiofrequency signal of 125 kHz is used. Because of the speed of the light is approximately 299792458 m/s, the propagation delay of this signal is negligible. A microprocessor detects the RF signal and begins to analyze the signal of each ultrasound sensor 1130 to estimate the time of flight of the ultrasonic pulse. The time the signal takes to arrive to each of the ultrasound sensors 1130 is proportional to the distance between them, and, knowing the speed of sound (343.2 m/s at 20° C.), the distance is calculated (1 mm for every 2.91 us of delay). Once three (or more) distances from the ultrasonic transmitter 1135 to the ultrasound sensors 1130 are calculated, and, knowing the fixed coordinates of each ultrasound sensor 1130, the microprocessor calculates the relative position of the ultrasonic transmitter 1135 using trilateration. Since the ultrasonic transmitter 1135 sends a pulse every 50 ms, the ultrasonic positioning system 1125 calculates the position of the simulated ultrasound probe twenty (20) times per second.

In several embodiments, as in FIGS. 39 and 40, due to the complexity of the surface of the patient simulator 100, an array of eight (8) of the ultrasonic sensors 1130 us used in conjunction with a look-up table. FIGS. 39 and 40 show the actual placement of the ultrasound sensors 1130 on the simulated skin of the patient simulator 100. This arrangement guarantees detection of at least three (3) valid distances from the ultrasound sensors 1130 to the ultrasonic transmitter 1135 for each region of the simulated skin on the patient simulator 100. The look-up table consists of twelve-hundred and twenty (1220) points; each point contains eight (8) values corresponding to the distance to each ultrasound sensor 1130. The values in the look-up table are validated and then used to determine the position of the simulated ultrasound probe. The process of determining the position of the simulated ultrasound probe includes comparing the real time distances from each ultrasound sensor 1130 to the ones pre-obtained in the table; based on this comparison, the point with the least absolute error is chosen as the most probable position of the simulated ultrasonic probe. The force sensor present in the simulated ultrasound probe is used to determine if the simulated ultrasound probe is in contact with the simulated skin of the patient simulator 100, as well as to determine the amount of force applied by the user.

Figure 41:
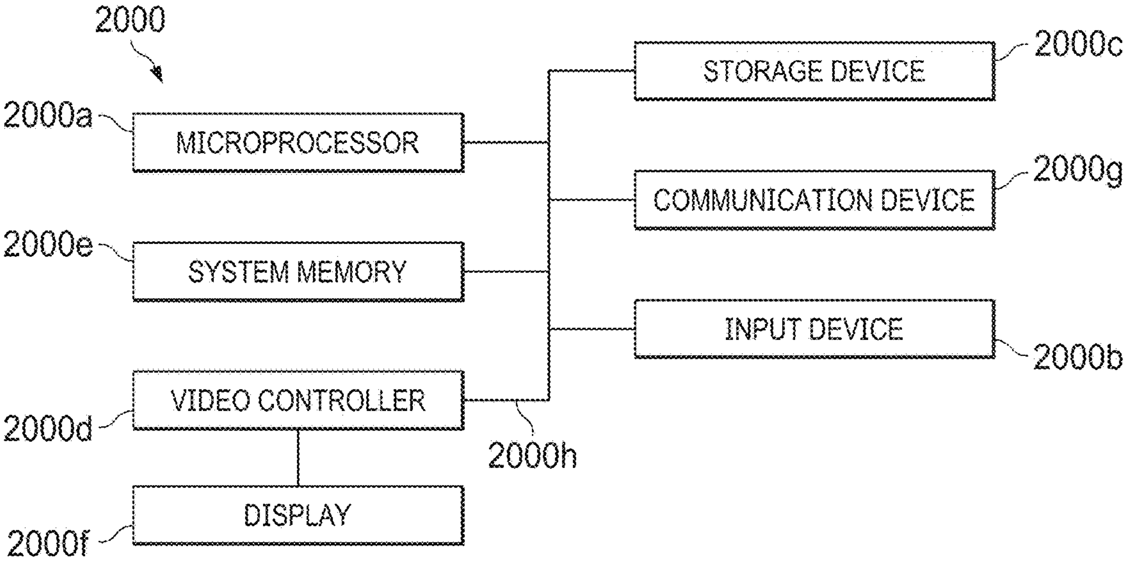
FIG. 41 is a diagrammatic illustration of a computing node for implementing one or more embodiments of the present disclosure.

Referring to FIG. 41, with continuing reference to FIGS. 1-53, in an embodiment, a computing node 2000 for implementing one or more embodiments of one or more of the above-described elements, systems, controllers, control units, methods, and/or steps, or any combination thereof, is depicted. The node 2000 includes a microprocessor **2000*a*, an input device 2000*b*, a storage device 2000*c*, a video controller 2000*d*, a system memory 2000*e*, a display 2000*f*, and a communication device 2000*g*, all interconnected by one or more buses 2000*h*. In several embodiments, the microprocessor 2000*a* is, includes, or is part of, the control unit 215. In several embodiments, the storage device 2000***c* may include a floppy drive, hard drive, CD-ROM, optical drive, any other form of storage device or any combination thereof. In several embodiments, the storage device 2000*c* may include, and/or be capable of receiving, a floppy disk, CD-ROM, DVD-ROM, or any other form of computer-readable medium that may contain executable instructions. In several embodiments, the communication device 2000*g* may include a modem, network card, or any other device to enable the node 2000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 2000 and/or components thereof, and/or one or more nodes that are substantially similar to the node 2000 and/or components thereof. In several embodiments, one or more of the above-described components of the node 2000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, combinations of hardware and software are also included within the definition of a computer system and are thus envisioned by the present disclosure as possible equivalent structures and equivalent methods.

In several embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a non-transitory computer readable medium may be executed by one or more processors to cause the one or more processors to carry out or implement in whole or in part the above-described operation of each of the above-described elements, systems, controllers, methods, and/or steps, or any combination thereof. In several embodiments, such a processor may include, or be a part of, one or more of the microprocessor 2000*a*, the control unit 215, any processor(s) that is/are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A patient simulator according to a first aspect has been disclosed. The patient simulator according to the first aspect generally includes: a pump; a compressor; a power source adapted to supply electrical power to the pump and the compressor; and a simulated torso within which the pump, the compressor, and the power source are contained; wherein the patient simulator further includes at least one of: (i) a head assembly, including: a simulated head; a simulated neck to which the simulated head is coupled; and a head coupling via which the simulated neck is adapted to be detachably coupled to the simulated torso; wherein, when the simulated neck is detachable coupled to the simulated torso via the head coupling: (a) the pump is adapted to supply hydraulic fluid, via the head coupling, into the simulated neck; (b) the compressor is adapted to supply pneumatic fluid, via the head coupling, into the simulated neck; (c) the power source is adapted to supply electrical power, via the head coupling, into the simulated neck; or (d) a combination of two or more of (a), (b), (c); or (ii) an extremity assembly, including: a simulated upper extremity coupled to the simulated torso; a simulated lower extremity;

and an extremity coupling via which the simulated lower extremity is adapted to be detachably coupled to the simulated upper extremity; wherein, when the simulated lower extremity is detachable coupled to the simulated upper extremity via the extremity coupling: (e) the pump is adapted to supply hydraulic fluid, via the extremity coupling, into the simulated lower extremity; (f) the compressor is adapted to supply pneumatic fluid, via the extremity coupling, into the simulated lower extremity; (g) the power source is adapted to supply electrical power, via the extremity coupling, into the simulated lower extremity; or (h) a combination of two or more of (e), (f), (g). In one or more embodiments, the patient simulated includes the head assembly; and the head coupling includes: an upper coupling assembly operably coupled to the simulated neck, the upper coupling assembly including an upper coupling hub; and a lower coupling assembly operably coupled to the simulated torso, the lower coupling assembly including a lower coupling hub. In one or more embodiments, the upper coupling assembly includes an upper simulated trachea, the lower coupling assembly includes a lower simulated trachea, and, when the simulated neck is detachably coupled to the simulated torso via the head coupling: the upper simulated trachea is aligned with the lower simulated trachea so that instruments and/or other objects can be passed from the upper simulated trachea to the lower simulated trachea, and vice versa, to simulate various patient conditions and procedures; or the upper coupling assembly includes an upper simulated esophagus, the lower coupling assembly includes a lower simulated esophagus, and, when the simulated neck is detachably coupled to the simulated torso via the head coupling: the upper simulated esophagus is aligned with the lower simulated esophagus so that instruments and/or other objects can be passed from the upper simulated esophagus to the lower simulated esophagus, and vice versa, to simulate various patient conditions and procedures. In one or more embodiments, the upper coupling assembly includes an upper hydraulic connector, the lower coupling assembly includes a lower hydraulic connector, and, when the simulated neck is detachably coupled to the simulated torso via the head coupling: the upper hydraulic connector is aligned with, and matingly engages, the lower hydraulic connector so that hydraulic fluid can be passed from the pump contained in the simulated torso to various features/components contained in the simulated neck and/or the simulated head; or the upper coupling assembly includes an upper pneumatic connector, the lower coupling assembly includes a lower pneumatic connector, and, when the simulated neck is detachably coupled to the simulated torso via the head coupling: the upper pneumatic connector is aligned with, and matingly engages, the lower pneumatic connector so that pneumatic fluid can be passed from the compressor contained in the simulated torso to various features/components contained in the simulated neck and/or the simulated head; or the upper coupling assembly includes an upper electronic connector port, the lower coupling assembly includes a lower electronic connector port, and, when the simulated neck is detachably coupled to the simulated torso via the head coupling: the upper electronic connector port is aligned with, and matingly engages, the lower electronic connector port so that electrical power can be passed from the power source contained in the simulated torso to various features/components contained in the simulated neck and/or the simulated head. In one or more embodiments, the patient simulator includes the extremity assembly; the extremity coupling includes: a first coupling assembly, the first coupling assembly including: a first coupling hub, the first coupling hub defining a first central passageway, and a plug extending within the first central passageway; and a second coupling assembly, the second coupling assembly including: a second coupling hub defining a second central passageway, and a socket extending within the second central passageway; and the socket is adapted to matingly engage the plug to detachably couple the simulated lower extremity to the simulated upper extremity. In one or more embodiments, the second coupling hub is rotatable relative to the socket so that, when the socket matingly engages the plug, the simulated lower extremity is rotatable to mimic pronation and supination of a human forearm. In one or more embodiments, the first coupling assembly further includes a first hydraulic connector extending through, and coupled to, the plug, the second coupling assembly further includes a second hydraulic connector extending through, and coupled to, the socket, and, when the socket matingly engages the plug to detachably couple the simulated lower extremity to the simulated upper extremity: the second hydraulic connector is aligned with, and matingly engages, the first hydraulic connector so that hydraulic fluid can be passed from the simulated upper extremity to various features/components contained in the simulated lower extremity; or the first coupling assembly further includes a first pneumatic connector extending through, and coupled to, the plug, the second coupling assembly further includes a second pneumatic connector extending through, and coupled to, the socket, and, when the socket matingly engages the plug to detachably couple the simulated lower extremity to the simulated upper extremity: the second pneumatic connector is aligned with, and matingly engages, the first pneumatic connector so that pneumatic fluid can be passed from the simulated upper extremity to various features/components contained in the simulated lower extremity; or the first coupling assembly further includes a first electronic connector port extending through, and coupled to, the plug, the second coupling assembly further includes a second electronic connector port extending through, and coupled to, the socket, and, when the socket matingly engages the plug to detachably couple the simulated lower extremity to the simulated upper extremity: the second electronic connector port is aligned with, and matingly engages, the first electronic connector port so that power and/or communications can be passed from the simulated upper extremity to various features/components contained in the simulated lower extremity. In one or more embodiments, a trigger pin extends from one of the first and second coupling assemblies; a groove is defined in the trigger pin; a pin hole is formed in the other of the first and second coupling assemblies; a latch is coupled to the other of the first and second coupling assemblies; and wherein, when the socket matingly engages the plug to detachably couple the simulated lower extremity to the simulated upper extremity: the trigger pin extends through the pin hole and the groove is engaged by the latch. In one or more embodiments, the patient simulator further includes an invasive blood pressure (IBP) assembly, the IBP assembly including: a tube; and an armature adapted to contact the tube; wherein the armature is movable following a programmed wave form, causing the armature to contact the tube to change a fluid pressure in the IBP assembly according to the programmed wave form. In one or more embodiments, pulse rate and systolic pressure are adjustable by varying a speed and an intensity, respectively, at which the armature contacts the tube. In one or more embodiments, the IBP assembly further includes: a fluid reservoir adapted to be filled with artificial blood; and a pump adapted to communicate fluid from the fluid reservoir to the tube; and the pump is activatable to mimic an increase or decrease in diastolic pressure. In one or more embodiments, the patient simulator further includes one or more simulated respiratory features coupled to, and adapted to be in fluid communication with, the compressor; wherein the compressor is adapted to supply pneumatic pressure to the one or more simulated respiratory features to simulate natural respiratory processes of a human patient. In one or more embodiments, the compressor includes an inlet to which a bellows is coupled; and the bellows acts as both a pneumatic accumulator, which aids in pneumatic pressurization at the inlet, and a dampener, which absorbs frequency vibrations above a threshold to prevent, or at least reduce, vibrational noise emanating from the compressor. In one or more embodiments, the compressor includes an inlet to which a bellows is coupled; the compressor further includes a restrictor coupled to the bellows, opposite the inlet; and the restrictor acts as a dampener, which absorbs frequency vibrations below a threshold to prevent, or at least reduce, vibrational noise emanating from the compressor. In one or more embodiments, the patient simulator includes the head assembly; and the patient simulator further includes a laryngospasm assembly contained in the simulated neck.

A patient simulator according to a second aspect has also been disclosed. The patient simulator according to the second aspect generally includes: an invasive blood pressure (IBP) assembly, the IBP assembly including: an insert; a first tube into which a need is insertable, the first tube being embedded into the insert to simulate an artery; a second tube adapted to communicate fluid to the first tube; and an armature adapted to contact the second tube; wherein the armature is movable following a programmed wave form, causing the armature to contact the second tube to change a fluid pressure in the IBP assembly according to the programmed wave form. In one or more embodiments, the first and second tubes are integrally formed. In one or more embodiments, the IBP assembly further includes: a fluid reservoir adapted to be filled with artificial blood; and a pump adapted to communicate fluid from the fluid reservoir to the second tube. In one or more embodiments, the pump is a reversible peristaltic pump. In one or more embodiments, the IBP assembly further includes: a valve openable to communicate fluid from the fluid reservoir to the second tube, bypassing the pump. In one or more embodiments, the IBP assembly further includes: a drain port adapted to receive fluid from the first tube; and a pressure sensor adapted to detect pressure of the fluid communicated from the first tube to the drain port; and the first tube is adapted to communicate fluid from the second tube to the drain port. In one or more embodiments, the pump is activatable to pressurize the IBP assembly; the pressure sensor is adapted to detect the pressure generated by the pump; and the pump is adapted to be stopped when the pressure detected by the pressure sensor reaches a desired set value for diastolic pressure. In one or more embodiments, the pump is activatable to mimic an increase or decrease in diastolic pressure. In one or more embodiments, a lowest point of the programmed wave form corresponds to a desired set value for the diastolic pressure; and a highest point of the programmed wave form corresponds to a desired set value for systolic blood pressure. In one or more embodiments, pulse rate and systolic pressure are adjustable by varying a speed and an intensity, respectively, at which the armature contacts the second tube.

A patient simulator according to a third aspect has also been disclosed. The patient simulator according to the third aspect generally includes: a compressor; and one or more simulated respiratory features coupled to, and adapted to be in fluid communication with, the compressor; wherein the compressor is adapted to supply pneumatic pressure to the one or more simulated respiratory features to simulate natural respiratory processes of a human patient; and wherein the compressor includes an inlet to which a bellows is coupled. In one or more embodiments, the bellows acts as both a pneumatic accumulator, which aids in pneumatic pressurization at the inlet, and a dampener, which absorbs frequency vibrations above a threshold to prevent, or at least reduce, vibrational noise emanating from the compressor. In one or more embodiments, the compressor further includes a restrictor coupled to the bellows, opposite the inlet; and the restrictor acts as a dampener, which absorbs frequency vibrations below a threshold to prevent, or at least reduce, vibrational noise emanating from the compressor. In one or more embodiments, the restrictor defines a central passageway including a funnel, a throat, and a nozzle. In one or more embodiments, the funnel extends from the throat such that a reduced-diameter portion of the funnel extends adjacent the throat and an enlarged-diameter portion of the funnel extends opposite the throat; and/or the nozzle extends from the throat, opposite the funnel, such that a reduced-diameter portion of the nozzle extends adjacent the throat and an enlarged-diameter portion of the nozzle extends opposite the throat and adjacent the bellows.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A patient simulator, comprising:

an invasive blood pressure (IBP) assembly, the IBP assembly comprising:

an insert;

a first tube into which a needle is insertable, the first tube being embedded into the insert to simulate an artery;

a second tube adapted to communicate fluid to the first tube;

a pump adapted to communicate fluid to the second tube; and an armature spaced apart from the pump and adapted to contact the second tube;

wherein the armature is movable following a programmed wave form, causing the armature to contact the second tube to change a fluid pressure in the IBP assembly according to the programmed wave form;

wherein a simulated diastolic blood pressure in the IBP assembly is adjustable by varying an output of the pump, and is detectable via the needle when the needle is inserted into the first tube;

and wherein:

a simulated pulse rate in the IBP assembly is adjustable by varying an output of the armature, and is detectable via the needle when the needle is inserted into the first tube; and a simulated systolic blood pressure in the IBP assembly is adjustable by varying another output of the armature, and is detectable via the needle when the needle is inserted into the first tube.

2. The patient simulator of claim 1, wherein the first and second tubes are integrally formed.

3. The patient simulator of claim 1, wherein the IBP assembly further comprises a fluid reservoir adapted to be filled with artificial blood; and wherein the pump is adapted to communicate fluid from the fluid reservoir to the second tube.

4. The patient simulator of claim 3, wherein the pump is a reversible peristaltic pump.

5. The patient simulator of claim 3, wherein the IBP assembly further comprises:

a valve openable to communicate fluid from the fluid reservoir to the second tube, bypassing the pump.

6. The patient simulator of claim 3, wherein the IBP assembly further comprises:

a drain port adapted to receive fluid from the first tube; and a pressure sensor adapted to detect pressure of the fluid communicated from the first tube to the drain port;

and wherein the first tube is adapted to communicate fluid from the second tube to the drain port.

7. The patient simulator of claim 6, wherein the pump is activatable to pressurize the IBP assembly;

wherein the pressure sensor is adapted to detect the pressure generated by the pump; and wherein the pump is adapted to be stopped when the pressure detected by the pressure sensor reaches a desired set value for the simulated diastolic blood pressure.

8. The patient simulator of claim 3, wherein the pump is activatable to mimic an increase or decrease in the simulated diastolic blood pressure.

9. The patient simulator of claim 8, wherein a lowest point of the programmed wave form corresponds to a desired set value for the simulated diastolic blood pressure; and wherein a highest point of the programmed wave form corresponds to a desired set value for the simulated systolic blood pressure.

10. The patient simulator of claim 1, wherein the output of the armature comprises a frequency at which the armature contacts the second tube;

wherein the another output of the armature comprises an amplitude at which the armature contacts the second tube; and wherein the simulated pulse rate and the simulated systolic blood pressure are adjustable by varying the frequency and the amplitude, respectively, at which the armature contacts the second tube.

11. A method, comprising:

inserting a needle into a first tube of an invasive blood pressure (IBP) assembly, the first tube being embedded into an insert of the IBP assembly to simulate an artery;

communicating fluid to the first tube via a second tube using a pump of the IBP assembly;

moving an armature of the IBP assembly following a programmed wave form, causing the armature to contact the second tube to change a fluid pressure in the IBP assembly according to the programmed wave form, said armature being spaced apart from the pump;

adjusting a simulated diastolic blood pressure in the IBP assembly by varying an output of the pump, said simulated diastolic blood pressure being detectable via the needle inserted into the first tube; and adjusting:

a simulated pulse rate in the IBP assembly by varying an output of the armature, said simulated pulse rate being detectable via the needle inserted into the first tube; and a simulated systolic blood pressure in the IBP assembly by varying another output of the armature, said simulated systolic blood pressure being detectable via the needle inserted into the first tube.

12. The method of claim 11, wherein the first and second tubes are integrally formed.

13. The method of claim 11, further comprising:

filling a fluid reservoir of the IBP assembly with artificial blood; and communicating fluid, via the pump, from the fluid reservoir to the second tube.

14. The method of claim 13, wherein the pump is a reversible peristaltic pump.

15. The method of claim 13, further comprising:

opening a valve of the IBP assembly to communicate fluid from the fluid reservoir to the second tube, bypassing the pump.

16. The method of claim 13, further comprising:

receiving, using a drain port of the IBP assembly, fluid from the first tube; and detecting, via a pressure sensor of the IBP assembly, pressure of the fluid communicated from the first tube to the drain port;

wherein the first tube communicates fluid from the second tube to the drain port.

17. The method of claim 16, further comprising:

activating the pump to pressurize the IBP assembly;

detecting, using the pressure sensor, the pressure generated by the pump; and stopping the pump when the pressure detected by the pressure sensor reaches a desired set value for the simulated diastolic blood pressure.

18. The method of claim 13, wherein activating the pump mimics an increase or decrease in the simulated diastolic blood pressure.

19. The method of claim 18, wherein a lowest point of the programmed wave form corresponds to a desired set value for the simulated diastolic blood pressure; and wherein a highest point of the programmed wave form corresponds to a desired set value for the simulated systolic blood pressure.

20. The method of claim 11, wherein the output of the armature comprises a frequency at which the armature contacts the second tube;

wherein the another output of the armature comprises an amplitude at which the armature contacts the second tube; and wherein the method comprises adjusting the simulated pulse rate and adjusting the simulated systolic blood pressure by varying the frequency and the amplitude, respectively, at which the armature contacts the second tube.

* * * * *